(12) United States Patent
Kilic et al.

(10) Patent No.: US 8,373,865 B2
(45) Date of Patent: Feb. 12, 2013

(54) METHOD OF DETECTING A TOPOLOGY OF A REFLECTIVE SURFACE

(75) Inventors: Onur Kilic, Mountain View, CA (US); Michel J. F. Digonnet, Palo Alto, CA (US); Gordon S. Kino, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/356,379

(22) Filed: Jan. 23, 2012

(65) Prior Publication Data

US 2012/0182557 A1    Jul. 19, 2012

Related U.S. Application Data

(62) Division of application No. 12/975,932, filed on Dec. 22, 2010, now Pat. No. 8,139,227, which is a division of application No. 11/604,673, filed on Nov. 27, 2006, now Pat. No. 7,881,565.

(60) Provisional application No. 60/797,714, filed on May 4, 2006.

(51) Int. Cl.
*G01B 11/02*    (2006.01)
*G01B 9/02*    (2006.01)

(52) U.S. Cl. .......................... 356/513; 356/480

(58) Field of Classification Search ................. 356/480, 356/482, 511–514, 519
See application file for complete search history.

(56) References Cited

U.S. PATENT DOCUMENTS

| 3,831,137 A | 8/1974 | Cuomo |
|---|---|---|
| 4,446,543 A | 5/1984 | McLandrich et al. |
| 4,449,781 A | 5/1984 | Lightstone et al. |
| 4,911,516 A | 3/1990 | Palfrey et al. |
| 5,311,485 A | 5/1994 | Kuzmenko et al. |

(Continued)

FOREIGN PATENT DOCUMENTS

| EP | 1 380 861 | 1/2004 |
|---|---|---|
| EP | 2 434 319 | 3/2012 |

(Continued)

OTHER PUBLICATIONS

Ackermann, T. et al., "The Gouy phase shift, the average phase lag of Fourier components of Hermite-Gaussian modes and their application to resonance conditions in optical cavities," Opt. Commun., vol. 189, pp. 5-14, 2001.

(Continued)

*Primary Examiner* — Michael A Lyons
(74) *Attorney, Agent, or Firm* — Knobbe, Martens, Olson & Bear LLP

(57) ABSTRACT

A method detects a topology of a reflective surface. The method includes providing an optical fiber positioned such that light emitted from the optical fiber is reflected by at least a portion of the reflective surface. The optical fiber and the portion of the reflective surface form an optical resonator having an optical resonance with a resonance lineshape. The method further includes emitting light from the optical fiber while the optical fiber is at a plurality of positions along the reflective surface. The light emitted from the optical fiber irradiates a corresponding plurality of portions of the reflective surface. The method further includes measuring a change of the resonance lineshape due to the irradiation of the plurality of portions of the reflective surface.

15 Claims, 65 Drawing Sheets

U.S. PATENT DOCUMENTS

| | | | |
|---|---|---|---|
| 5,488,504 A | 1/1996 | Worchesky et al. | |
| 5,910,286 A | 6/1999 | Lipskier | |
| 6,289,143 B1 | 9/2001 | Berthold et al. | |
| 6,717,707 B2* | 4/2004 | Clark | 359/237 |
| 6,777,244 B2 | 8/2004 | Pepper et al. | |
| 6,798,960 B2 | 9/2004 | Hamada | |
| 6,807,342 B2 | 10/2004 | Fan | |
| 6,822,784 B2 | 11/2004 | Fukshima et al. | |
| 6,885,784 B2 | 4/2005 | Bohnert | |
| 7,024,072 B2 | 4/2006 | Chen et al. | |
| 7,054,011 B2 | 5/2006 | Zhu et al. | |
| 7,134,343 B2 | 11/2006 | Suzuki et al. | |
| 7,155,087 B2 | 12/2006 | Suh et al. | |
| 7,187,816 B2 | 3/2007 | Huang | |
| 7,190,869 B2 | 3/2007 | Jin et al. | |
| 7,193,725 B2* | 3/2007 | Brunfeld et al. | 356/519 |
| 7,224,465 B2 | 5/2007 | Balachandran et al. | |
| 7,233,729 B2 | 6/2007 | Romagnoli et al. | |
| 7,280,265 B2 | 10/2007 | Miles | |
| 7,283,716 B2 | 10/2007 | Park et al. | |
| 7,308,163 B2 | 12/2007 | Bratkovski et al. | |
| 7,330,277 B2* | 2/2008 | Brunfeld et al. | 356/519 |
| 7,333,703 B2 | 2/2008 | Hatsuda et al. | |
| 7,474,823 B2 | 1/2009 | Wang et al. | |
| 7,483,144 B2 | 1/2009 | Sanders | |
| 7,489,846 B2 | 2/2009 | Grot et al. | |
| 7,526,148 B2 | 4/2009 | Kilic et al. | |
| 7,545,513 B2 | 6/2009 | Kiesel et al. | |
| 7,619,744 B2 | 11/2009 | Liess | |
| 7,630,589 B2 | 12/2009 | Kilic et al. | |
| 7,751,055 B2 | 7/2010 | Sanders et al. | |
| 7,809,219 B2 | 10/2010 | Kilic et al. | |
| 7,881,565 B2 | 2/2011 | Kilic et al. | |
| 7,944,567 B2 | 5/2011 | Asano | |
| 7,973,936 B2 | 7/2011 | Dantus | |
| 8,139,227 B2 | 3/2012 | Kilic et al. | |
| 8,160,406 B2 | 4/2012 | Kilic et al. | |
| 8,249,400 B2 | 8/2012 | Kilic et al. | |
| 2002/0135863 A1 | 9/2002 | Fukshima et al. | |
| 2004/0008934 A1 | 1/2004 | Takiguchi et al. | |
| 2004/0080726 A1 | 4/2004 | Suh et al. | |
| 2004/0208449 A1 | 10/2004 | Chen et al. | |
| 2004/0228575 A1 | 11/2004 | Kim et al. | |
| 2005/0052724 A1 | 3/2005 | Suzuki et al. | |
| 2005/0169590 A1 | 8/2005 | Alkeskjold | |
| 2005/0175304 A1 | 8/2005 | Romagnoli et al. | |
| 2005/0186117 A1 | 8/2005 | Uchiyama et al. | |
| 2005/0191025 A1 | 9/2005 | Kim et al. | |
| 2005/0201660 A1 | 9/2005 | Grot et al. | |
| 2005/0237602 A1 | 10/2005 | Yanagisawa | |
| 2006/0193550 A1 | 8/2006 | Wawro et al. | |
| 2006/0227331 A1 | 10/2006 | Vollmer et al. | |
| 2006/0280403 A1 | 12/2006 | Suh et al. | |
| 2007/0081165 A1 | 4/2007 | Kilic et al. | |
| 2008/0034866 A1 | 2/2008 | Kilic et al. | |
| 2008/0089645 A1 | 4/2008 | Wang et al. | |
| 2009/0028407 A1 | 1/2009 | Seibel et al. | |
| 2009/0208163 A1 | 8/2009 | Kilic et al. | |
| 2010/0092125 A1 | 4/2010 | Kilic et al. | |
| 2011/0041616 A1 | 2/2011 | Kilic et al. | |
| 2011/0268384 A1 | 11/2011 | Akkaya et al. | |

FOREIGN PATENT DOCUMENTS

| | | |
|---|---|---|
| GB | 1 558 689 | 1/1980 |
| JP | 56-081802 | 7/1981 |
| JP | 2002-328243 | 11/2002 |
| JP | 2003-185864 | 7/2003 |
| JP | 2005-045463 | 2/2005 |
| JP | 2005-077711 | 3/2005 |
| JP | 2008-541513 | 11/2008 |
| JP | 2009-535977 | 10/2009 |
| JP | 2010-516124 | 5/2010 |
| WO | WO 2006/092052 | 9/2006 |
| WO | WO 2006/119200 | 11/2006 |
| WO | WO 2007/130152 | 11/2007 |
| WO | WO 2008/086448 | 7/2008 |
| WO | WO 2011/115933 | 9/2011 |

OTHER PUBLICATIONS

Akulichev, V.A. et al., "Acoustic cavitation thresholds of sea water in different regions of the world ocean," Acoust. Phys. 51, 128-138 (2005).

Andrews, M., et al., a comparison of squeeze-film theory with measurements on a microstructure, Sensors and Actuators A, vol. 36, 1993, pp. 79-87.

Arya, V. et al., "Exact Analysis of the Extrinsic Fabry-Perot Interferometric Optical Fiber Sensor Using Kirchhoff's Diffraction Formalism," Opt. Fiber Technol., vol. 1, pp. 380-384, 1995.

Astratov, V.N., et al., Resonant coupling of near-infrared radiation to photonic band structure waveguides, J. Lightwave Technol., vol. 17, 1999, p. 2050.

Baba, et al., "Theoretical characteristics of optical polarizing films using oblique metal island films," Proceedings of SPIE, vol. 6116, 611605-1 (2006).

Belleville, C. et al., "White-light interferometric multimode fiber-optic strain sensor," Opt. Lett., vol. 18, pp. 78-80, 1993.

Bergqvist, J., "Finite-element modeling and characterization of a silicon condenser microphone with a highly perforated backplate," Sensors and Actuators A 39, 191-200 (1993).

Bucaro, et al., "Fiber-optic hydrophone," J. Acoust. Soc. Am. vol. 62, 1302 (1977).

Bucaro, J.A., et al., Miniature, High Performance, Low-Cost Fiber Optic Microphone, J. Acoust. Soc. Am., vol. 118, No. 3, Part 1, Sep. 2005, pp. 1406-1413.

Callen, et al., "Irreversibility and generalized noise," Phys. Rev. vol. 83, 34-40 (1951).

Chin, K.K. et al., "Fabry-Perot diaphragm fiber-optic sensor," Appl. Opt., vol. 46, pp. 7614-7619, 2007.

Chow, Jong H., et al., Ultra Resolution Fiber Sensor Using a Pre-stabilized Diode Laser, Post-deadline CLEO 2005, CPDA9, three pages (2005).

Cole, et al., "Fiber-optic detection of sound," J. Acoust. Soc. Am. vol. 62, 1136 (1977).

Crane, P.H.G., "Method for the calculation of the acoustic radiation impedance of unbaffled and partially baffled piston sources," J. Sound Vib. 5, 257-277 (1967).

Dorn, et al., "Sharper focus for a radially polarized light beam," Phys. Rev. Lett., vol. 91, 233901 (2003).

Eaton, W.P., et al., A new analytical solution for diaphragm deflection and its application to a surface micromachined pressure sensor, Intl. Conf. on Modeling and Simulation of Microsystems, 1999.

European Exam Report re EP Application No. 06846402.3-2216, dated Apr. 22, 2010.

European Exam Report re EP Application No. 06846402.3-2216, dated Oct. 31, 2011.

Fan, S., et al.: "Analysis of guided resonances in photonic crystal slabs", Phys. Rev. B, vol. 65, p. 235112 (2002).

Fine, R.A. et al "Compressibility of water as a function of temperature and pressure," J. Chem. Phys. 59, 5529-5536 (1973).

Furstenau, N. et al., "Extrinsic Fabry-Perot interferometer vibration and acoustic sensor systems for airport ground traffic monitoring," IEE Proc. Optoelectron., vol. 144, pp. 134-144, 1997.

Gabrielson, "Mechanical thermal noise in micromachined acoustic and vibration sensors," IEEE Trans. Electron Devices vol. 40, 903-909 (1993).

Gangopadhyay, T.K., et al., Modeling and Analysis of an Extrinsic Fabry-Perot Interferometer Cavity, Appl. Optics, vol. 44, No. 16, Jun. 1, 2005, pp. 3192-3196.

Haakestad, Magnus W., et al., Acousto-Optic Properties of Photonic Crystal Fibers, 2004 IEEE Ultrasonics Symposium, pp. 56-59 (2004).

Han, M. et al., "Exact analysis of low-finesse multimode fiber extrinsic Fabry-Perot interferometers," Appl. Opt., vol. 43, pp. 4659-4666, 2004.

Hirsekorn, M., et al., Modelling and simulation of acoustic wave propagation in locally resonant sonic materials, www.sciencedirect.com, Ultrasonics 42, 2004, pp. 231-235.

Holden, J., "Multiple-beam interferometry: intensity distribution in the reflected system," Proc. Phys. Soc. B, vol. 62, pp. 405-417, 1949.

Homentcovschi, D. et al., "Viscous damping of perforated planar micromechanical structures," Sensors and Actuators A 119, 544-552 (2005).

Homentcovschi, et al., "Modeling of Viscous Damping of Perforated Planar Microstructures. Applications in Acoustics," Journal of the Acoustical Society of America, vol. 116, 2939-2947 (2004).

Hu, Y. et al., "Influence of three-dimensional roughness on pressure-driven flow through microchannels," J. Fluids Eng. 125, 871-879 (2003).

Kadirvel, K., et al., Design and Characterization of MEMS Optical Microphone for Aeroacoustic Measurement, 42nd AIAA Aerospace Science Meeting and Exhibit, Jan. 5-8, 2004, Reno, Nevada.

Kanskar, M., et al., Observation of leaky slab modes in an air-bridged semiconductor waveguide with a two-dimensional photonic lattice, Appl. Phys. Lett., vol. 70, 1997, p. 1438.

Karathanos, V., "Inactive Frequency Bands in Photonic Crystals", Journal of Modern Optics, vol. 45, No. 8, pp. 1751-1758 1998.

Kersey et al.: "Fiber grating sensors", J. Lightwave Tehnol., vol. 15, No. 8, p. 1442 (1997).

Kilic, et al., "External Fiber Fabry-Perot Acoustic Sensor Based on Photonic-Crystal Mirror;" Measurement Science and Technology, vol. 18, No. 10, Oct. 1, 2007, pp. 3049-3054.

Kilic, O. et al., "Analysis of guided-resonance-based polarization beam splitting in photonic-crystal slabs," J. Opt. Soc. Am. A, vol. 25, pp. 2680-2692, 2008.

Kilic, O. et al., "Asymmetrical spectral response in fiber Fabry-Perot interferometers," J. Lightwave Technol. 28, 5648-5656 (2009).

Kilic, O. et al., "External fiber Fabry-Perot acoustic sensor based on photonic-crystal mirror," in 18th International Optical Fiber Sensors Conference, Cancun, Mexico (2006).

Kilic, O. et al., "Fiber-optical acoustic sensor based on a photonic-crystal diaphragm," in 15th International Conference on Solid-State Sensors, Actuators, and Microsystems, Denver, CO (2009).

Kilic, O. et al., "Photonic crystal slabs demonstrating strong broadband suppression of transmission in the presence of disorders," Opt. Lett. 29, 2782-2784 (2004).

Kilic, O. et al "Photonic-crystal-diaphragm-based fiber-tip hydrophone optimized for ocean acoustics," in 19th International Optical Fiber Sensors Conference, Perth, Australia (2008).

Kim, S. et al., "Single-film broadband photonic crystal micro-mirror with large angular range and low polarization dependence," in Conference on Lasers and Electro-Optics (CLEO), Baltimore, MD, (2007), pp. CThP7.

Kim, Y. et al., "Micromachined Fabry-Perot cavity pressure transducer," IEEE Photon. Technol. Lett., vol. 7, pp. 1471-1473, 1995.

Kuhnel, et al., "A silicon condenser microphone with structured back plate and silicon nitride membrane," Sensors and Actuators A, vol. 30, 251-258 (1992).

Kuzmenko, P.J., Experimental Performance of a Miniature Fabry-Perot Fiber Optic Hydrophone, Proceedings of 8th Optical Fiber Sensors Conference, Monterey, California, Jan. 29-31, 1992, pp. 354-357.

Ladabaum, I., et al., Surface micromachined capacitive ultrasonic transducers, Ultrasonics, Ferroelectris and Frequency Control, IEEE Transactions, vol. 45, No. 3, May 1998, pp. 678-690.

Lee, C.E. et al., "Fiber-optic Fabry-Perot temperature sensor using a low-coherence light source," J. Lightwave Technol., vol. 9, pp. 129-134, 1991.

Lee, C.E. et al., "Interferometric optical fibre sensors using internal mirrors," Electron. Lett., vol. 24, pp. 193-194, 1988.

Levy, et al., "Engineering space-variant inhomogeneous media for polarization control," Opt. Lett., vol. 29, 1718 (2004).

Mala, G.M. et al., "Flow characteristics of water in microtubes," Int. J. Heat Fluid Flow 20, 142-148 (1999).

Marcuse, D. et al., "Coupling efficiency of front surface and multilayer mirrors as fiber-end reflectors," J. Lightwave Technol., vol. 4, pp. 377-381, 1986.

Marcuse, D., "Loss analysis of single-mode fiber splices," Bell Syst. Tech. J., vol. 56, pp. 703-718. 1977.

Marin, E., et al., Acoustic modes of a dual-core square-lattice photonic crystal fiber preform, Proc. 27th Eur. Conf. on Opt. Comm. (ECOC'01—Amsterdam), pp. 518-519 (2001).

Mellen, R.H., "The thermal-noise limit in the detection of underwater acoustic signals," J. Acoust. Soc. Am. 24, 478-470 (1952).

Mellow, T. et al., "On the sound field of an oscillating disk in a finite open and closed circular baffle," J. Acoust. Soc. Am. 118, 1311-1325 (2005).

Morey, W.W. et al., "Multiplexing fiber Bragg grating sensors," Fiber and Integrated Optics, vol. 10, pp. 531-360, 1991.

Murphy, A.K. et al., "Quadrature phase-shifted, extrinsic Fabry-Perot optical fiber sensors," Opt. Lett., vol. 16, pp. 273-275, 1991.

Ochiai, et al., Dispersion relation and optical transmittance of a hexagonal photonic crystal slab, Phys. Rev. B, vol. 63, 2001, p. 125107.

Pacradouni, et al., Photonic band structure of dielectric membranes periodically textured in two dimensions, Phys. Rev. B, vol. 62, 2000, p. 4204.

Paddon et al., Two-dimensional vector-coupled-mode theory for textured planar waveguides, Phys. Rev. B, vol. 61, 2000, p. 2090.

PCT International Search Report and Written Opinion re PCT/US2006/061356 dated Apr. 27, 2007 issued in the name of the Board of Trustees of the Leland Stanford Junior University.

Pedersen, et al., "On the mechanical behaviour of thin perforated plates and their application in silicon condenser microphones," Sens. Actuators A, vol. 54, 499-504 (1996).

Petuchowski, S. et al., "A sensitive fiber-optic Fabry-Perot interferometer," IEEE J. Quantum Electron., vol. 17, pp. 2168-2170, 1981.

Rands, C. et al., "Characterization of transition to turbulence in microchannels," Int. J. Heat Mass Transfer 49, 2924-2930 (2006).

Sharp, K.V. et al., "Transition from laminar to turbulent flow in liquid filled microtubes," Exp. Fluids 36, 741-747 (2004).

Sharpe, W.N. et al., "Effect of specimen size on Young's modulus and fracture strength of polysilicon," J. Micromech. Syst. 10, 317-326 (2001).

Škvor, "On acoustical resistance due to viscous losses in the air gap of electrostatic transducers," Acustica, vol. 19, 295-297 (1967-1968).

Spillman, W.B., Jr., et al., Moving Fiber-Optic Hydrophone, Optics Lett., vol. 5, No. 1, Jan. 1980, pp. 30-31.

Starr, J.B., "Squeeze-film damping in solid-state accelerometers," in IEEE Workshop in Solid-State Sensor and Actuator 4th Technical Digest, (1990), pp. 44-47.

Suh, W., et al., Displacement-sensitive photonic crystal structures based on guided resonance in photonic crystal slabs, Appl. Phys. Lett., vol. 82, No. 13, 1999, pp. 1999-2001.

Suh et al., "Mechanically switchable photonic crystal structures based on coupled photonic crystal slabs", SPIE, Jul. 9, 2004, Photonic Crystal Materials and Devices II, Jan. 26-29, 2004, San Jose, CA USA, pp. 299-306, vol. 5360, No. 1.

Szymanski, M.D. et al., "Killer whale (Orcinus orca) hearing: Auditory brainstem response and behavioral audiograms," J. Acoust. Soc. Am. 106, 1134-1141 (1999).

Thomson, et al., A Fabry-Perot acoustic sensor vibration detector-application to acoustic holography, J. Phys. D.: Appl. Phys., vol. 6, 1973, p. 677.

Totsu, K., et al., Ultra-Miniature Fiber-Optic Pressure Sensor Using White Light Interferometry, J. Micromech. Microeng., vol. 15, 2005, pp. 71-75.

Wenz, G.M., "Acoustic ambient noise in the ocean: Spectra and sources," J. Acoust. Soc. Am. 34. 1936-1956 (1962).

Worth, R.A., "Accuracy of the parallel-plate analogy for representation of viscous flow between coaxial cylinders," J. Appl. Polym. Sci. 24, 319-328 (1979).

Yu, M., et al., Acoustic Measurements Using a Fiber Optic Sensor System, J. Intelligent Mat'l. Systems and Structures, vol. 14, Jul. 2003, pp. 409-414.

Yu, M., Fiber-Optic Sensor Systems for Acoustic Measurements, Ph.D. Dissertation, University of Maryland, College Park, MD. 2002.

Zhu, Y. et al., "Miniature Fiber-Optic Pressure Sensor," IEEE Photonics Technology Letters, vol. 17, No. 2, Feb. 2005.

Japanese Office Action re JP Application No. 2009-509545, dated Jul. 3, 2012.

* cited by examiner

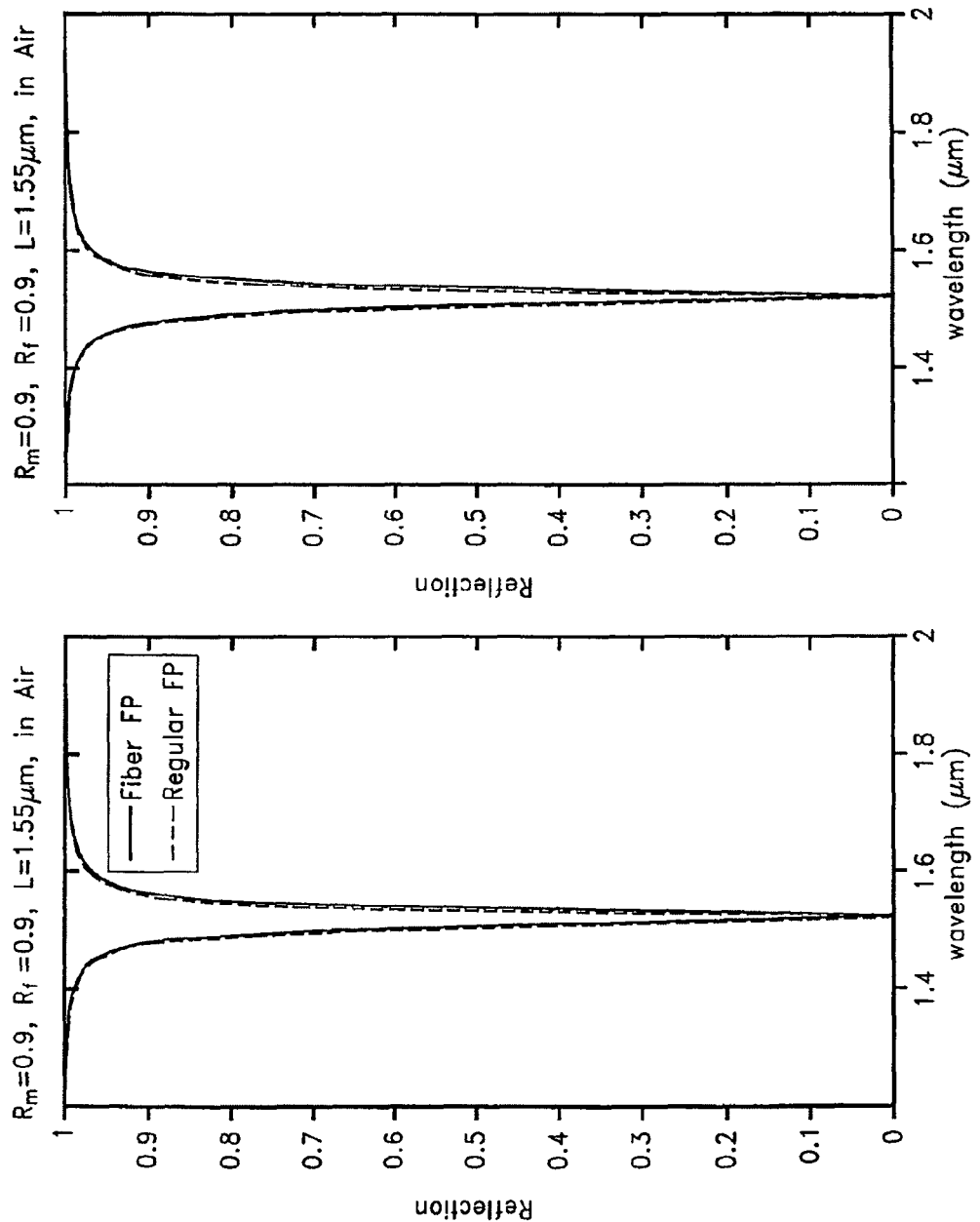

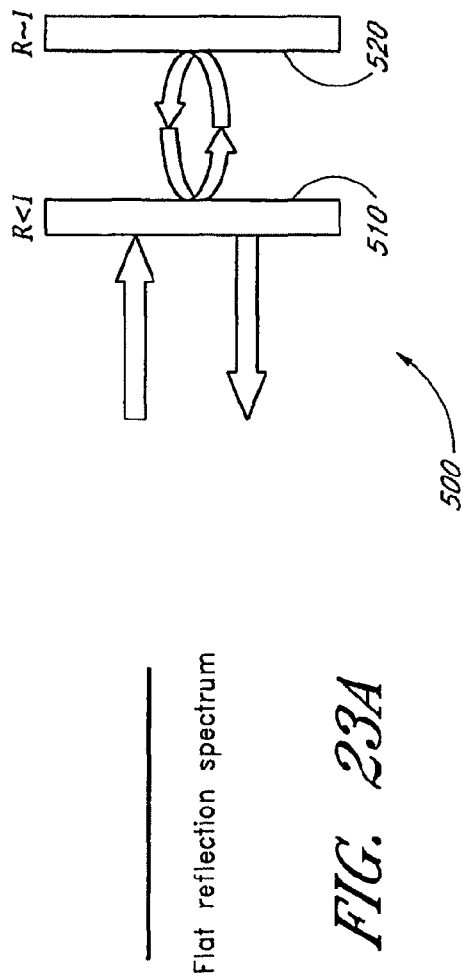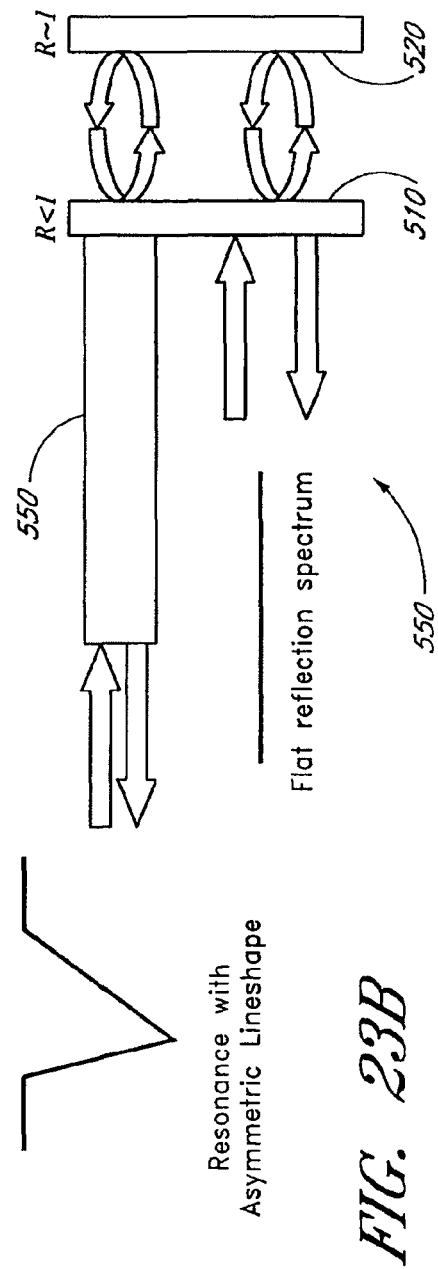
FIG. 23A
FIG. 23B

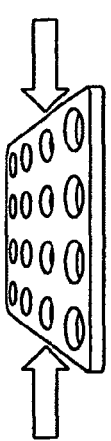
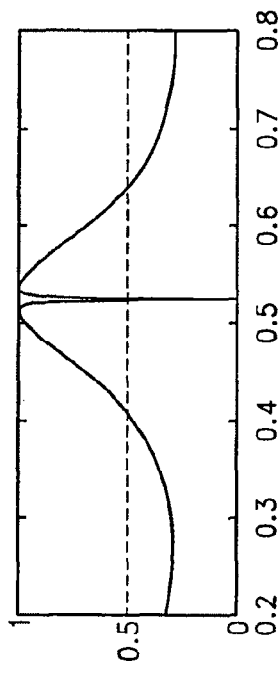
FIG. 26A
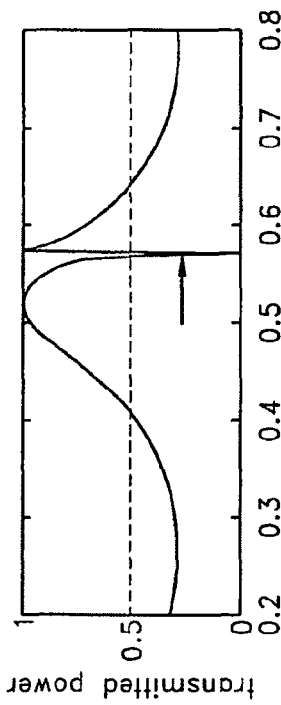
FIG. 26B
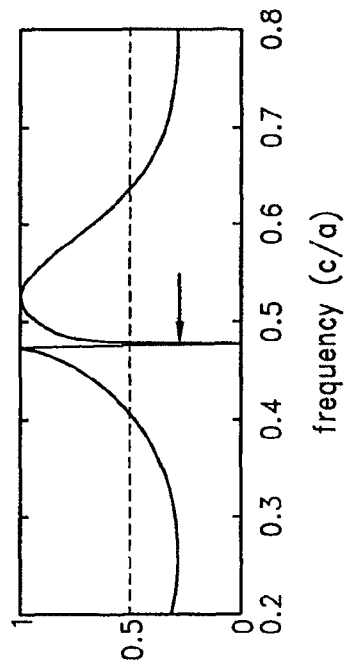
FIG. 26C

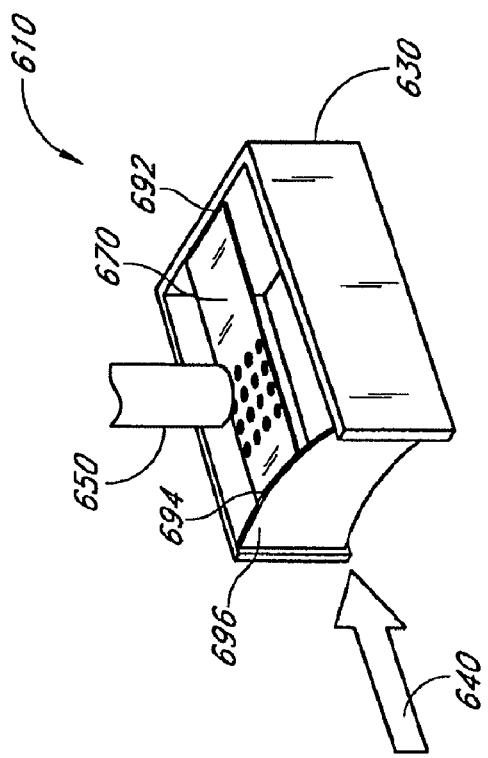
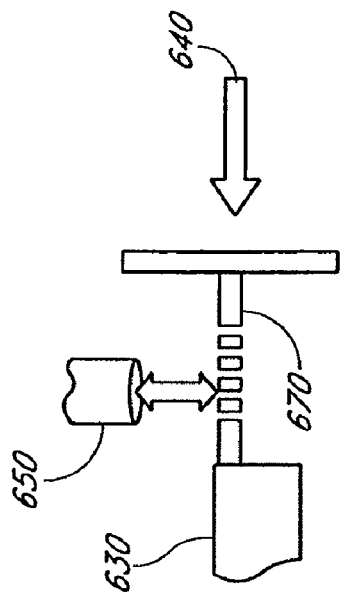
FIG. 30A
FIG. 30B

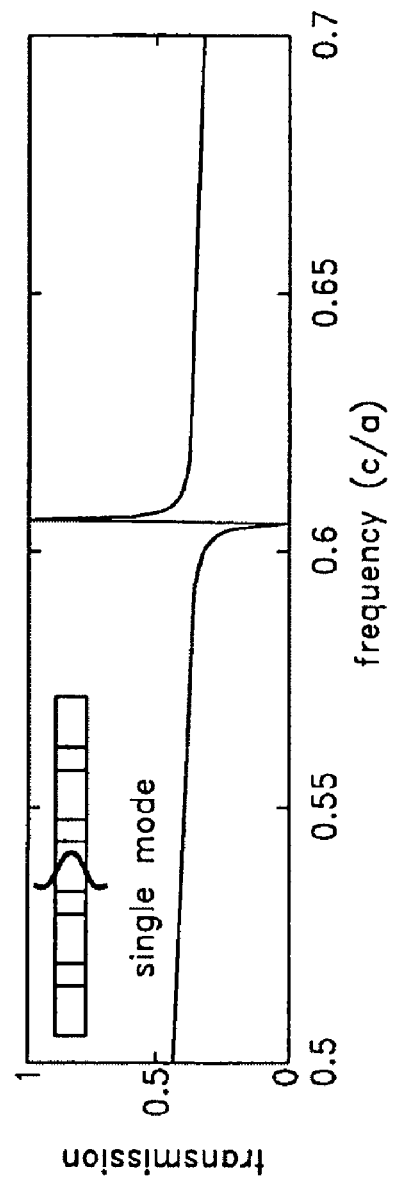
FIG. 33A

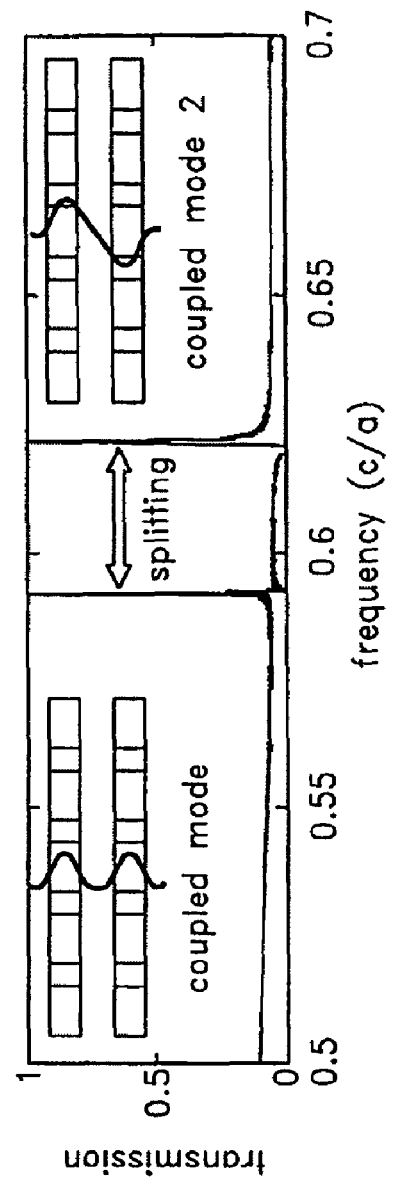
FIG. 33B

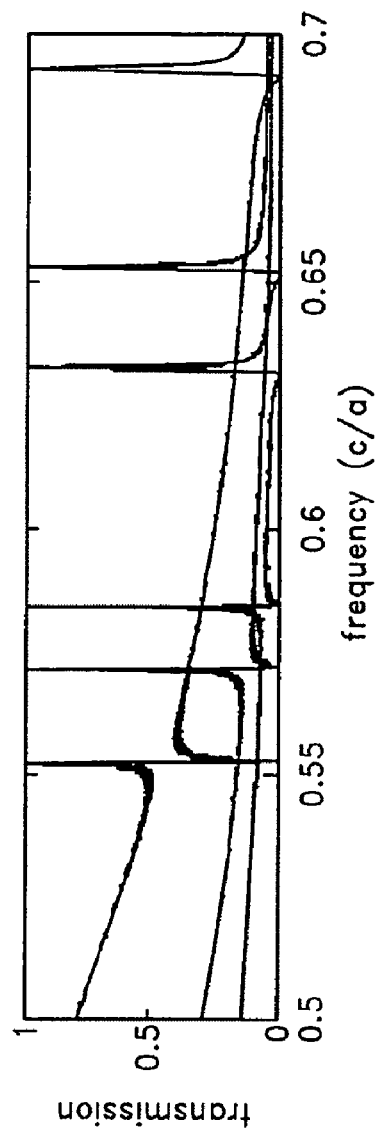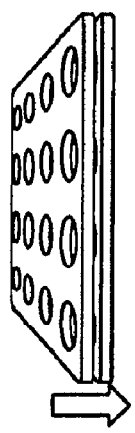
FIG. 33C

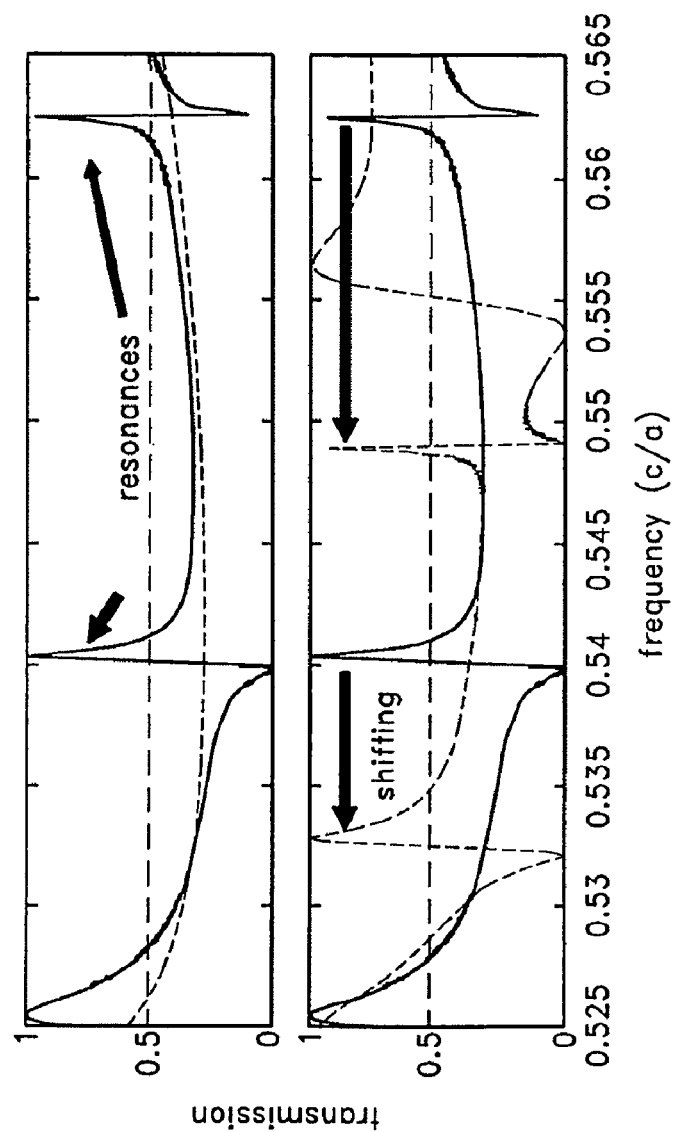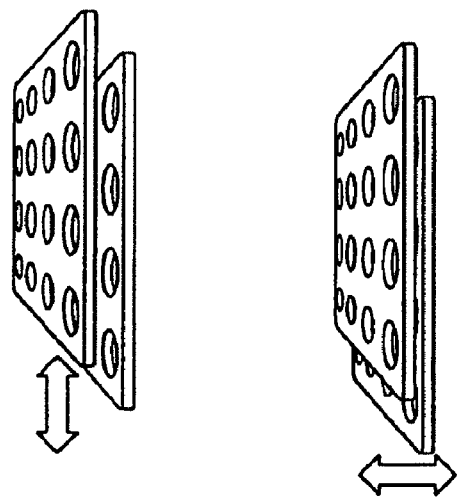
FIG. 34

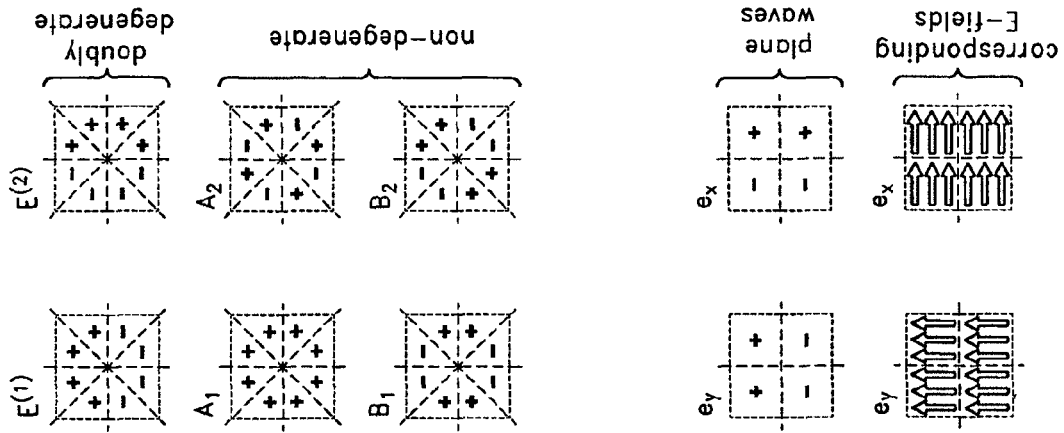
FIG. 41B
FIG. 41C
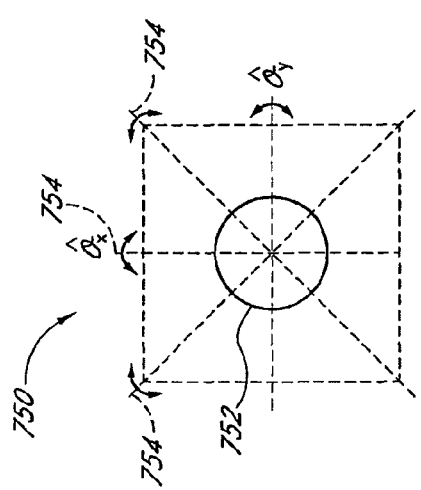
FIG. 41A
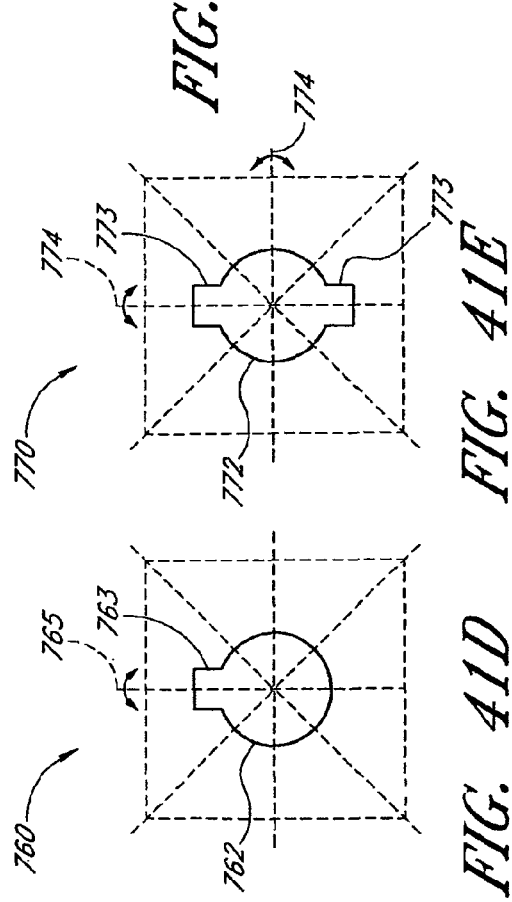
FIG. 41E
FIG. 41D

METHOD OF DETECTING A TOPOLOGY OF A REFLECTIVE SURFACE

CLAIM OF PRIORITY

This application is a divisional of U.S. patent application Ser. No. 12/975,932, filed Dec. 22, 2010 and incorporated in its entirety by reference herein, which is a divisional of U.S. patent application Ser. No. 11/604,673, filed Nov. 27, 2006, which is incorporated in its entirety by reference herein and which claims the benefit of U.S. Provisional Pat. Appl. No. 60/797,714, filed May 4, 2006, which is incorporated in its entirety by reference herein.

BACKGROUND

1. Field of the Invention

This application relates generally to optical devices and sensors, and more particularly to optical-fiber-compatible devices and sensors utilizing optical resonances.

2. Description of the Related Art

Various fiber optic sensor systems have been previously disclosed that utilize the relative displacements of the two mirrors of an interferometric cavity (e.g., to provide acoustic pressure measurements). See, e.g., M. Yu et al., "*Acoustic Measurements Using a Fiber Optic Sensor System*," J. Intelligent Mat'l Systems and Structures, vol. 14, pages 409-414 (July 2003); K. Totsu et al., "*Ultra-Miniature Fiber-Optic Pressure Sensor Using White Light Interferometry*," J. Micromech. Microeng., vol. 15, pages 71-75 (2005); W. B. Spillman, Jr. et al., "*Moving Fiber-Optic Hydrophone*," Optics Lett., vol. 5, no. 1, pages 30-31 (January 1980); K. Kardirvel et al., "*Design and Characterization of MEMS Optical Microphone for Aeroacoustic Measurement*," 42nd AIAA Aerospace Sciences Meeting and Exhibit, 5-8 Jan. 2004, Reno, Nev.; J. A. Bucaro et al., "*Miniature, High Performance, Low-Cost Fiber Optic Microphone*," J. Acoust. Soc. Am., vol. 118, no. 3, part 1, pages 1406-1413 (September 2005); T. K. Gangopadhyay et al., "*Modeling and Analysis of an Extrinsic Fabry-Perot Interferometer Cavity*," Appl. Optics, vol. 44, no. 16, pages 312-3196 (1 Jun. 2005); and P. J. Kuzmenko, "Experimental Performance of a Miniature Fabry-Perot Fiber Optic Hydrophone," Proceedings of 8th Optical Fiber Sensors Conference, Monterey, Calif., Jan. 29-31, 1992, pages 354-357.

SUMMARY

In certain embodiments, an optical resonator comprises a reflective element and an optical fiber. The optical fiber is positioned relative to the reflective element such that light emitted from the optical fiber is reflected by the reflective element. The optical resonator has an optical resonance with a resonance lineshape that is asymmetric as a function of wavelength.

In certain embodiments, an optical resonator comprises a reflective element and a spatial mode filter. The spatial mode filter is positioned relative to the reflective element such that light emitted from the spatial mode filter is reflected by the reflective element. The device has an optical resonance with a resonance lineshape that is asymmetric as a function of wavelength.

In certain embodiments, an acoustic sensor comprises an optical resonator and a housing. The optical resonator comprises a reflective element and an optical fiber. The optical fiber is positioned relative to the reflective element such that light emitted from the optical fiber is reflected by the reflective element. The optical resonator has an optical resonance with a resonance lineshape that is asymmetric as a function of wavelength. The housing substantially surrounds the reflective element and is mechanically coupled to the reflective element. The optical resonance is responsive to acoustic waves incident upon the housing.

In certain embodiments, a method utilizes an optical resonator. The method comprises providing an optical resonator comprising a reflective element and an optical fiber. The optical fiber is positioned relative to the reflective element such that light emitted from the optical fiber is reflected by the reflective element. The optical resonator has an optical resonance with a resonance lineshape that is asymmetric as a function of wavelength. The resonance lineshape has a minimum reflectivity at a resonance wavelength, a first side with wavelengths below the resonance wavelength, and a second side with wavelengths above the resonance wavelength. The second side is less steep than the first side. The method further comprises emitting a first light signal from the optical fiber and reflecting the first light signal from the reflective element. The first light signal has a first wavelength on the first side of the resonance lineshape. The method further comprises emitting a second light signal from the optical fiber and reflecting the second light signal from the reflective element. The second light signal has a second wavelength on the second side of the resonance lineshape.

In certain embodiments, a method detects acoustic waves. The method comprises providing an acoustic sensor comprising an optical resonator and a housing. The optical resonator has an optical resonance with a resonance lineshape that is asymmetric as a function of wavelength. The resonance lineshape has a minimum reflectivity at a resonance wavelength, a first side with wavelengths below the resonance wavelength, and a second side with wavelengths above the resonance wavelength. The second side is less steep than the first side. The housing substantially surrounds at least a portion of the optical resonator and is mechanically coupled to the optical resonator. The optical resonance is responsive to acoustic waves incident upon the housing. The method further comprises exposing the acoustic sensor to acoustic waves. The method further comprises detecting a change of the optical resonance induced by the acoustic waves. Detecting the change comprises irradiating the optical resonator with a first light signal having a first wavelength on the first side of the resonance lineshape and irradiating the optical resonator with a second light signal having a second wavelength on the second side of the resonance lineshape.

In certain embodiments, a method detects a topology of a reflective surface. The method comprises providing an optical fiber positioned such that light emitted from the optical fiber is reflected by at least a portion of the reflective surface. The optical fiber and the portion of the reflective surface form an optical resonator having an optical resonance with a resonance lineshape. The method further comprises emitting light from the optical fiber while the optical fiber is at a plurality of positions along the reflective surface. The light emitted from the optical fiber irradiates a corresponding plurality of portions of the reflective surface. The method further comprises measuring a change of the resonance lineshape due to the irradiation of the plurality of portions of the reflective surface.

In certain embodiments, a method detects an acceleration. The method comprises providing an optical fiber positioned such that light emitted from the optical fiber is reflected by at least a portion of the reflective surface. The optical fiber and the portion of the reflective surface form an optical resonator having an optical resonance with a resonance lineshape. The method further comprises emitting light from the optical fiber and irradiating a corresponding portion of the reflective surface. The irradiated portion of the reflective surface is responsive to acceleration of the optical resonator by changing curvature. The method further comprises measuring a change of the resonance lineshape due to acceleration of the optical resonator.

BRIEF DESCRIPTION OF THE DRAWINGS

FIGS. 7A and 7B are graphs of the reflection spectra of example FFP and RFP optical resonators with a first reflective element reflectivity of $R_f=0.9$ and a second reflective element reflectivity of $R_m=0.9$ separated from one another by a distance L=1.55 microns defining a cavity therebetween filled with air.

FIG. 23A schematically illustrates a regular Gires-Tournois (RGT) optical resonator having a first reflective element and a second reflective element.

FIG. 23B schematically illustrates a fiber Gires-Tournois (FGT) optical resonator compatible with certain embodiments described herein.

FIGS. 26A-26C schematically illustrates an example PCS exhibiting an optical resonance in the simulated transmitted optical power spectrum for light incident in a direction substantially perpendicular to the PCS.

FIGS. 30A and 30B schematically illustrate an example acoustic sensor having a single PCS.

FIGS. 33A-33C schematically illustrate the dependence of the resonance frequencies of a photonic crystal structure comprising a first PCS and a second PCS.

FIG. 34 schematically illustrates the transmission spectra of two PCSs coupled in the near-field configuration when the PCSs are laterally displaced from one another.

FIG. 41A schematically illustrates a PCS unit cell with the circularly symmetric hole of FIG. 39A having four mirror symmetry axes.

FIG. 41B schematically illustrates two doubly degenerate resonances and four non-degenerate resonances of the PCS structure of FIG. 41A.

FIG. 41C schematically illustrates x-polarized and y-polarized incident plane waves and the corresponding electric fields.

FIG. 41D schematically illustrates a PCS unit cell with an asymmetric hole that is missing a mirror symmetry about the horizontal axis.

FIG. 41E schematically illustrates a PCS unit cell with a rotationally-asymmetric hole.

DETAILED DESCRIPTION OF EXAMPLE EMBODIMENTS

Figure 1:
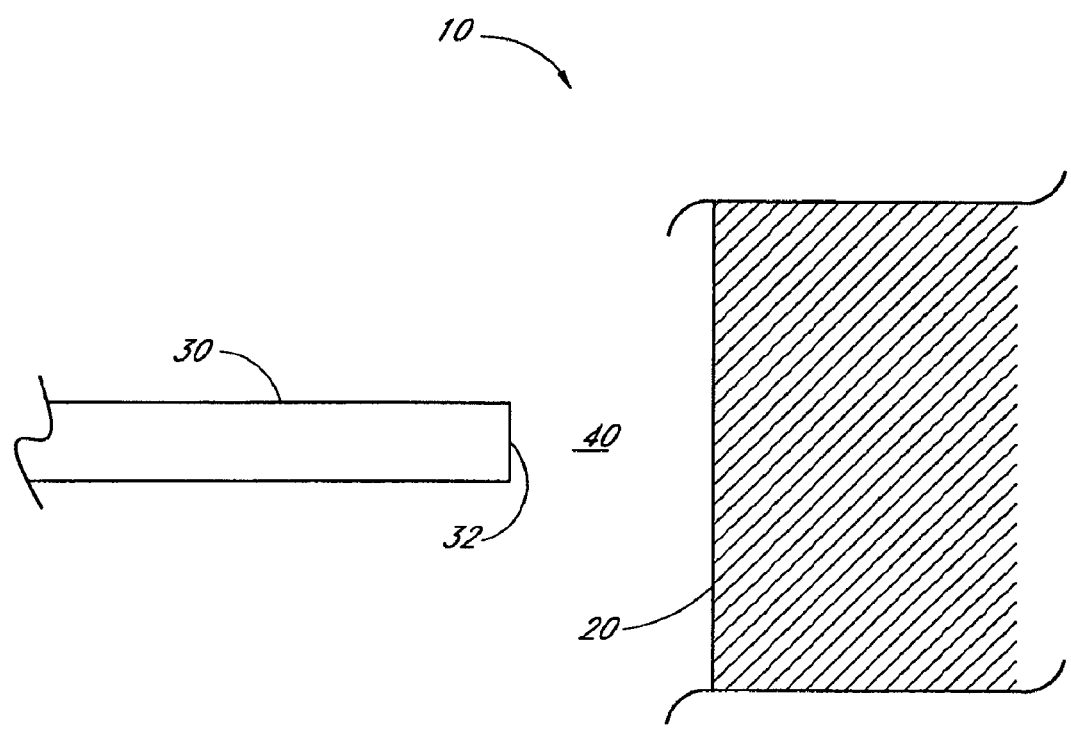
FIG. 1 schematically illustrates an example optical resonator compatible with certain embodiments described herein.

FIG. 1 schematically illustrates an example optical resonator 10 compatible with certain embodiments described herein. The optical resonator 10 comprises a reflective element 20 and an optical fiber 30 positioned relative to the reflective element 20 such that light emitted from the optical fiber 30 is reflected by the reflective element 20. The optical resonator 10 has an optical resonance 50 with a resonance lineshape that is asymmetric as a function of wavelength. In certain embodiments, the optical resonance 50 has a resonance lineshape that is asymmetric as a function of frequency.

In certain embodiments, the reflective element 20 comprises a dielectric mirror (e.g., multilayer structure comprising a plurality of transparent dielectric layers with selected thicknesses and refractive indices to provide a predetermined reflectivity). In certain such embodiments, the dielectric mirror can have a width between 1 micron and 5 microns, and can have an area on the order of square inches (e.g., a film stretched across a frame). Examples of dielectric materials compatible with certain embodiments described herein include, but are not limited to, magnesium fluoride, zinc sulfide, silicon dioxide, titanium dioxide, and tantalum pentoxide. In certain other embodiments, the reflective element 20 comprises a metallic mirror structure (e.g., one or more layers of chromium, gold, silver, aluminum, or combinations thereof). In certain such embodiments, the metallic mirror further comprises a thin (e.g., between about 10 nanometers to about 100 nanometers thick) layer of silicon oxide to protect the metal surface against oxidation and scratching.

In certain other embodiments, the reflective element 20 comprises a portion of a photonic crystal structure. The photonic crystal structure of certain embodiments comprises one or more photonic crystal slabs, examples of which are described more fully below in the section "Example acoustic sensors utilizing photonic crystal structures." Photonic crystal slabs (PCSs) are photonic crystal structures having a spatially periodically varying refractive index. A PCS exhibits guided resonance optical modes that are strongly confined within the PCS, but are coupled to incident radiation through a phase matching mechanism due to the periodically varying refractive index. These guided resonance modes are typically manifest in transmission or reflection spectra as sharp Fano lineshapes superimposed on a smoothly varying background. See, e.g., M. Kanskar et al., "*Observation of leaky slab modes in an air-bridged semiconductor waveguide with a two-dimensional photonic lattice*," Appl. Phys. Lett., vol. 70, page 1438 (1997); V. N. Astratov et al., "*Resonant coupling of near-infrared radiation to photonic band structure waveguides*," J. Lightwave Technol., vol. 17, page 2050 (1999); and S. Fan and J. D. Joannopoulos, "*Analysis of guided resonances in photonic crystal slabs*," Phys. Rev. B, vol. 65, page 235112 (2002). Such guided resonance modes have been used previously as optical filters or mirrors in light emitting diodes and lasers.

PCS structures have several advantages over multi-layer dielectric stacks for use in optical filters and mirrors, including but not limited to, being a single dielectric layer, being compatible with microelectromechanical systems (MEMS), and having unique properties that are difficult or impossible to achieve with multilayer stacks and that can be controlled through geometrical parameters. For example, PCS structures can have a high reflectivity over a broad range of wavelengths (e.g., an observed extinction in transmission of over 99% in a range of wavelengths greater than about 30 nanometers), and can be used as efficient filters at telecom wavelengths (e.g., 1540 nanometers) with sharp resonances observed to have Q of about 5000. In addition, a PCS structure can be used as a circular polarization beam-splitter separating plane-polarized light into its spin-polarized components. Also, though an introduction of a small form birefringence, a PCS structure can act as a dual quarter-wave retarder-based polarizing beam splitter, which separates an incoming wave equally into two orthogonal polarizations through reflection and transmission.

The optical fiber 30 of certain embodiments is a single-mode fiber. Examples compatible with certain embodiments described herein include, but are not limited to, silica-based fiber, Corning's SMF-28® fiber, cutoff shifted fiber, low-water-peak fiber, dispersion-shifted fiber, non-zero dispersion-shifted fiber, and non-standard microstructured fiber (e.g., photonic crystal fiber).

The optical fiber 30 of certain embodiments serves as a spatial mode filter which, in conjunction with the reflective element 20, gives rise to an optical resonance having an asymmetric lineshape. The term "spatial mode filter" as used herein includes its ordinary meaning, including, but not limited to, a structure that passes only light having a spatial mode pattern corresponding to the spatial mode filter (e.g., a power distribution across a plane). Such structures are also referred to as "spatial filters" or "mode filters." For example, a spatial mode filter can comprise a single-mode optical fiber which only passes light that has a Gaussian intensity distribution having a specific width (e.g., about 10 microns for standard fibers). If the incident light incident on the spatial mode filter does not have the corresponding spatial mode pattern, only that portion of the incident light having the corresponding spatial mode pattern will be passed by the spatial mode filter. Another example of a spatial mode filter compatible with certain embodiments described herein comprises an optically transmissive portion and an optically non-transmissive portion which bounds at least a portion of the optically transmissive portion. For example, the optically transmissive portion can comprise a pinhole through an optically non-transmissive material (e.g., a 10-micron-wide circular hole through a thin metal plate) in accordance with certain embodiments described herein. If a light beam having a larger width than 10 microns is incident on the pinhole, only a portion of the light will pass through the pinhole, thus the light will be filtered for the spatial mode corresponding to the pinhole. Alternatively, if the light beam has a width less than or equal to 10 microns and is centered on the pinhole, all the incident light will be passed through the pinhole. In certain embodiments, the spatial mode filter also provides spatial phase distribution filtering or polarization filtering. Other optical resonators 10 compatible with embodiments described herein can utilize any other type of spatial mode filter (e.g., non-fiber based) which generates an optical resonance having an asymmetric lineshape.

In certain embodiments, the optical fiber 30 comprises a fiber Bragg grating, wherein the fiber Bragg grating and the reflective element 20 form a Fabry-Perot resonator having an asymmetric resonance lineshape. Examples of fiber Bragg gratings compatible with certain embodiments described herein include, but are not limited to, type I, type II, periodic, and chirped fiber Bragg gratings. Type I gratings are generally weaker gratings having less of an abrupt refractive index change at the cladding/core interface. Type II gratings are generally stronger gratings with a much more abrupt change in refractive index at the cladding/core interface.

In certain embodiments, the optical fiber 30 comprises a first end 32 that is partially reflective and partially transmissive to light emitted by the optical fiber 30. The first end 32 of certain embodiments and the reflective element 20 form a Fabry-Perot resonator having a cavity 40 therebetween, as schematically illustrated by FIG. 1. The first end 32 of the optical fiber 30 and the reflective element 20 are spaced from one another in certain embodiments by a distance between 500 nanometers and 50 microns. In certain embodiments, the cavity 40 comprises a gas (e.g., air), while in certain other embodiments, the cavity 40 comprises a liquid (e.g., water). The reflectivity of the first end 32 of the optical fiber 30 and the reflectivity of the reflective element 20 are advantageously selected in certain embodiments to provide an optical resonance 50 with a resonance lineshape with a predetermined asymmetry as a function of wavelength.

In certain embodiments, the first end 32 of the optical fiber 30 comprises a metal layer which is partially reflective and partially transmissive to light emitted from the optical fiber 30. In certain embodiments, the metal layer comprises multiple sublayers of various materials, examples of which include, but are not limited to, chromium, gold, silver, aluminum, and combinations thereof. In certain such embodiments, the metallic mirror further comprises a thin (e.g., between about 10 nanometers to about 100 nanometers thick) layer of silicon oxide to protect the metal surface against oxidation and scratching. In certain embodiments, the metal layer has a thickness in a range between 1 nanometer and 50 nanometers. In certain other embodiments, the first end 32 of the optical fiber 30 comprises a dielectric mirror comprising a plurality of dielectric material layers. Examples of dielectric materials compatible with certain embodiments described herein include, but are not limited to, magnesium fluoride, zinc sulfide, silicon dioxide, titanium dioxide, and tantalum pentoxide. In certain embodiments, the first end 32 of the optical fiber 30 comprises a photonic crystal structure.

In certain embodiments, the optical fiber 30 transmits light from a light source to irradiate the reflective element 20. Examples of light sources compatible with certain embodiments described herein include, but are not limited to, monochromatic sources (e.g., laser, laser diode), broadband sources (e.g., incandescent lamp, light-emitting diode), and tunable sources (e.g., tunable laser).

Figure 2:
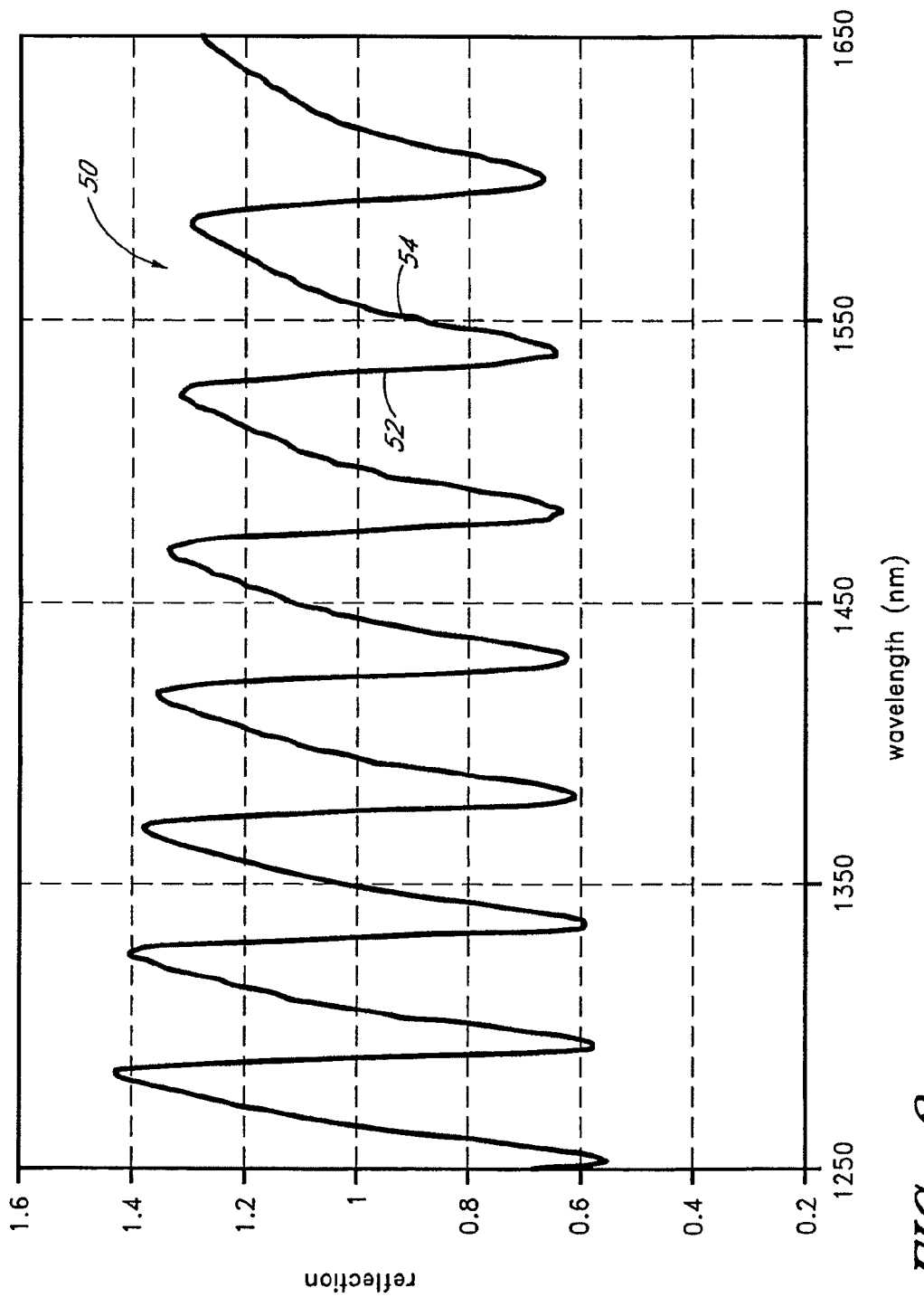
FIG. 2 is a plot of a measured reflectivity spectrum for an example optical resonator compatible with certain embodiments described herein and having a reflective element that comprises a portion of a gold mirror.

FIG. 2 is a plot of a measured reflectivity spectrum for an example optical resonator 10 compatible with certain embodiments described herein. The reflective element 20 of the optical resonator 10 of FIG. 2 comprises a portion of a gold mirror and has a reflectivity greater than 90%. The first end 32 of the optical fiber 30 comprises a metal coating comprising a chromium layer having a thickness of about 4 nanometers and a gold layer having a thickness of about 12 nanometers. The reflectivity of the first end 32 of the optical fiber 30 is about 65%. The first end 32 of the optical fiber 30 is spaced from the reflective element 20 by about 20 microns.

In certain embodiments, the Fabry-Perot cavity 40 formed by the first end 32 of the optical fiber 30 and the reflective element 20 has a plurality of optical resonances as a function of wavelength, with minima and maxima in the range of 1250 nanometers to 1650 nanometers. As shown in FIG. 2, each of the optical resonances shown in FIG. 2 is asymmetric as a function of wavelength. Plotted as a function of frequency, each of these optical resonances exhibits an asymmetry as a function of frequency as well.

For example, an optical resonance 50 shown in FIG. 2 has a minimum reflectivity at a resonance wavelength of about 1540 nanometers. The asymmetric lineshape of this optical resonance 50 has a first side 52 with wavelengths below the resonance wavelength and a second side 54 with wavelengths above the resonance wavelength. The second side 54 of the resonance lineshape is less steep than the first side 52 of the resonance lineshape. The optical resonances shown in FIG. 2 have various degrees of asymmetry between their first and second sides, with the asymmetry generally larger for the longer wavelength resonances.

Figure 3:
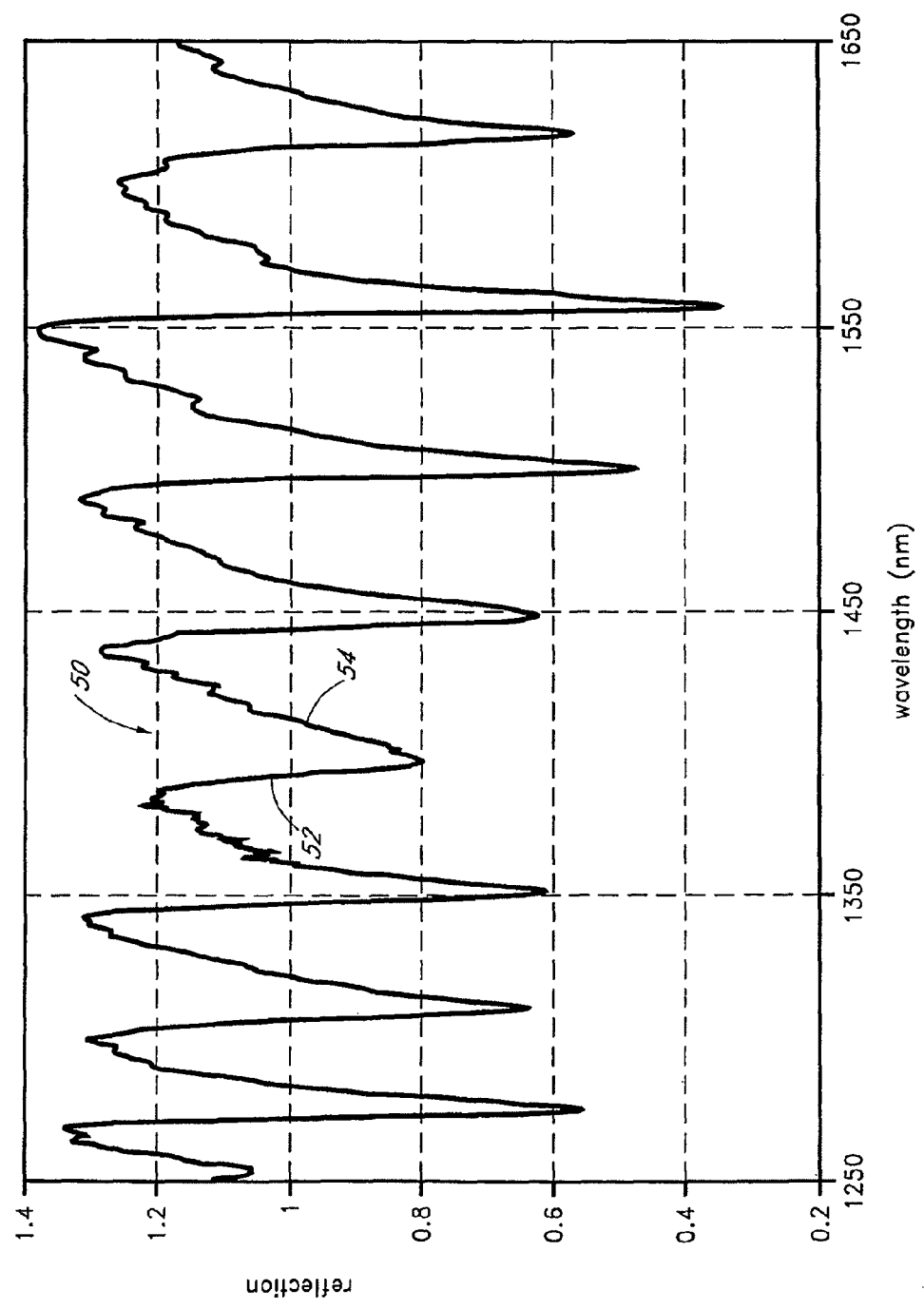
FIG. 3 is a plot of a measured reflectivity spectrum for another example optical resonator compatible with certain embodiments described herein and having a reflective element that comprises a portion of a photonic crystal slab.
Figure 4:
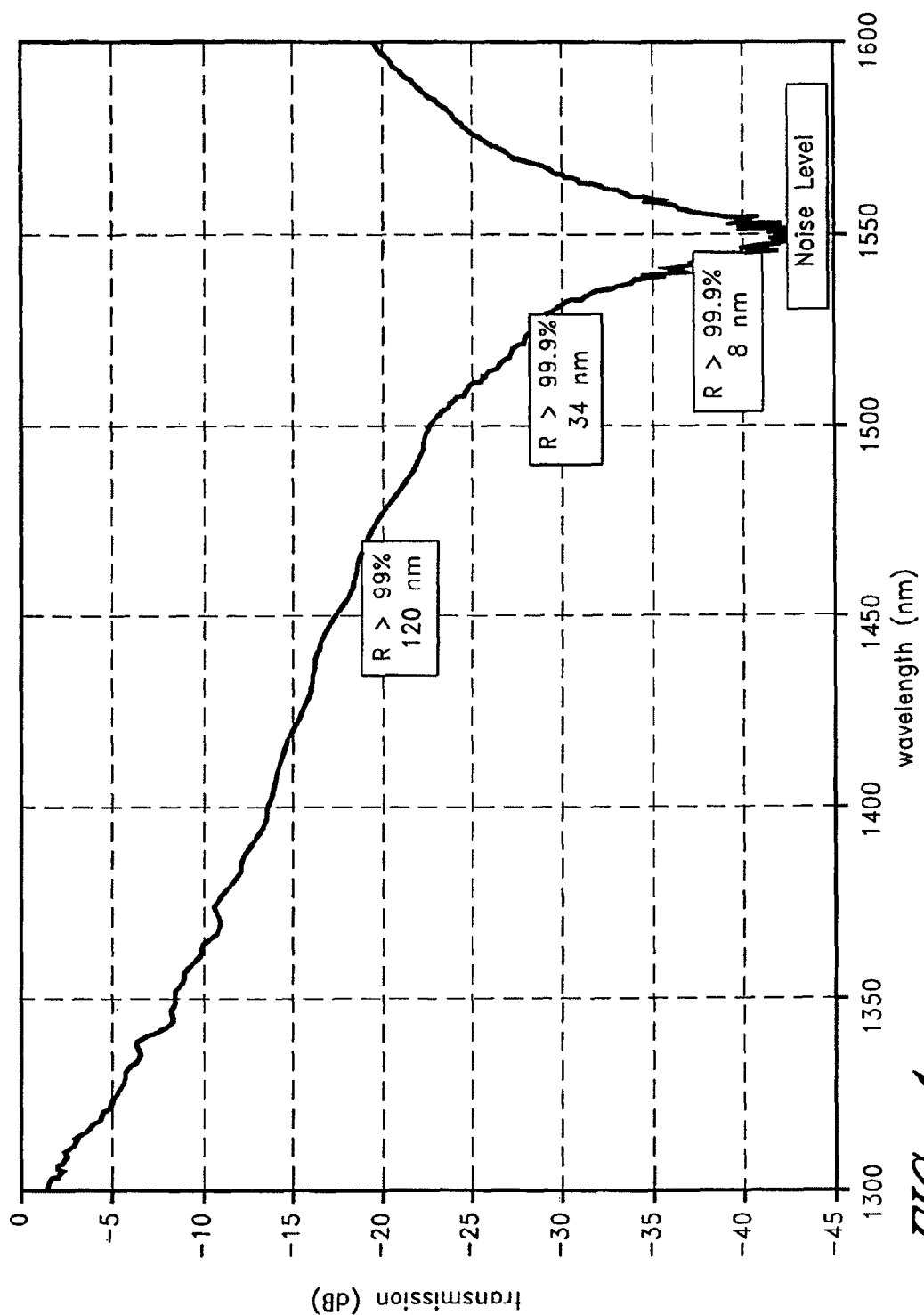
FIG. 4 is a plot of the measured transmission spectrum for the photonic crystal slab used for the measured reflectivity spectrum of FIG. 3.

FIG. 3 is a plot of a measured reflectivity spectrum for another example optical resonator 10 compatible with certain embodiments described herein. The reflective element 20 of the optical resonator 10 of FIG. 3 comprises a portion of a photonic crystal slab having a reflectivity greater than 95% at a wavelength of about 1550 nanometers. FIG. 4 is a plot of the measured transmission spectrum for the photonic crystal slab used for the measured reflectivity spectrum of FIG. 3. The first end 32 of the optical fiber 30 comprises a metal coating comprising a chromium layer having a thickness of about 4 nanometers and a gold layer having a thickness of about 12 nanometers. The reflectivity of the first end 32 of the optical fiber 30 is about 65%. The first end 32 of the optical fiber 30 is spaced from the reflective element 20 by about 20 microns.

As shown in FIG. 3, each of the optical resonances shown in FIG. 2 is asymmetric as a function of wavelength. For example, an optical resonance 50 shown in FIG. 3 has a minimum reflectivity at a resonance wavelength of about 1400 nanometers. The asymmetric lineshape of this optical resonance 50 has a first side 52 with wavelengths below the resonance wavelength and a second side 54 with wavelengths above the resonance wavelength. The second side 54 of the resonance lineshape is less steep than the first side 52 of the resonance lineshape. The optical resonances shown in FIG. 3 have various degrees of asymmetry between their first and second sides. Plotted as a function of frequency, each of these optical resonances exhibits an asymmetry as a function of frequency as well.

Asymmetric Optical Resonance Lineshapes

Figure 5:
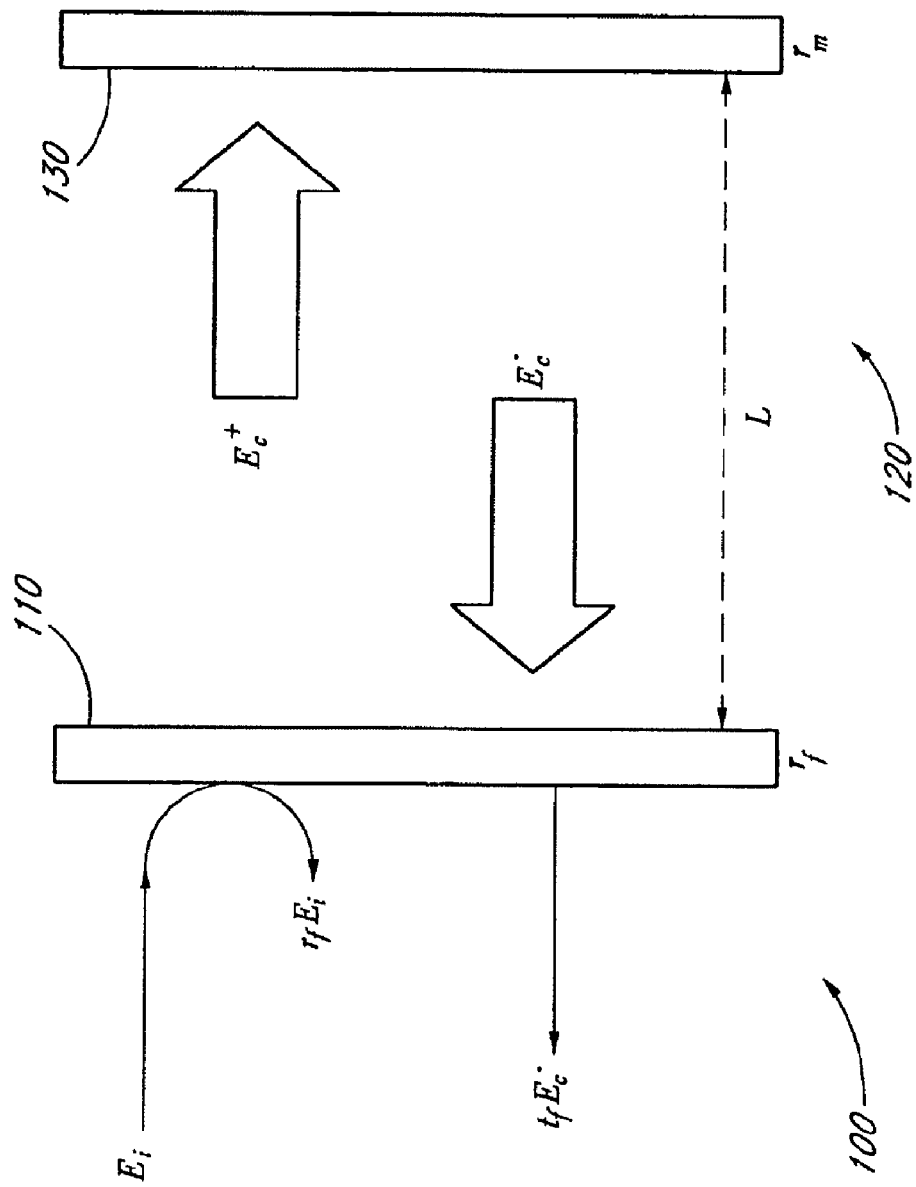
FIG. 5 schematically illustrates a regular Fabry-Perot (RFP) optical resonator comprising infinitely large mirrors with an incident plane wave.

To understand the origins of the asymmetric lineshape of the optical resonances compatible with certain embodiments described herein, it is instructive to compare the optical resonances of a regular Fabry-Perot optical resonator with those of a fiber Fabry-Perot optical resonator. FIG. 5 schematically illustrates a regular Fabry-Perot (RFP) optical resonator 100 comprising infinitely large mirrors 110, 130 with an incident plane wave $E_i$ defining a cavity 120 therebetween.

The total reflected field $E_r$ reflected from the RFP optical resonator 100 is:

$$E_r = r_f E_i + t_f E_c^-, \quad (1)$$

where $E_c^-$ is the backwards traveling total field in the cavity. $E_c^-$ can be calculated as:

$$E_c^- = t_f E_i (r_m e^{-j2kL} + r_m r_f r_m e^{-j4kL} + r_m r_f r_m r_f r_m e^{-j6kL} + \ldots) \quad (2)$$

$$= \frac{t_f E_i}{r_f} \sum_{p=1}^{\infty} (r_f r_m)^p e^{-j2kLp}.$$

The summation of Equation (2) has a closed-form solution, so the total reflected field can be expressed as:

$$E_r = E_i \left( r_f + \frac{t_f^2}{r_f} \frac{r_f r_m e^{-j2kL}}{1 - r_f r_m e^{-j2kL}} \right). \quad (3)$$

For most cases, the relations $r_f \not\in R$ and $t_f = j\sqrt{1 - r_f^2}$ can be used to express the field reflection coefficient for a RFP optical resonator as:

$$r_{RFP} = \frac{E_r}{E_i} = \frac{r_f e^{j2kL} - r_m}{e^{j2kL} - r_f r_m}. \quad (4)$$

Figure 6:
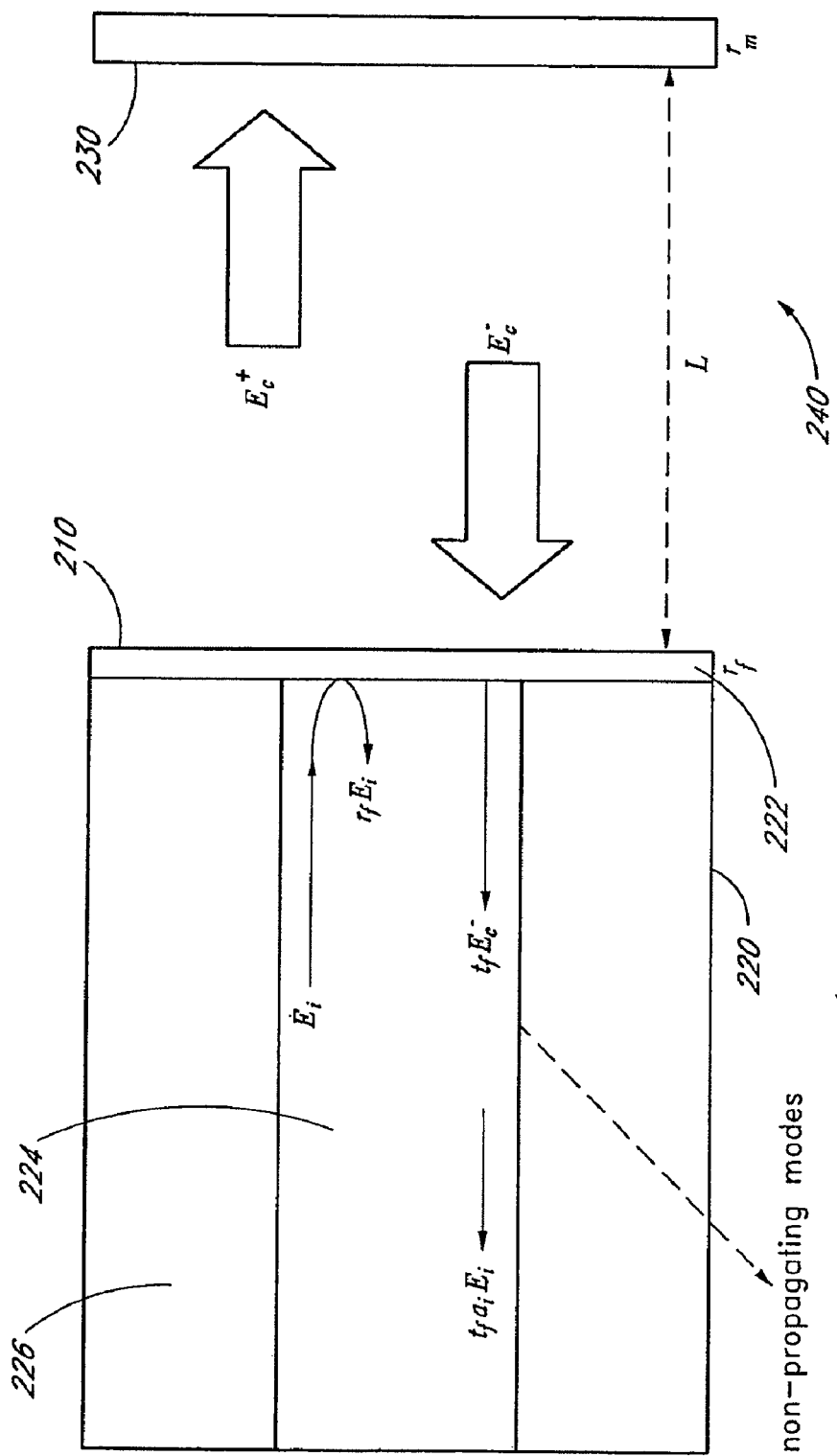
FIG. 6 schematically illustrates a fiber Fabry-Perot (FFP) optical resonator comprising a single-mode fiber, where the first mirror is formed by a single-mode fiber having a reflective end.

FIG. 6 schematically illustrates a fiber Fabry-Perot (FFP) optical resonator 200 comprising a first reflective element 210 (e.g., a reflective surface) formed by a single-mode fiber 220 having a reflective end 222, a core 224, and a cladding 226. The FFP optical resonator 200 further comprises a second reflective element 230 (e.g., a reflective surface) spaced from the first reflective element 210 and defining a cavity 240 therebetween.

Modal analysis of the FFP optical resonator 200 can provide an accurate calculation of the spectral properties of such a structure. However, a Gaussian beam propagation calculation is accurate enough for the purpose of analyzing the reflection spectrum of the FFP optical resonator 200. Light exiting the single-mode fiber 220 has a Bessel-type field distribution that is characterized by the V number:

$$V = \frac{2\pi}{\lambda}(n_{core}^2 - n_{cladding}^2)^{1/2}. \quad (5)$$

Since propagating a Bessel-type field is complicated, the beam can be approximated by a Gaussian field:

$$E_i = E_0 \exp\left(\frac{-r^2}{w_0^2}\right), \quad (6)$$

where the waist can be fitted as:

$$w_0 \approx a\left(0.65 + \frac{1.619}{V^{3/2}} + \frac{2.875}{V^6}\right). \quad (7)$$

The approximation is more accurate for more paraxial beams. Note however that a beam exiting a typical single-mode fiber is not very paraxial.

This Gaussian field, when propagated beyond the fiber termination by a distance z, can be expressed as:

$$E(z) = E_0 \frac{w_0}{w(z)} \exp\left(\frac{-r^2}{w^2(z)}\right) \exp\{-j[kz - \arctan(z/z_0)]\} \exp\left(-j\frac{kr^2}{2R(z)}\right), \quad (8)$$

where $k=2\pi n_c/\lambda$ is the wave-number, with $n_c$ the index of refraction of the cavity 240, $$w(z) = w_0\left(1 + \frac{z^2}{z_0^2}\right)^{1/2}$$

is the waist, $$R(z) = z\left(1 + \frac{z_0^2}{z^2}\right)$$

is the radius of the phase-front, and $z_0=\pi w_0^2 n_c/\lambda=kw_0^2/2$ is the Rayleigh range, a characteristic length over which the beam does not diverge significantly. This expression illustrates that the Gaussian field includes an expanding field, a linear phase, and a radial phase.

The backwards traveling total field $E_c^-$ in the cavity 240 can then be expressed as:

$$E_c^- = r_m t_f E(2L) + r_f r_m t_f E(4L) + r_f r_m r_f r_m t_f E(6L) + \ldots \quad (9)$$

$$= \frac{t_f}{r_f} \sum_{p=1}^{\infty} (r_f r_m)^p E(p2L).$$

R(−z) is used instead of R(+z) in the expressions because the wavefront of the Gaussian field flips after reflection. In other words, the Gaussian field arriving at the fiber 220 looks like it has propagated in the negative z-direction.

The total reflected field can then be expressed as:

$$E_r = r_f E_i + a_i \cdot t_f E_i, \quad (10)$$

where $a_i$ is the coupling coefficient of the field to the fiber 220. This term is included because the real total field will be the field at the other end of the fiber 220, which means that only propagating modes will be observed, and the rest of the light will radiate away in the fiber 220. To calculate the coupling coefficient, $E_c^-$ can be written in terms of the fiber modes since they form a complete set:

$$|E_c^-\rangle = \sum_n a_n |E_n\rangle = a_i |E_i\rangle + \sum_{n \neq i} a_n |E_n\rangle. \quad (11)$$

When the fiber 220 is a single-mode fiber, only the part $a_i|E_i\rangle$ will propagate in the fiber 220, and the rest will radiate away as non-propagating modes.

Multiplying both sides with the propagating mode of interest $|E_i\rangle$ provides the expression:

$$\langle E_i | E_c^-\rangle = a_i \langle E_i | E_i\rangle + \sum_{n \neq i} a_n \langle E_i | E_n\rangle = a_i \langle E_i | E_i\rangle, \quad (12)$$

where the orthogonality of the modes of the fiber has been used. Therefore, $a_i$ can be expressed as:

$$a_i = \frac{\langle E_i | E_c^-\rangle}{\langle E_i | E_i\rangle}. \quad (13)$$

The products in the coordinate space can be expressed as:

$$\langle E_i | E_i\rangle = \int_0^\infty E_0^2 \exp\left(\frac{-2r^2}{w_0^2}\right) 2\pi r\, dr = 2\pi E_0^2 \frac{w_0^2}{4}. \quad (14)$$

Using the relation:

$$\langle E_i | E_c^-\rangle = \frac{t_f}{r_f} \sum_{p=1}^{\infty} (r_f r_m)^p \langle E_i | E(p2L)\rangle \quad (15)$$

and writing for notational simplicity: $p2L=z_p$, $w(z_p)=w_p$, and $R(-z_p)=R_p$, results in the following expression:

$$\langle E_i | E(z_p)\rangle = 2\pi E_0^2 \frac{w_0}{w_p} \exp(-j\Phi_p) \int_0^\infty \exp \quad (16)$$

$$\left[-r^2\left(\frac{1}{w_0^2} + \frac{1}{w_p^2} + \frac{jkr^2}{2R_p}\right)\right] r\, dr$$

$$= 2\pi E_0^2 \frac{w_0}{w_p} \exp(-j\Phi_p) \frac{1}{2}\left(\frac{1}{w_0^2} + \frac{1}{w_p^2} + \frac{jkr^2}{2R_p}\right)^{-1}.$$

The linear phase factor $\exp(-j\Phi_p)$ can be expressed as:

$$\exp(-j\Phi_p) = \exp\{-j[kz_p - \arctan(z_p/z_0)]\} \quad (17)$$

$$= \exp(-jkz_p)\frac{1 + jz_p/z_0}{(1 + z_p^2/z_0^2)^{1/2}}.$$

Using Equation (17), and also substituting for $w_p$ and $R_p$, their definitions in terms of $z_p$ and $z_0$, results in the following expression:

$$\frac{\langle E_i | E(z_p) \rangle}{\langle E_i | E_i \rangle} = \frac{2(1 + jz_p/z_0)}{2 + (z_p/z_0)^2 + jz_p/z_0} \exp(-jkz_p) \quad (18)$$

$$= \frac{1}{1 - jz_p/2z_0} \exp(-jkz_p).$$

Hence, the coupling coefficient is calculated as:

$$a_i = \frac{\langle E_i | E_c^- \rangle}{\langle E_i | E_i \rangle} \quad (19)$$

$$= \frac{t_f}{r_f} \sum_{p=1}^{\infty} (r_f r_m)^p \frac{\langle E_i | E(p2L) \rangle}{\langle E_i | E_i \rangle}$$

$$= \frac{t_f}{r_f} \sum_{p=1}^{\infty} \frac{(r_f r_m)^p}{1 + jpL/z_0} e^{-j2kLp}.$$

Therefore, the field reflection coefficient for the FFP optical resonator 200 can be expressed as:

$$r_{FFP} = \frac{E_r}{E_i} = r_f + a_i \cdot t_f = r_f - \frac{(1 - r_f)^2}{r_f} \sum_{p=1}^{\infty} \frac{(r_f r_m)^p}{1 + jpL/z_0} e^{-j2kLp}. \quad (20)$$

A comparison of the reflection coefficient for the FFP optical resonator 200 of FIG. 6 to the reflection coefficient for the RFP optical resonator 100 of FIG. 5, i.e.,:

$$r_{RFP} = r_f - \frac{(1 - r_f)^2}{r_f} \sum_{p=1}^{\infty} (r_f r_m)^p e^{-j2kLp}, \quad (21)$$

illustrates that the reflection coefficient for the FFP optical resonator 200 has an additional factor of $1/(1+jpL/z_0)$ in the series. This additional factor has an effect on the spectral characteristics of the FFP optical resonator 200, as discussed more fully below.

Calculated Reflection Spectra of Example Optical Resonators

FIGS. 7-12 are graphs of the calculated reflection spectra for an example FFP optical resonator (shown as a solid line) and for an example RFP optical resonator (shown as a dashed line), each having two reflective elements separated by a distance L and defining a cavity therebetween filled with air. For example, the RFP optical resonator 100 of FIG. 5 has a first reflective element 110 (with reflectivity $R_f$) and a second reflective element 130 (with reflectivity $R_m$), and the FFP optical resonator 200 of FIG. 6 has a first reflective element 210 (with reflectivity $R_f$) and a second reflective element 230 (with reflectivity $R_m$). These figures illustrate a wavelength region surrounding an optical resonance at a wavelength of 1.55 microns with various reflectivities of the two reflective elements. In each of FIGS. 7A-12A, the optical resonance is shown in full scale from zero reflection to full reflection, and in FIGS. 7B-12B, the optical resonance is shown in closer detail.

Figures 8A, 8B:
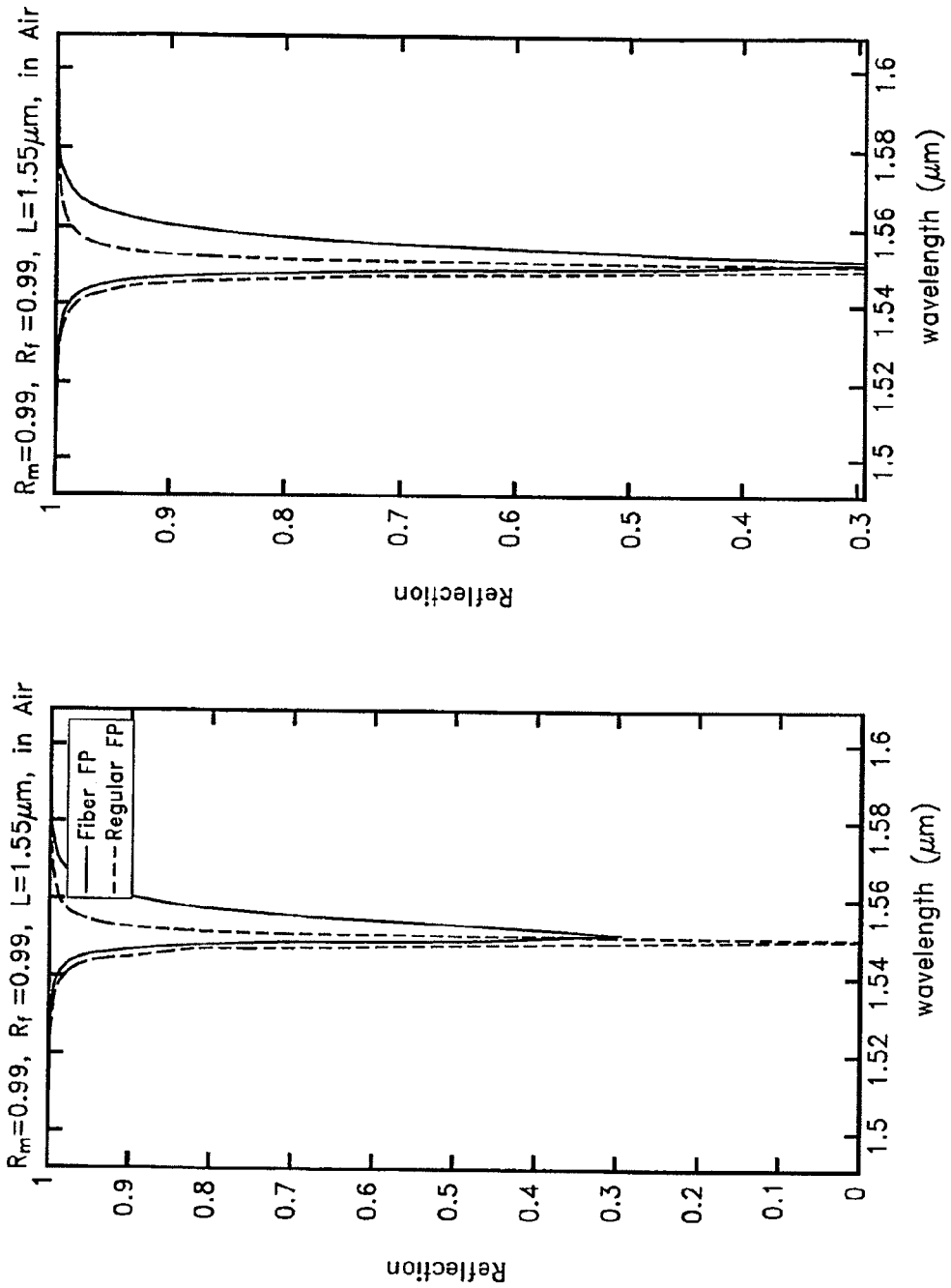
FIGS. 8A and 8B are graphs of the reflection spectra of example FFP and RFP optical resonators with a first reflective element reflectivity of $R_f=0.99$ and a second reflective element reflectivity of $R_m=0.99$ separated from one another by a distance L=1.55 microns defining a cavity therebetween filled with air.
Figure 9B:
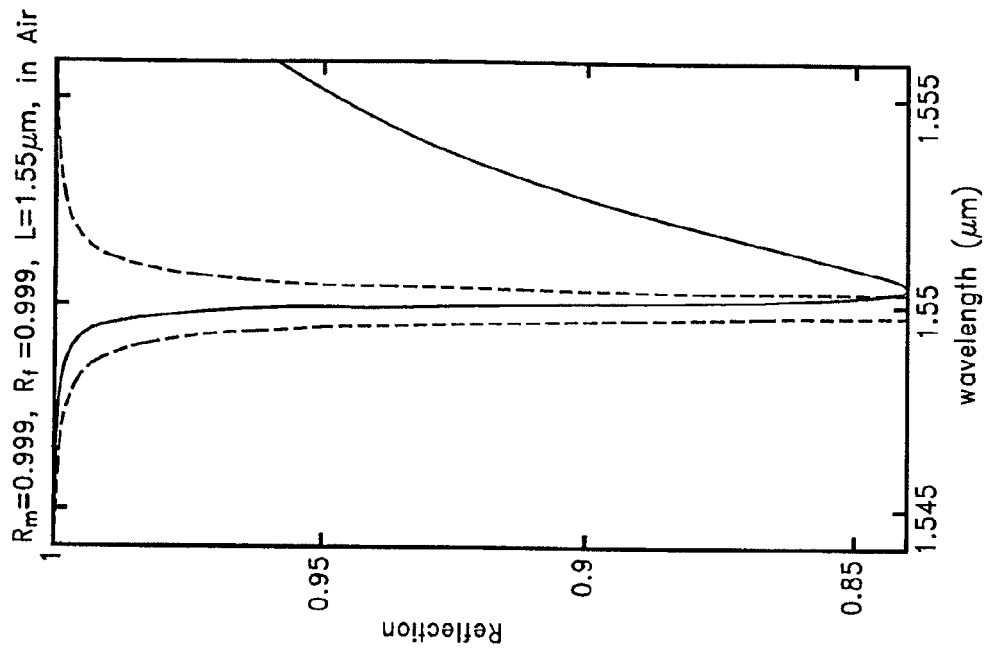
FIGS. 9A and 9B are graphs of the reflection spectra of example FFP and RFP optical resonators with a first reflective element reflectivity of $R_f=0.999$ and a second reflective element reflectivity of $R_m=0.999$ separated from one another by a distance L=1.55 microns defining a cavity therebetween filled with air.
Figure 9A:
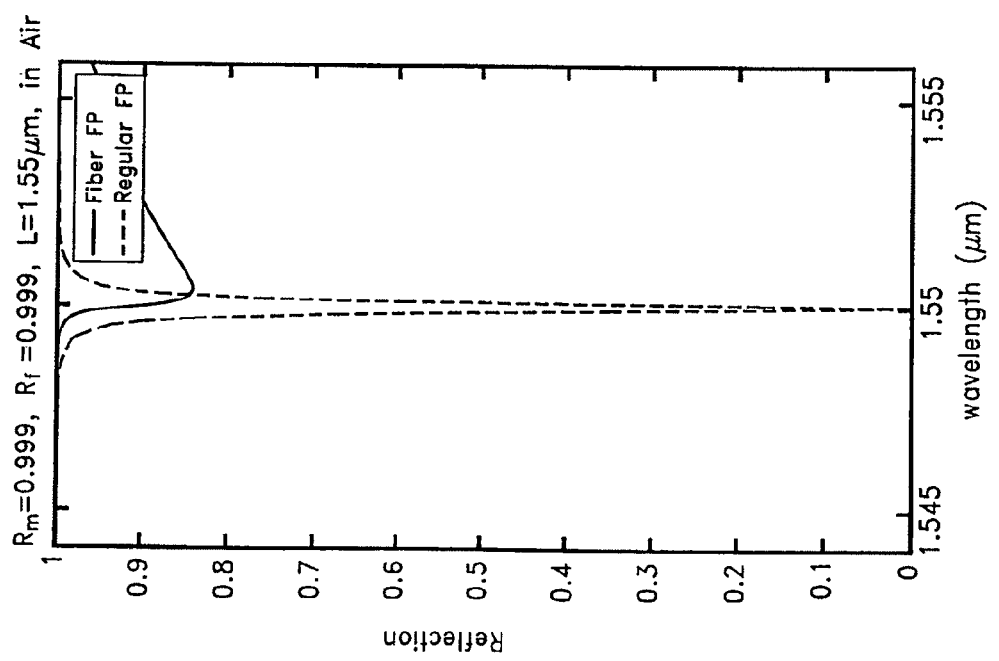
Figure 10B:
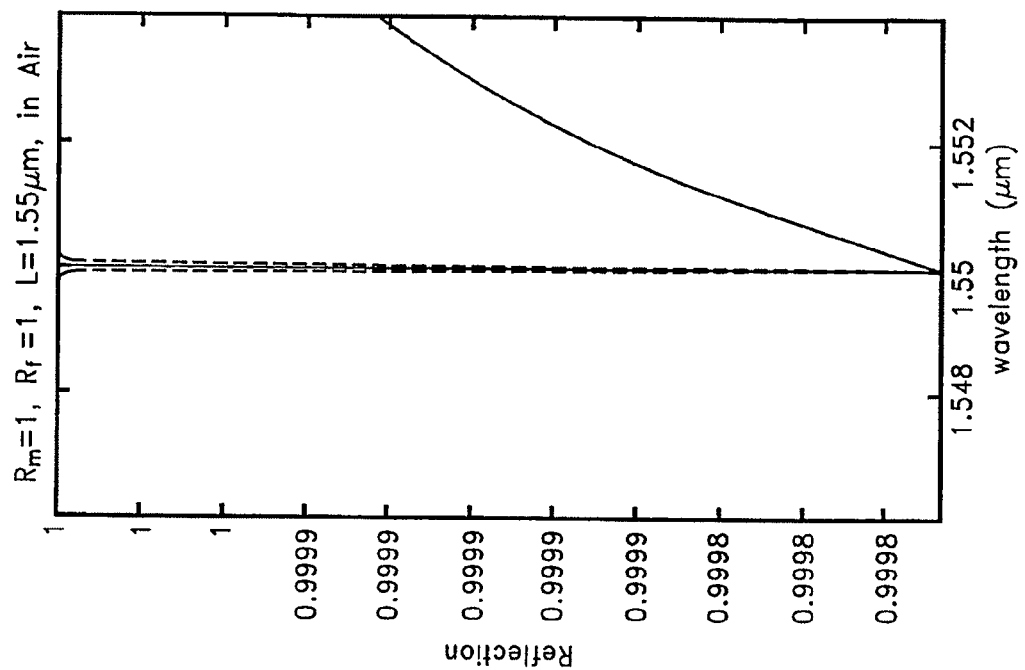
FIGS. 10A and 10B are graphs of the reflection spectra of example FFP and RFP optical resonators with a first reflective element reflectivity of $R_f=0.999999$ and a second reflective element reflectivity of $R_m=0.999999$ separated from one another by a distance L=1.55 microns defining a cavity therebetween filled with air.
Figure 10A:
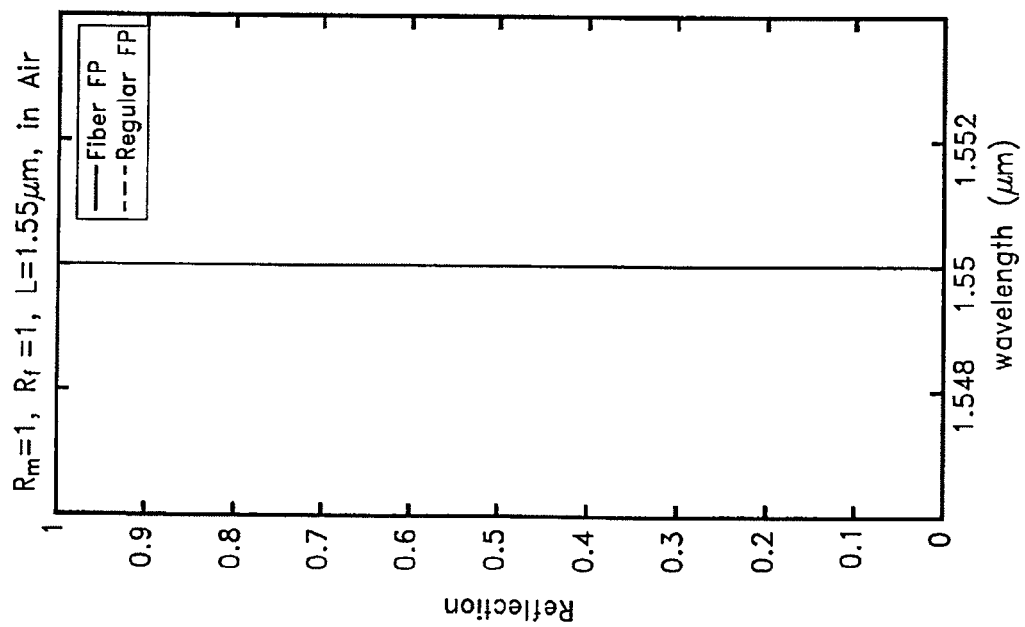

FIGS. 7A and 7B are graphs of the reflection spectra for a first reflective element reflectivity of $R_f$=0.9, and a second reflective element reflectivity of $R_m$=0.9 separated from one another by a distance L=1.55 microns. FIGS. 8A and 8B are graphs of the reflection spectra for a first reflective element reflectivity of $R_f$=0.99 and a second reflective element reflectivity of $R_m$=0.99 separated from one another by a distance L=1.55 microns. FIGS. 9A and 9B are graphs of the reflection spectra for a first reflective element reflectivity of $R_f$=0.999 and a second reflective element reflectivity of $R_m$=0.999 separated from one another by a distance L=1.55 microns. FIGS. 10A and 10B are graphs of the reflection spectra for a first reflective element reflectivity of $R_f$=0.999999 and a second reflective element reflectivity of $R_m$=0.999999 separated from one another by a distance L=1.55 microns. These figures illustrate that as the reflectivities increase, the reflection spectrum of the FFP optical resonator diverges from that of the RFP optical resonator. This correlation is due to the additional term $1/(1+jpL/z_0)$ in the reflection spectra of the FFP optical resonator, since the terms with large "p" have more significance at the higher reflectivities, thereby making the effect of this term more apparent. In the limiting case in which the reflectivities are very large, the optical resonance is very asymmetric, as shown in FIGS. 10A and 10B for $R_f$=$R_m$=0.999999.

Figure 11B:
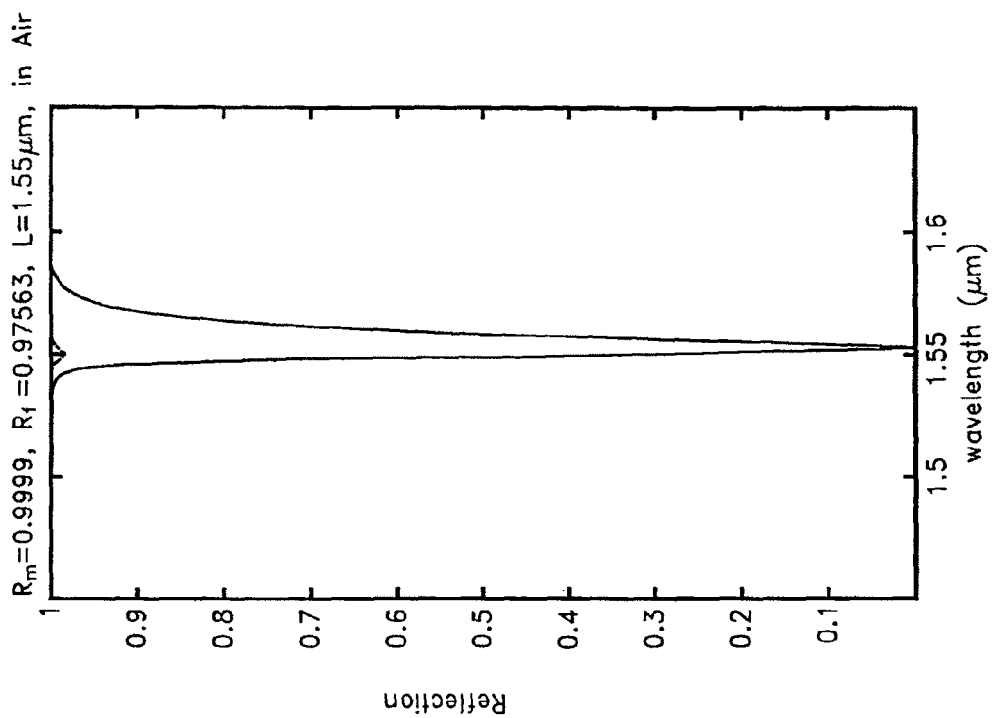
FIGS. 11A and 11B are graphs of the reflection spectra of example FFP and RFP optical resonators with a first reflective element reflectivity of $R_f=0.97563$ and a second reflective element reflectivity of $R_m=0.9999$ separated from one another by a distance L=1.55 microns defining a cavity therebetween filled with air.
Figure 11A:
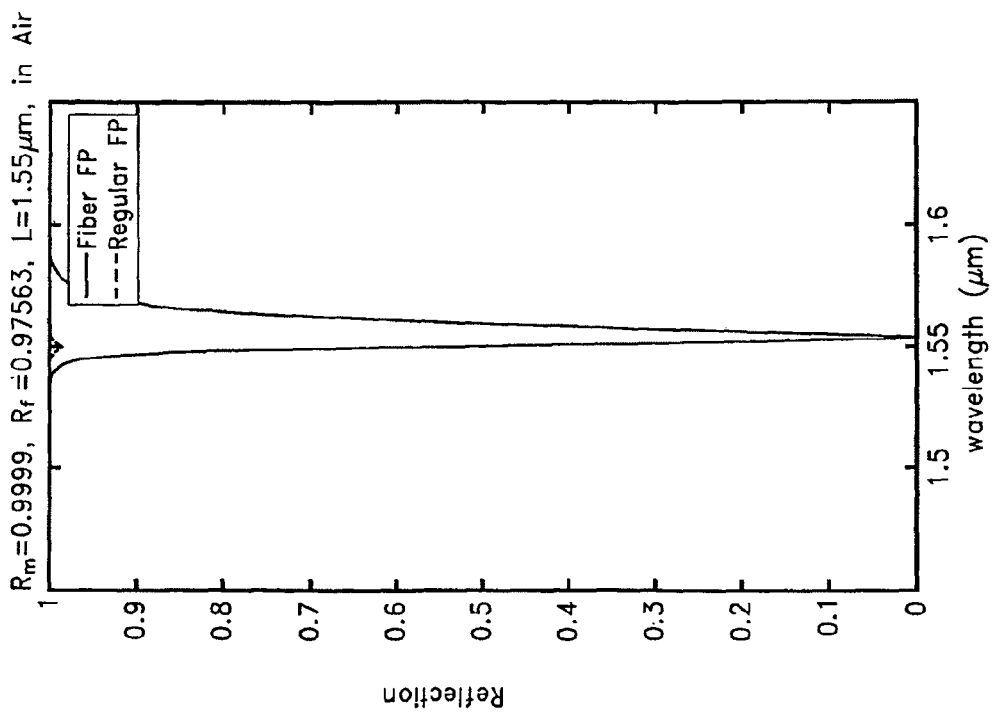

The magnitude of the optical resonance reduces with increasing reflectivities, as shown by FIGS. 7-10. Because of the non-unity coupling into the fiber, the reflectivity of the second reflective element ($R_m$) appears to be smaller in value. The effect of this asymmetry can be reduced by reducing the reflectivity of the fiber (i.e., by reducing $R_f$), as shown in FIGS. 11A and 11B for a first reflective element reflectivity of $R_f$=0.97563 and a second reflective element reflectivity of $R_m$=0.9999 separated from one another by a distance L=1.55 microns. Note that such a FFP optical resonator with this configuration provides a much more useful optical resonance as compared to the optical resonance of the corresponding RFP optical resonator.

Figure 12B:
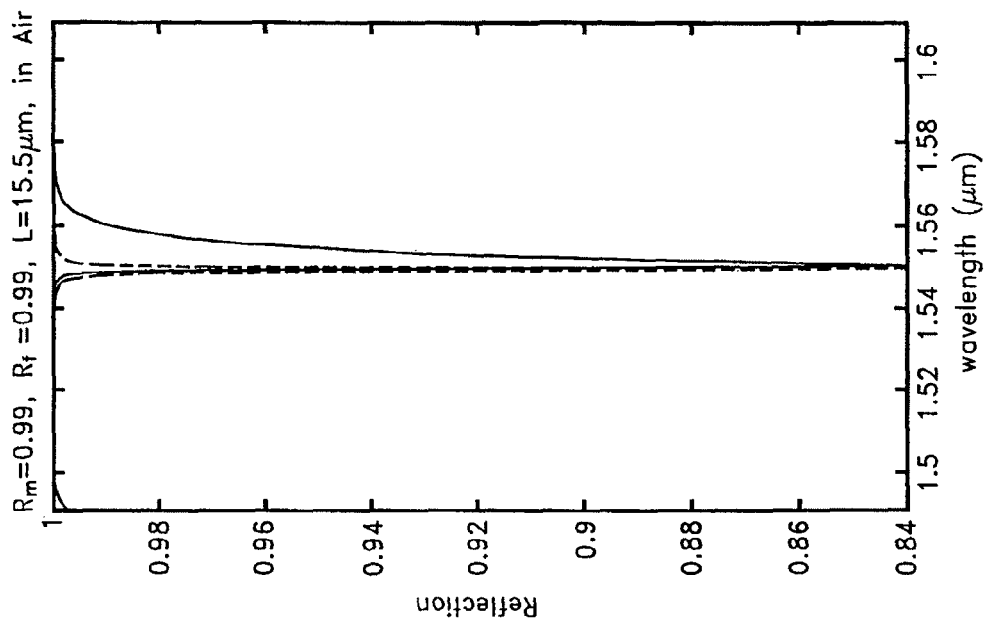
FIGS. 12A and 12B are graphs of the reflection spectra of example FFP and RFP optical resonators with a first reflective element reflectivity of $R_f=0.99$ and a second reflective element reflectivity of $R_m=0.99$ separated by a distance L=15.5 microns defining a cavity therebetween filled with air.
Figure 12A:
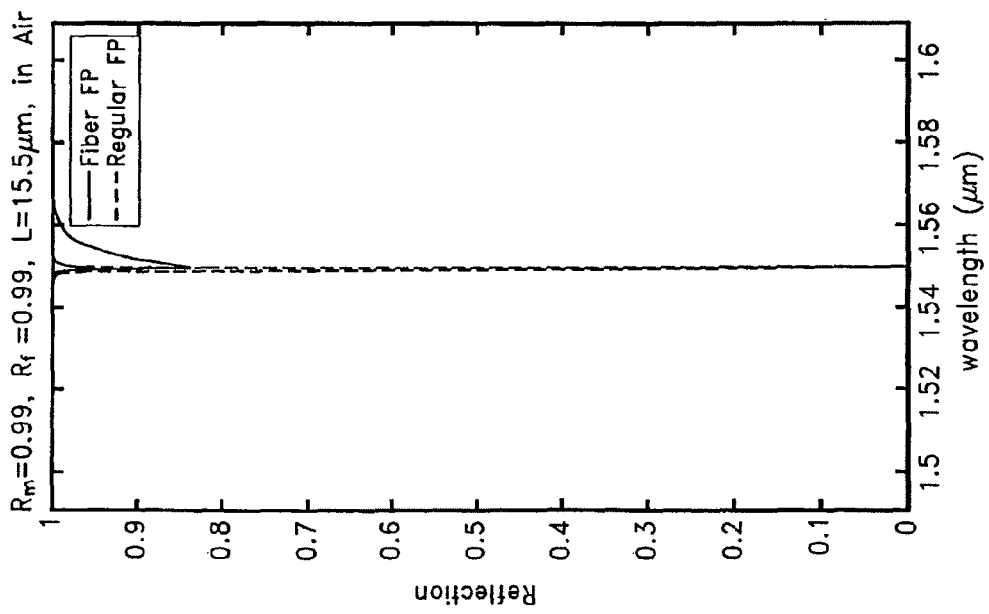

Examination of the additional term $1/(1+jpL/z_0)$ shows that the optical resonance of the FFP optical resonator diverges from that of a RFP optical resonator even for lower reflectivities, if the distance L is large. FIGS. 12A and 12B show the optical resonances for the FFP and RFP optical resonators with $R_f$=$R_m$=0.99, but with a distance between the two reflective elements which is increased by a factor of 10 (i.e., L=15.5 microns).

FIGS. 13-18 are graphs of the calculated reflection spectra for an example FFP optical resonator (shown as a solid line) and for an example RFP optical resonator (shown as a dashed line), each having two reflective elements separated by a distance L and defining a cavity therebetween filled with water. These figures illustrate a wavelength region surrounding an optical resonance at a wavelength of 1.55 microns with various reflectivities of the two reflective elements. In each of FIGS. 13A-18A, the optical resonance is shown in full scale from zero reflection to full reflection, and in FIGS. 13B-18B, the optical resonance is shown in closer detail. Note that to get the same optical resonance at a wavelength of 1.55 microns, the distance between the two reflective elements is smaller (e.g., L=1.1778 microns.

Figure 13B:
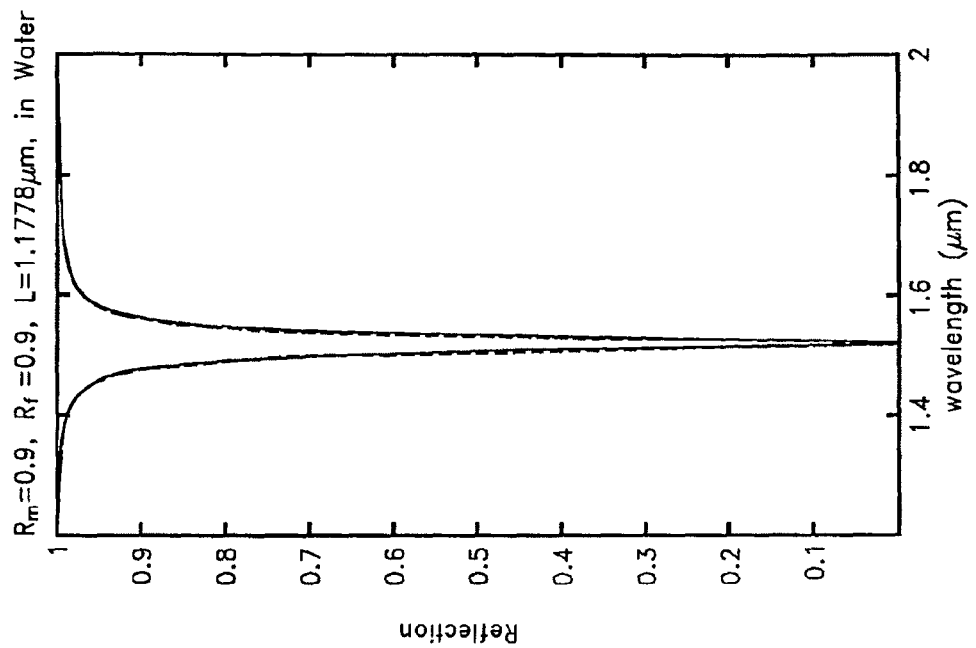
FIGS. 13A and 13B are graphs of the reflection spectra of example FFP and RFP optical resonators with a first reflective element reflectivity of $R_f=0.9$ and a second reflective element reflectivity of $R_m=0.9$ separated from one another by a distance L=1.1778 microns defining a cavity therebetween filled with water.
Figure 13A:
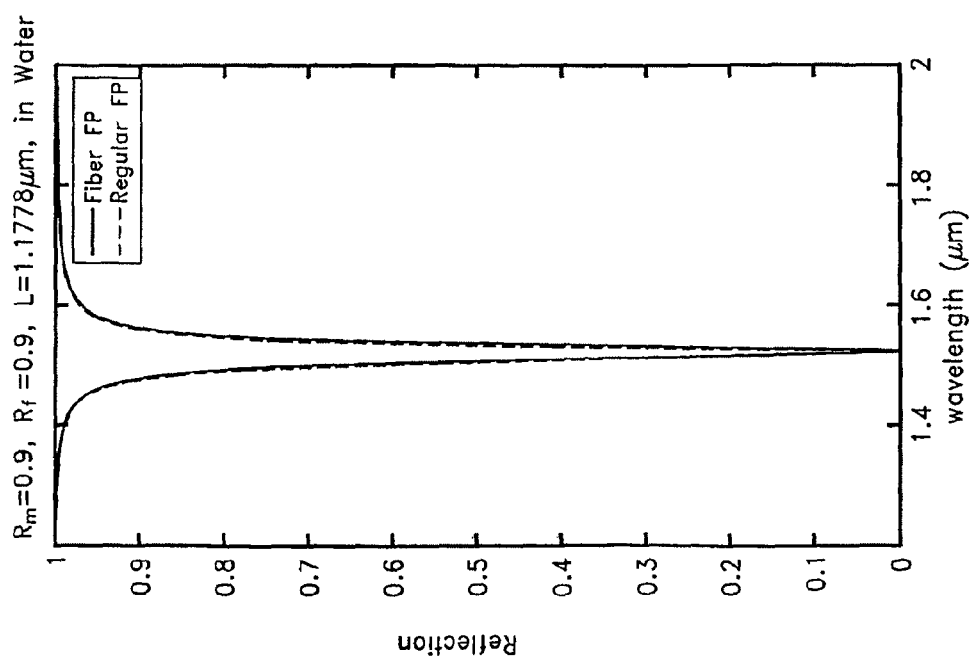
Figure 14B:
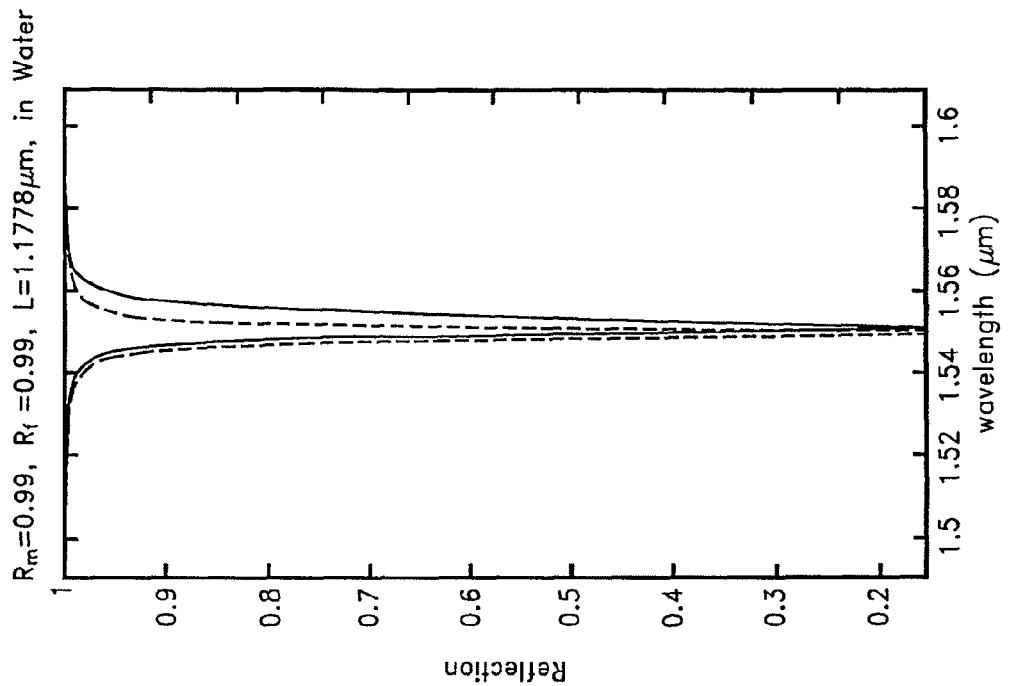
FIGS. 14A and 14B are graphs of the reflection spectra of example FFP and RFP optical resonators with a first reflective element reflectivity of $R_f=0.99$ and a second reflective element reflectivity of $R_m=0.99$ separated from one another by a distance L=1.1778 microns defining a cavity therebetween filled with water.
Figure 14A:
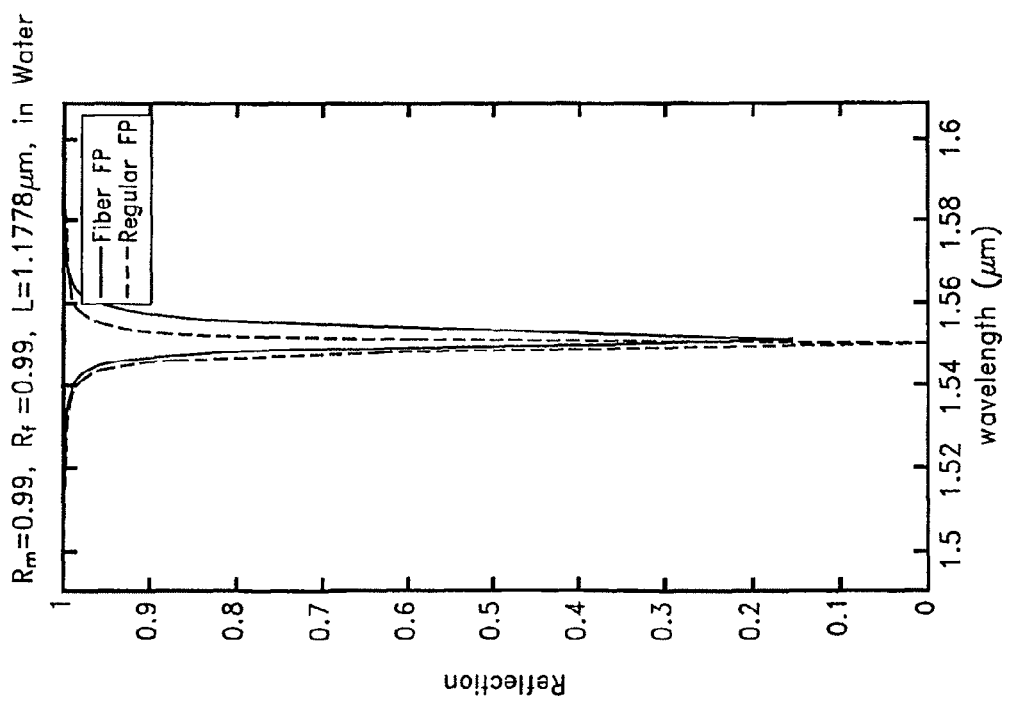
Figure 15B:
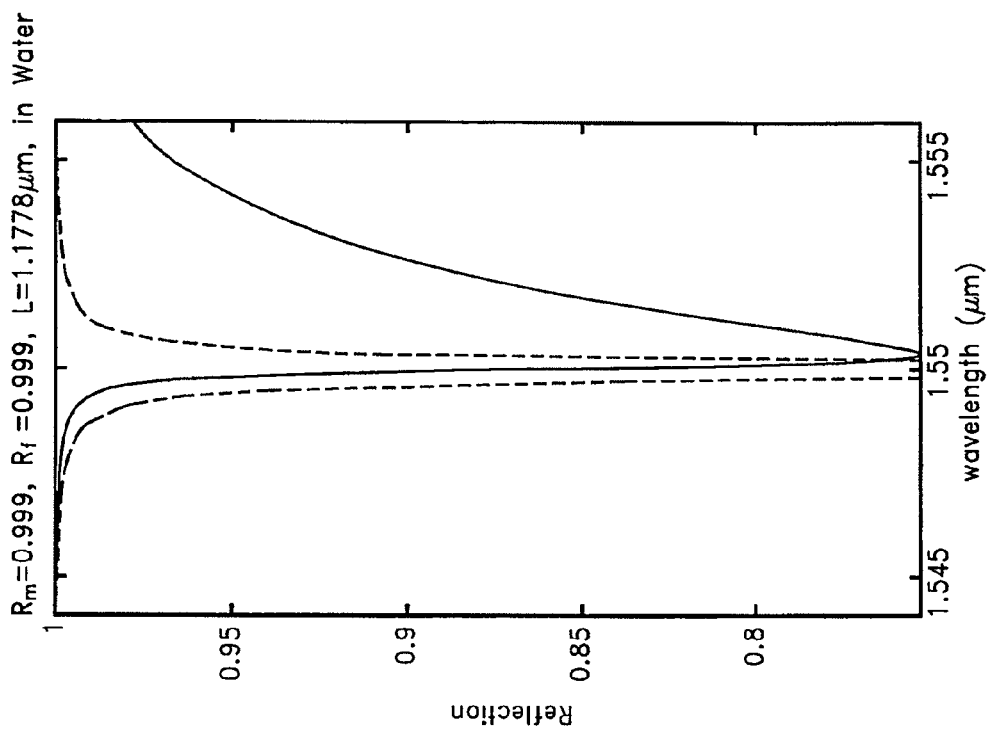
FIGS. 15A and 15B are graphs of the reflection spectra of example FFP and RFP optical resonators with a first reflective element reflectivity of $R_f=0.999$ and a second reflective element reflectivity of $R_m=0.999$ separated from one another by a distance L=1.1778 microns defining a cavity therebetween filled with water.
Figure 15A:
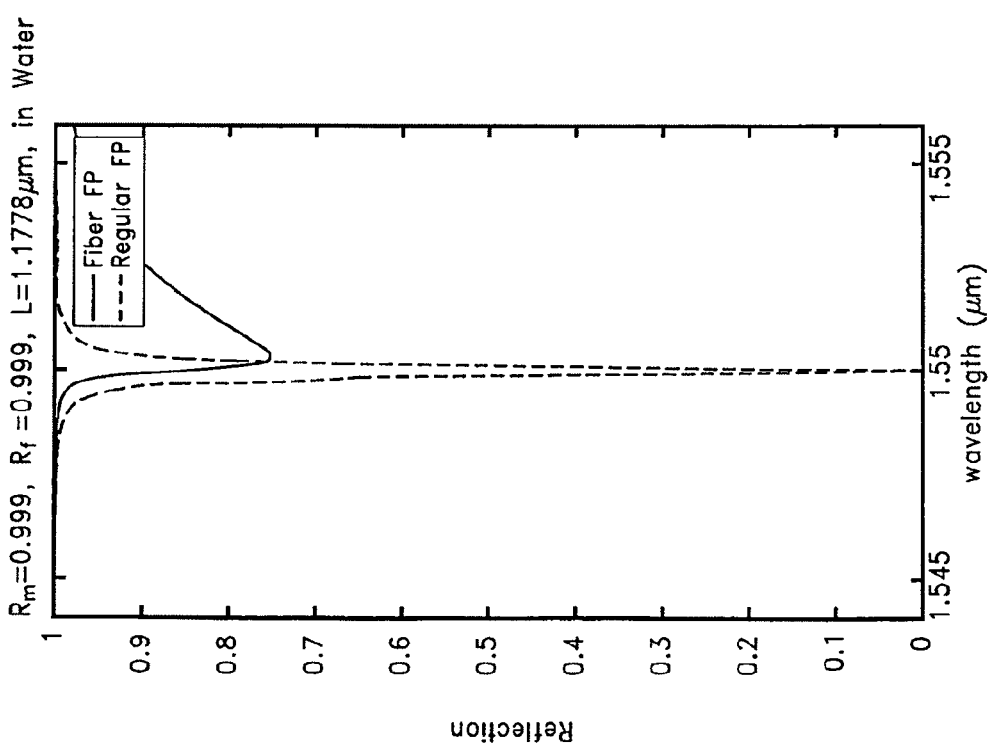
Figures 16A, 16B:
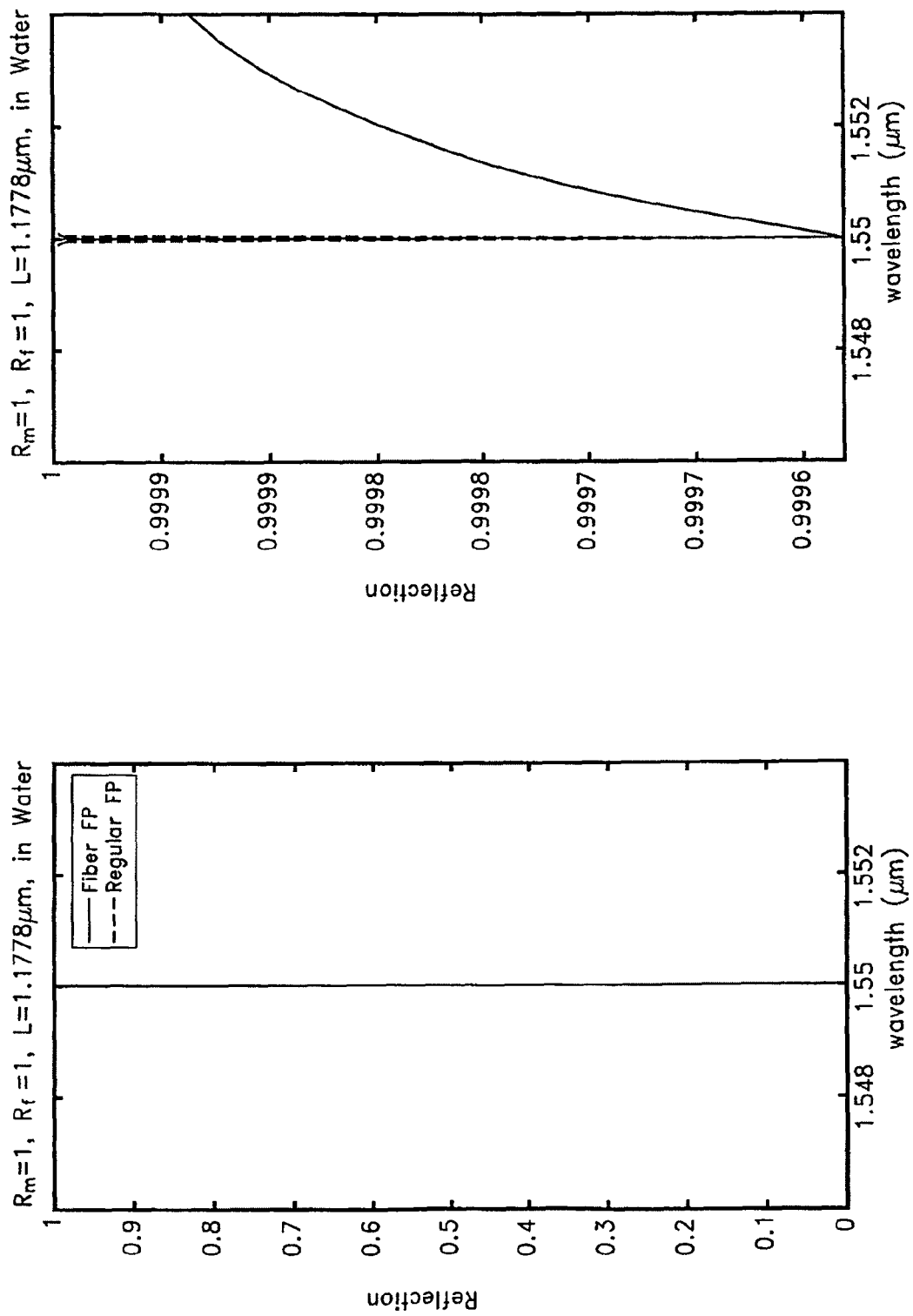
FIGS. 16A and 16B are graphs of the reflection spectra of example FFP and RFP optical resonators with a first reflective element reflectivity of $R_f=0.999999$ and a second reflective element reflectivity of $R_m=0.999999$ separated from one another by a distance L=1.1778 microns defining a cavity therebetween filled with water.

FIGS. 13A and 13B are graphs of the reflection spectra for first and second reflective element reflectivities of $R_f$=$R_m$=0.9, and a distance L=1.1778 microns. FIGS. 14A and 14B are graphs of the reflection spectra for first and second reflective element reflectivities of $R_f$=$R_m$=0.99, and a distance L=1.1778 microns. FIGS. 15A and 15B are graphs of the reflection spectra for first and second reflective element reflectivities of $R_f=R_m=0.999$, and a distance $L=1.1778$ microns. FIGS. 16A and 16B are graphs of the reflection spectra for first and second reflective element reflectivities of $R_f=R_m=0.999999$ and a distance $L=1.1778$ microns. As shown above for a cavity filled with air, these figures illustrate that as the reflectivities increase, the reflection spectrum of the FFP optical resonator diverges from that of the RFP optical resonator. In the limiting case in which the reflectivities are very large, the optical resonance is very asymmetric, as shown in FIGS. 16A and 16B for $R_f=R_m=0.999999$.

Figure 17B:
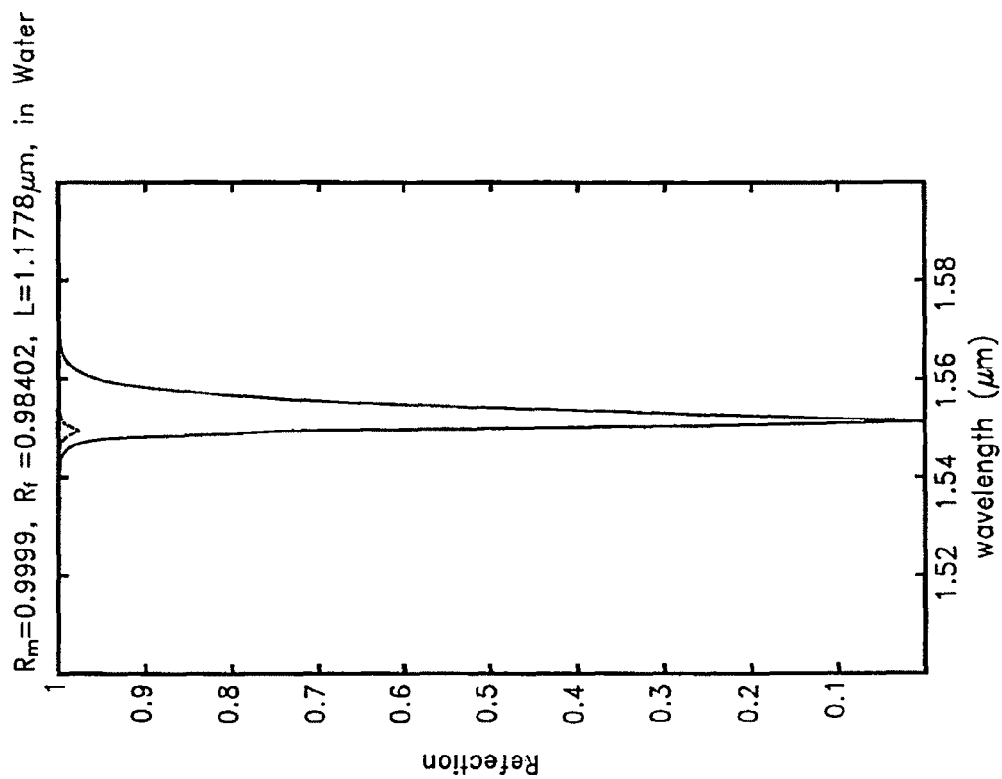
FIGS. 17A and 17B are graphs of the reflection spectra of example FFP and RFP optical resonators with a first reflective element reflectivity of $R_f=0.98402$ and a second reflective element reflectivity of $R_m=0.9999$ separated from one another by a distance L=1.1778 microns defining a cavity therebetween filled with water.
Figure 17A:
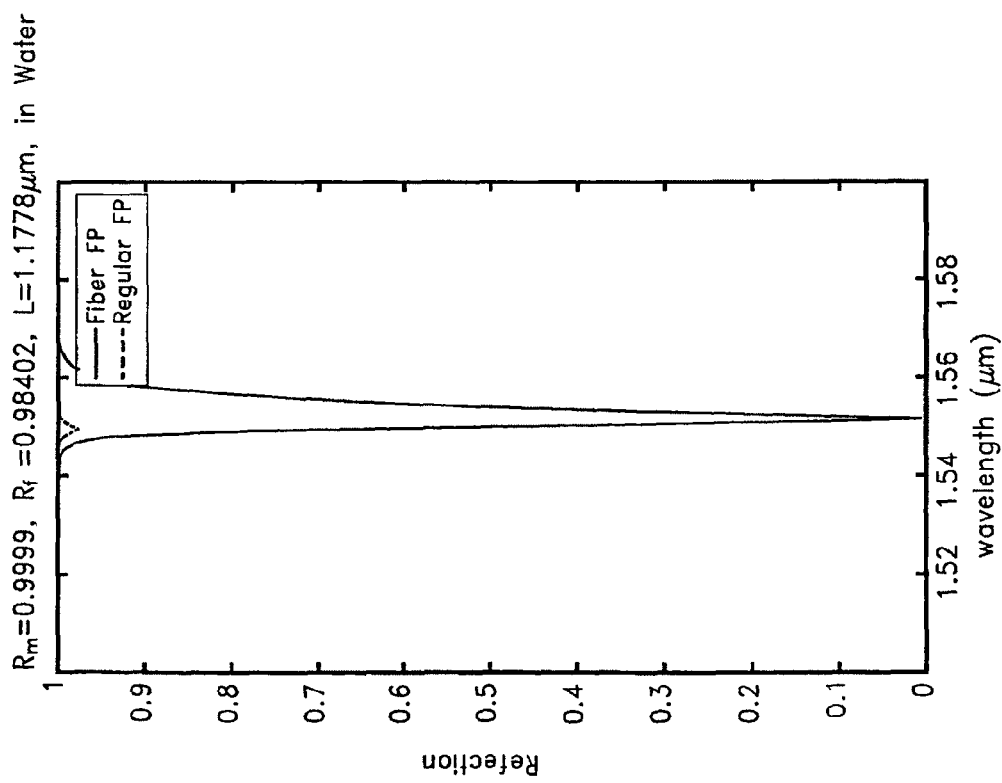
Figure 18B:
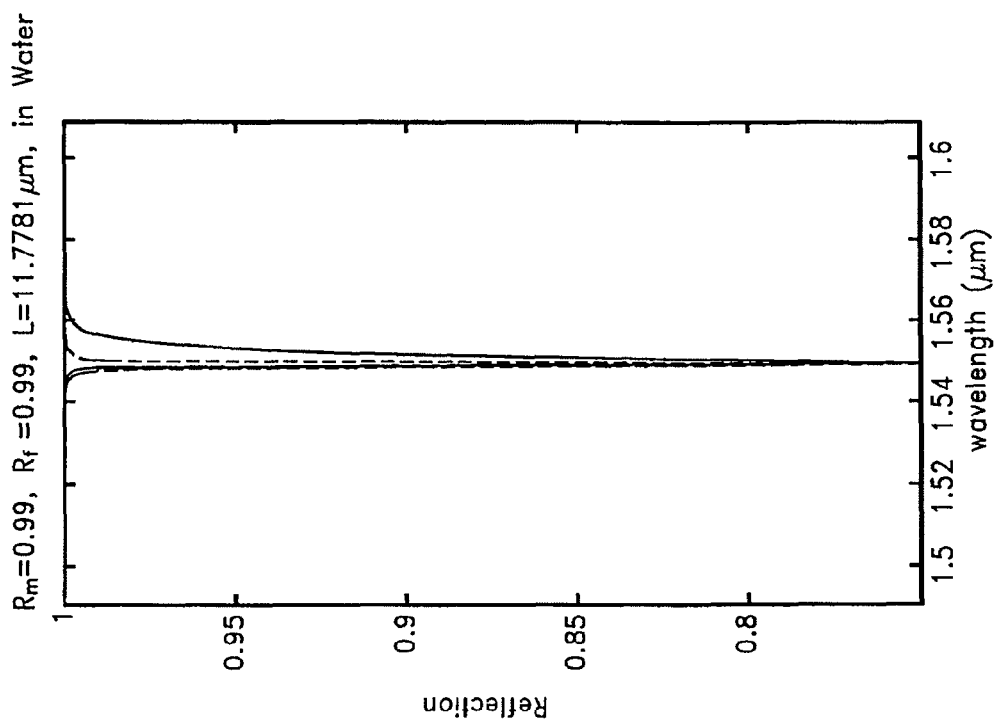
FIGS. 18A and 18B are graphs of the reflection spectra of example FFP and RFP optical resonators with a first reflective element reflectivity of $R_f=0.99$ and a second reflective element reflectivity of $R_m=0.99$ separated by a distance L=11.7781 microns defining a cavity therebetween filled with water.
Figure 18A:
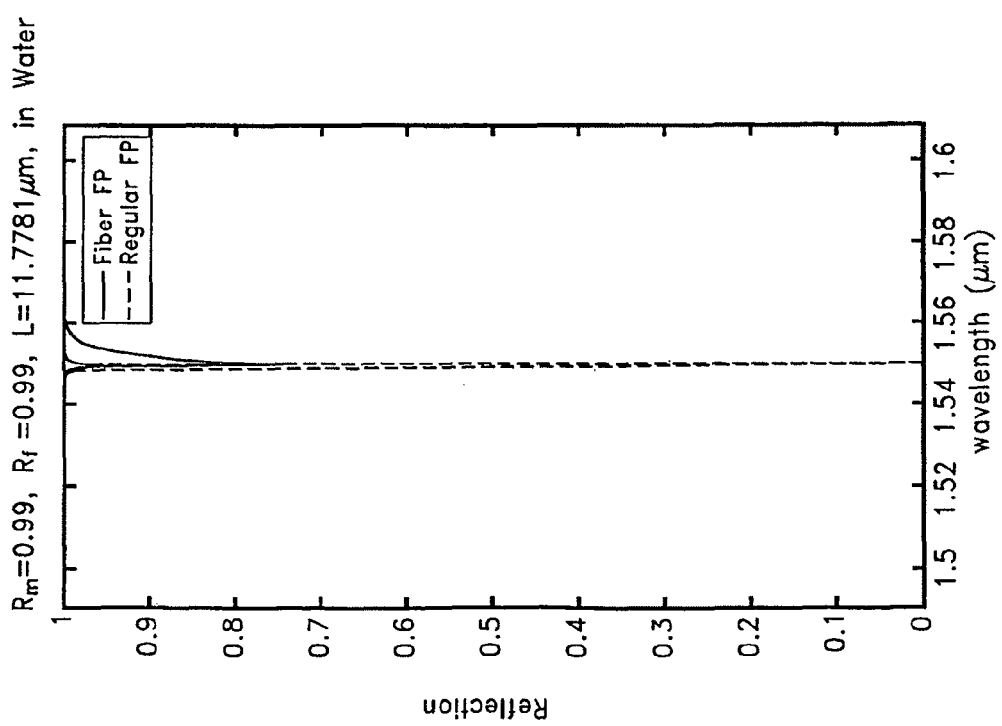

In addition, the effect of the asymmetry can be reduced for a cavity filled with water by reducing the reflectivity of the fiber (i.e., by reducing $R_f$), as shown in FIGS. 17A and 17B for a first reflective element reflectivity of $R_f=0.98402$ and a second reflective element reflectivity of $R_m=0.9999$ separated from one another by a distance $L=1.1778$ microns. FIGS. 18A and 18B show the optical resonances for the FFP and RFP optical resonators with $R_f=R_m=0.99$ for a cavity filled with water, but with a distance between the two reflective elements which is increased by a factor of 10 (i.e., $L=11.7781$ microns).

Exact and Approximate Solutions

In contrast to a RFP optical resonator, the summation in the FFP optical resonator case does not have a closed solution in terms of simple analytical functions. However, the series can be written in terms of a Lerch transcendent $\Phi_L(z,s,\alpha)$, which has an integral representation.

Using the Lerch transcendent, the series S of Equation (20) can be expressed as:

$$S = \sum_{p=1}^{\infty} \frac{(r_f r_m)^p}{1 + jpL/z_0} e^{-j2kLp} \quad (22)$$

$$= -j\frac{z_0}{L} r_f r_m e^{-j2kL} \Phi_L\left(r_f r_m e^{-j2kL}, 1, 1 - j\frac{z_0}{L}\right).$$

Among several integral representations of the Lerch transcendent, there is the relation:

$$\Phi_L(z, 1, \alpha) = \int_0^\infty \frac{e^{-\alpha t}}{1 - ze^{-t}} dt \quad (23)$$

for $Re(\alpha) > 0$, $|z| \leq 1$, and $z \neq 1$.

Using Equation (23), the series S can be expressed as:

$$S = -j\frac{z_0}{L} r_f r_m e^{-j2kL} \Phi_L\left(r_f r_m e^{-j2kL}, 1, 1 - j\frac{z_0}{L}\right) \quad (24)$$

$$= -j\frac{z_0}{L} r_f r_m e^{-j2kL} \int_0^\infty \frac{e^{-(1-j\frac{z_0}{L})t}}{1 - r_f r_m e^{-j2kL} e^{-t}} dt$$

$$= -j\frac{z_0}{L} r_f r_m \int_0^\infty \frac{e^{j\frac{z_0}{L}t}}{e^{j2kL} e^t - r_f r_m} dt$$

$$= r_f r_m \int_0^1 \frac{1}{u^{-jL/z_0} e^{j2kL} - r_f r_m} du$$

Using the assumption that $$\lim_{u \to 0^+} u^{-jL/z_0} = 0.$$

Hence, the field reflection coefficient becomes:

$$f_{FFP} = r_f - \frac{(1-r_f)^2}{r_f} r_f r_m \int_0^1 \frac{1}{u^{-jL/z_0} e^{j2kL} - r_f r_m} du \quad (25)$$

$$= \int_0^1 \frac{r_f u^{-jL/z_0} e^{j2kL} - r_m}{u^{-jL/z_0} e^{j2kL} - r_f r_m} du,$$

which can be written as:

$$r_{FFP} = \int_0^1 \frac{r_f e^{j\theta(u)} - r_m}{e^{j\theta(u)} - r_f r_m} du, \quad (26)$$

where $$\theta(u) = 2kL - \frac{L}{z_0} \ln u.$$

By comparing Equation (26) with the corresponding expression for the RFP optical resonator, i.e.:

$$r_{RFP} = \frac{r_f e^{j\theta} - r_m}{e^{j\theta} - r_f r_m}, \quad (27)$$

where $\theta=2kL$, it can be seen that the two expressions are quite similar. The integral in Equation (26) is more efficient to calculate with a computer compared to the series representation in Equation (20), which for high reflectivities has a very large number of terms before there is convergence.

The integral solution of Equation (26) is an exact solution, which does not provide an easy interpretation for the asymmetric resonance of the FFP optical resonator. It is therefore desirable to find an approximate solution in terms of simple analytic functions. The problem term in the series which causes the absence of a simple solution is $1/(1+jpL/z_0)$, which can be approximated as:

$$\frac{1}{1 + jpL/z_0} = \frac{1 - jpL/z_0}{1 + (pL/z_0)^2} \approx \frac{1 - jpL/z_0}{2^{pL/z_0}}, \text{ for } p \geq 0. \quad (28)$$

The term in this form provides a closed form solution for the series as:

$$S = \sum_{p=1}^{\infty} \frac{(r_f r_m)^p}{1 + jpL/z_0} e^{-j2kLp} \quad (29)$$

$$\approx \sum_{p=1}^{\infty} (r_f r_m 2^{-L/z_0})^p e^{-j2kLp} - j\frac{L}{z_0} \sum_{p=1}^{\infty} (r_f r_m 2^{-L/z_0})^p p e^{-j2kLp}$$

$$= \frac{r_f r_m 2^{-L/z_0}}{e^{j2kLp} - r_f r_m 2^{-L/z_0}} - j\frac{L}{z_0} \frac{r_f r_m 2^{-L/z_0} e^{j2kLp}}{(e^{j2kLp} - r_f r_m 2^{-L/z_0})^2}.$$

Therefore, the approximate reflection coefficient of the FFP optical resonator is:

$$r_{FFP} \approx r_f - \frac{(1-r_f)^2}{r_f} \frac{r_f \tilde{r}_m}{e^{j2kLp} - r_f \tilde{r}_m}\left(1 - j\frac{L}{z_0}\frac{e^{j2kLp}}{e^{j2kLp} - r_f \tilde{r}_m}\right), \quad (30)$$

where $\tilde{r}_m = r_m 2^{-L/z_0}$ is the effective reflectivity of the second reflective element.

This formula can be used to generate an analytical fit in the calculated graphs of FIGS. 7-18. The formula is not such a good approximation for high reflectivities, because $2^{-pL/z_0}$ tends to decay too fast at high p values compared to $[1+(pL/z_0)^2]^{-1}$.

Using $\tilde{r}_{RFP}$, the reflection coefficient for a RFP optical resonator with mirror reflectivities of $r_f$ and $\tilde{r}_m = r_m 2^{-L/z_0}$, Equation (30) can be written as:

$$r_{FFP} \approx \tilde{r}_{RFP} - \frac{1}{2z_0}\frac{\partial}{\partial k}\tilde{r}_{RFP}. \quad (31)$$

Equation (26) can be further manipulated to obtain a useful relation. By taking the derivative of Equation (26) with respect to the wave number, the following relation is obtained:

$$\frac{\partial}{\partial k}r_{FFP} = 2z_0(r_{RFP} - r_{FFP}). \quad (32)$$

Equation (32) can be used to show that the maximum contrast (i.e., where the resonance dip has a reflectivity of zero) is obtained when $R_f \approx R_m 2^{-L/z_0}$. However, the increased contrast comes at the expense of sensitivity. Therefore, when designing a sensor based on a FFP optical resonator in certain embodiments, optimum values for the reflectivities $R_f$ and $R_m$ and the cavity length L are advantageously chosen so that the sensitivity and the dynamic range are both within the desired ranges.

First Example of Utilization of the Asymmetric Optical Resonances

In certain embodiments, the asymmetric optical resonances are advantageously used in a dual-measurement method which advantageously provides increased dynamic range.

Figure 19:
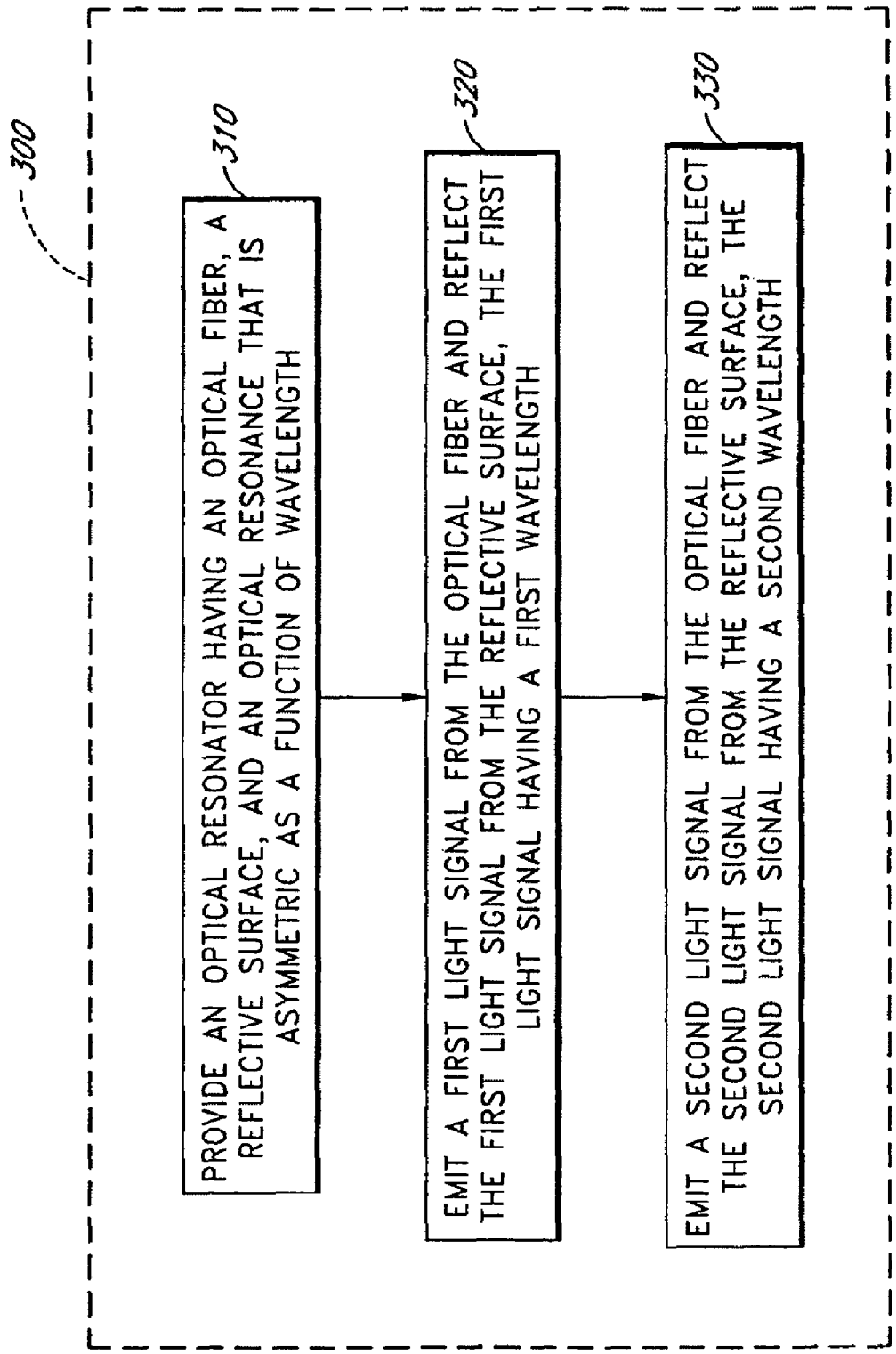
FIG. 19 is a flowchart of an example method for utilizing an optical resonator compatible with certain embodiments described herein.

FIG. 19 is a flowchart of an example method 300 for utilizing an optical resonator 200 compatible with certain embodiments described herein. The method 300 comprises providing an optical resonator 200 in an operational block 310. The optical resonator 200 comprises a reflective element 230 and an optical fiber 220 positioned relative to the reflective element 230 such that light emitted from the optical fiber 220 is reflected by the reflective element 230. While FIG. 19 and the corresponding description of the method 300 herein refer to the optical resonator structure schematically illustrated by FIG. 6, other configurations of the optical resonator 200 are also compatible with the method 300.

Figure 20A:
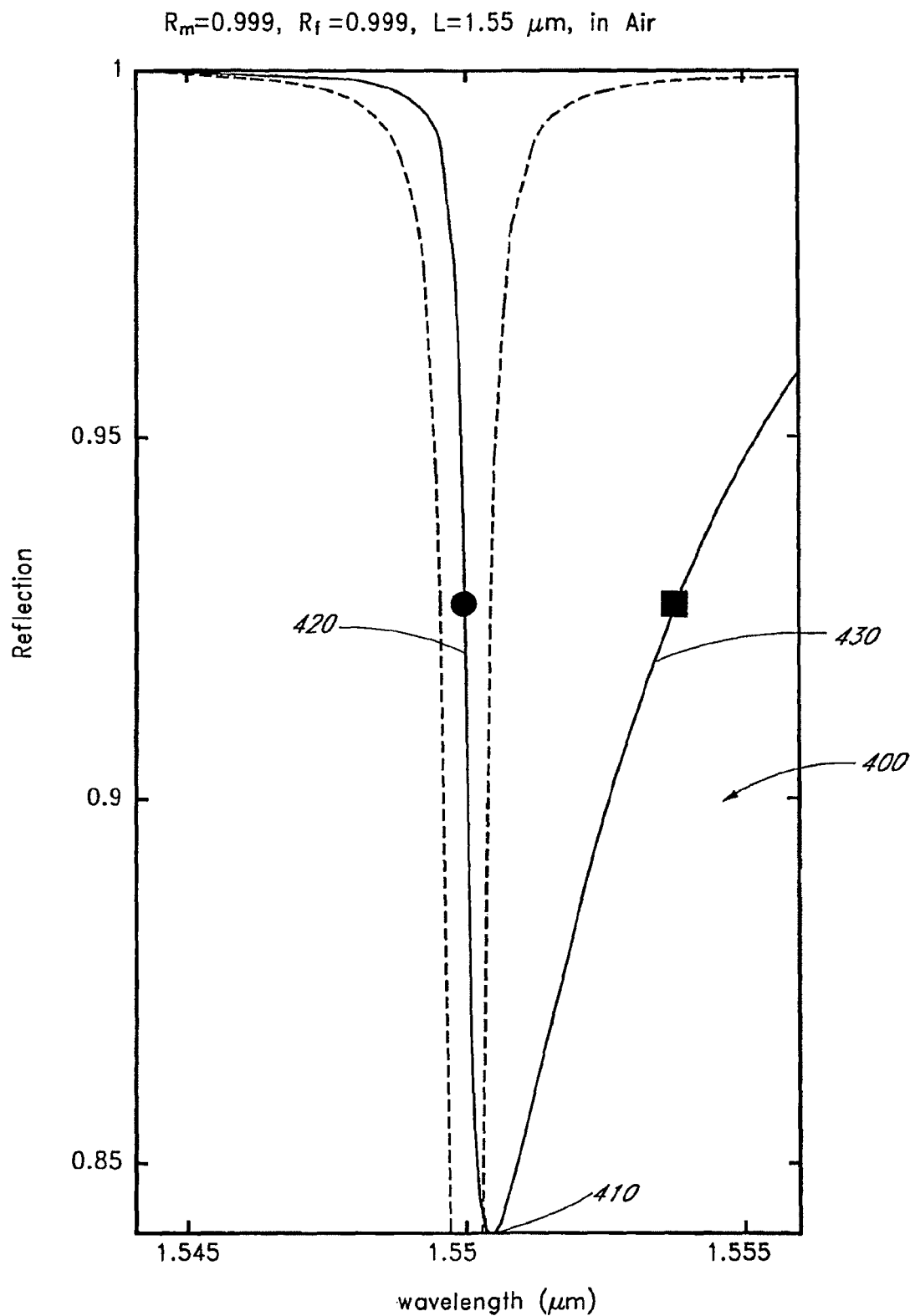
FIG. 20A is a graph of an example optical resonance with an asymmetric lineshape (shown as a solid line) with a first side and a second side that has a different slope than does the first side.

The optical resonator 200 has an optical resonance with a resonance lineshape 400 that is asymmetric as a function of wavelength. The resonance lineshape 400 has a magnitude or minimum reflectivity 410 at a resonance wavelength, a first side 420 with wavelengths below the resonance wavelength, and a second side 430 with wavelengths above the resonance wavelength. The second side 430 is less steep than is the first side 420. FIG. 20A is a graph of an example optical resonance with an asymmetric lineshape 400 with a first side 420 and a second side 430 that has a different slope than does the first side 420. The first side 420 has a much higher slope than does the second side 430. Note that FIG. 20A shows the same asymmetric optical resonance that was graphed in FIG. 9.

The method 300 further comprises emitting a first light signal from the optical fiber 220 and reflecting the first light signal from the reflective element 230 in an operational block 320. The first light signal has a first wavelength on the first side 420 of the resonance lineshape 400. The method 300 further comprises emitting a second light signal from the optical fiber 220 and reflecting the second light signal from the reflective element 230 in an operational block 330. The second light signal has a second wavelength on the second side 430 of the resonance lineshape 400.

In certain embodiments, the first light signal and the second light signal are emitted from the optical fiber 220 concurrently. In certain other embodiments, the first light signal and the second light signal are emitted from the optical fiber 220 sequentially. In certain such embodiments, the first light signal is emitted from the optical fiber 220 before the second light signal is emitted from the optical fiber 220.

For example, in certain embodiments, the method 300 is used to detect acoustic waves. The optical resonator 200 can be a component of an acoustic sensor, as described more fully below, in which the acoustic sensor comprises a housing that substantially surrounds at least a portion of the optical resonator and is mechanically coupled to the optical resonator such that the optical resonance is responsive to acoustic waves incident upon the housing. Upon exposing the acoustic sensor to acoustic waves, the acoustic waves are detected by sensing the displacement of the reflective element 230 relative to the optical fiber 220 caused by the acoustic waves.

The most sensitive measurements of the displacement of the reflective element 230 can be done at a wavelength slightly below the resonance wavelength (e.g., 1.55 microns), for example, at the wavelength denoted in FIG. 20A by the circle. However, since the bandwidth over which such a measurement can be performed is limited due to the high slope of the first side 420 of the resonance lineshape 400, such a measurement would have a small dynamic range. To increase the dynamic range, a measurement can be performed at a second wavelength slightly above the resonance wavelength in a region of the second side 430 with a smaller slope, for example, at the wavelength denoted in FIG. 20A by the square. In certain such embodiments, by performing two measurements at the two wavelengths along the asymmetric lineshape 400 of the optical resonance 400, small signals that require high sensitivity can be measured at a wavelength corresponding to the high slope side 420 of the asymmetric resonance lineshape 400, and large signals, which do not require very high sensitivities, can be measured at a wavelength corresponding to the small slope side 430 of the asymmetric resonance lineshape 400. In this way, certain embodiments advantageously increase the dynamic range of signals that can be measured.

Figure 20B:
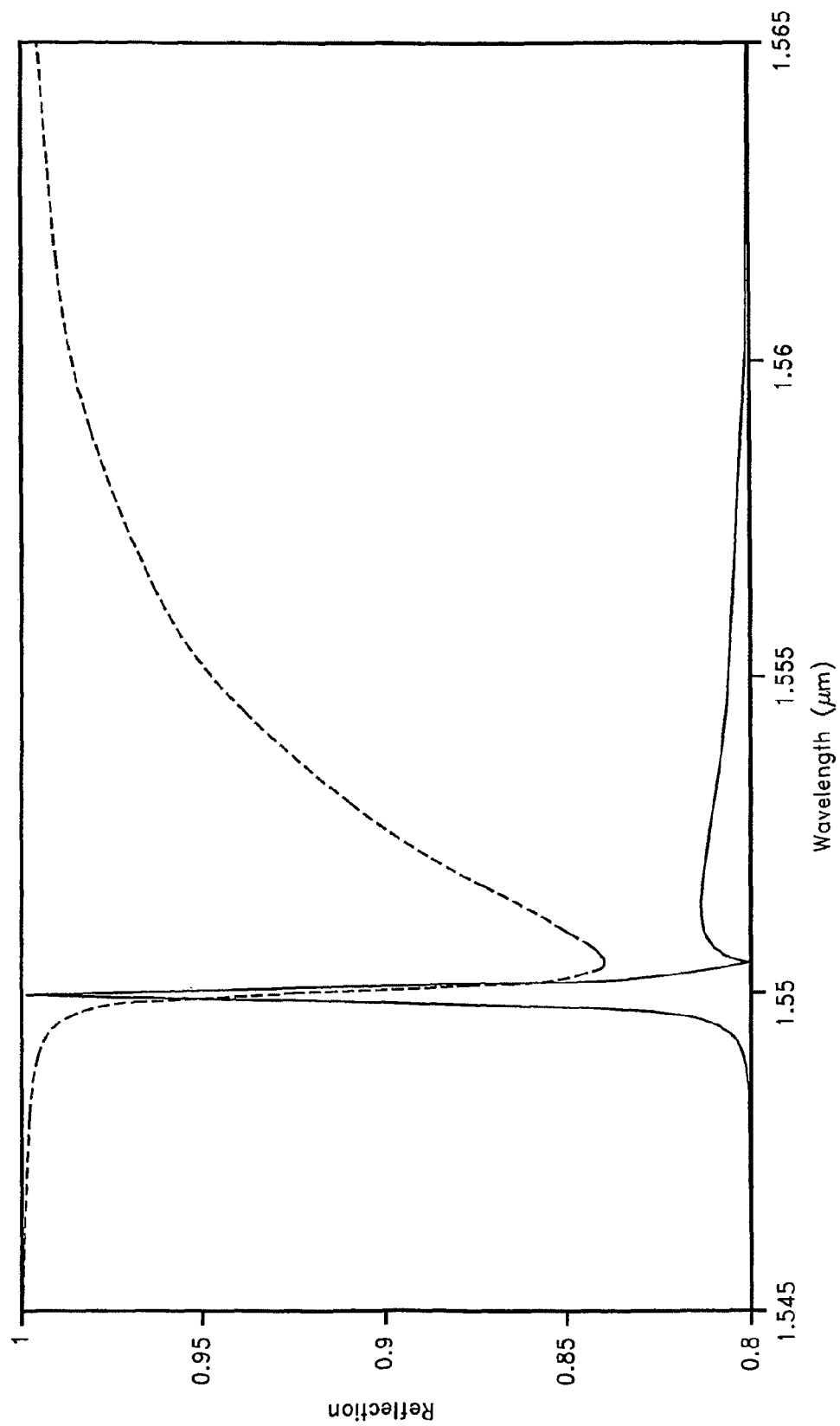
FIG. 20B is a graph of an example optical resonance with an asymmetric lineshape (shown as a dashed line) and the sensitivity to displacement (shown as a solid line).

FIG. 20B is a graph of an example optical resonance with an asymmetric lineshape 400 (shown as a dashed line) and the sensitivity to displacement (shown as a solid line) in arbitrary units. The sensitivity is proportional to the slope of the resonance. Hence, the steeper the resonance, the higher the sensitivity, as illustrated by FIG. 20B.

Second Example of Utilization of the Asymmetric Optical Resonances

Figure 21A:
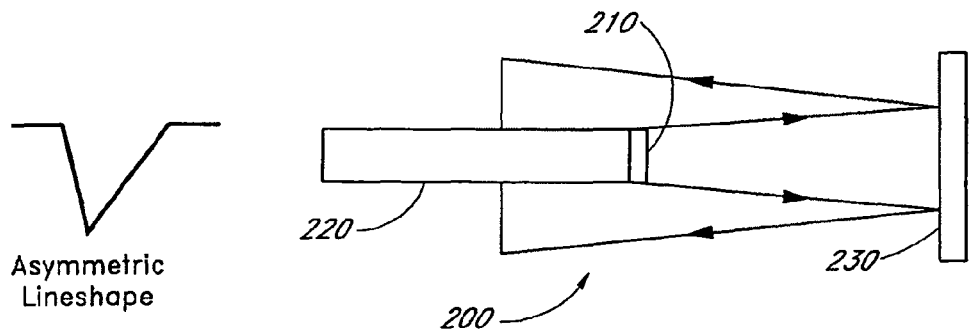
FIGS. 21A-21C schematically illustrate three example FFP optical resonators with an optical fiber having a first reflective element and with the second reflective element having different curvatures.
Figure 21B:
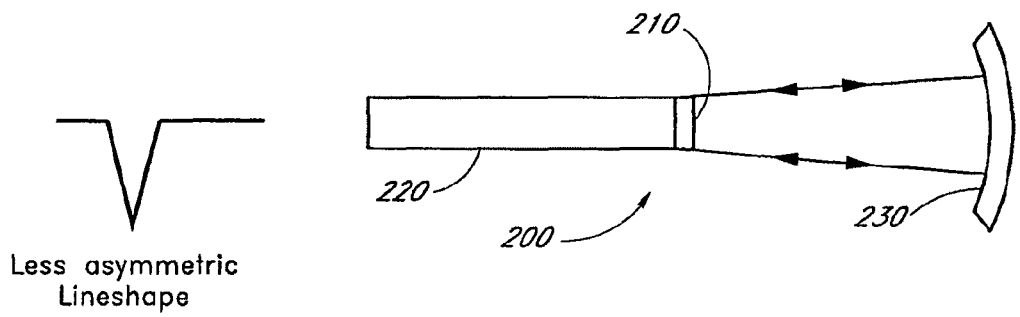
Figure 21C:
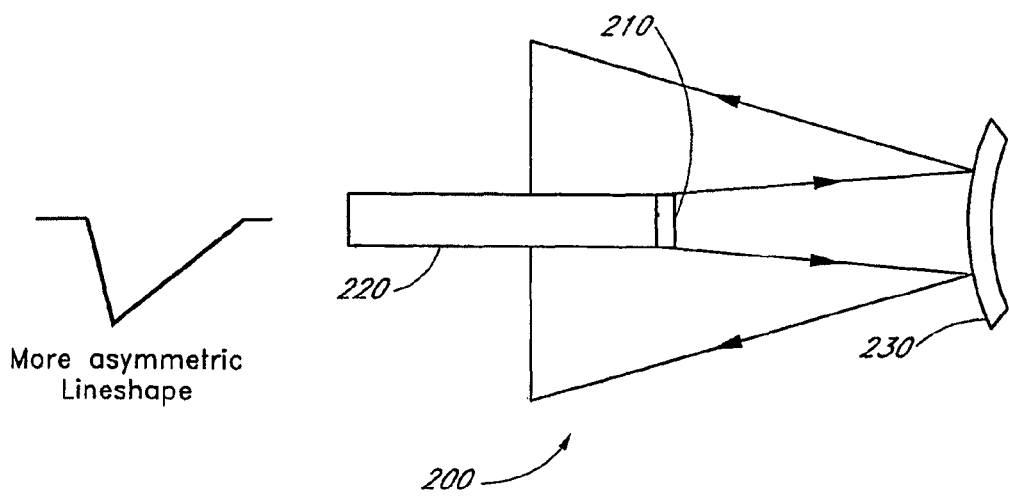

In certain embodiments, the dependence of the degree of asymmetry on the curvature of the second reflective element can be used to monitor the curvature of the second reflective element. FIGS. 21A-21C schematically illustrate three example FFP optical resonators 200 with an optical fiber 220 having a first reflective element 210 and with the second reflective element 230 having different curvatures. In FIG. 21A, the second reflective element 230 is substantially flat (i.e., infinite radius of curvature) and parallel to the first reflective element 210. Because of the divergence of the beam, the reflected beam mode does not match to the mode of the optical fiber 220, giving rise to the asymmetric lineshape of the optical resonance, schematically illustrated on the left side of FIG. 21A.

In FIG. 21B, the second reflective element 230 is concave with a finite radius of curvature. The mismatch between the reflected beam mode and the mode of the optical fiber 220 is smaller than in the configuration of FIG. 21A, thereby giving rise to a less asymmetric lineshape of the optical resonance, schematically illustrated on the left side of FIG. 21B. In FIG. 21C, the second reflective element 230 is convex with a finite radius of curvature. This configuration results in even more divergence of the reflected beam than in the configuration of FIG. 21A, so that there is a greater mismatch between the mode of the beam and the optical fiber 220, thereby giving rise to an even more asymmetric lineshape of the optical resonance, schematically illustrated by the left side of FIG. 21C.

Figure 22:
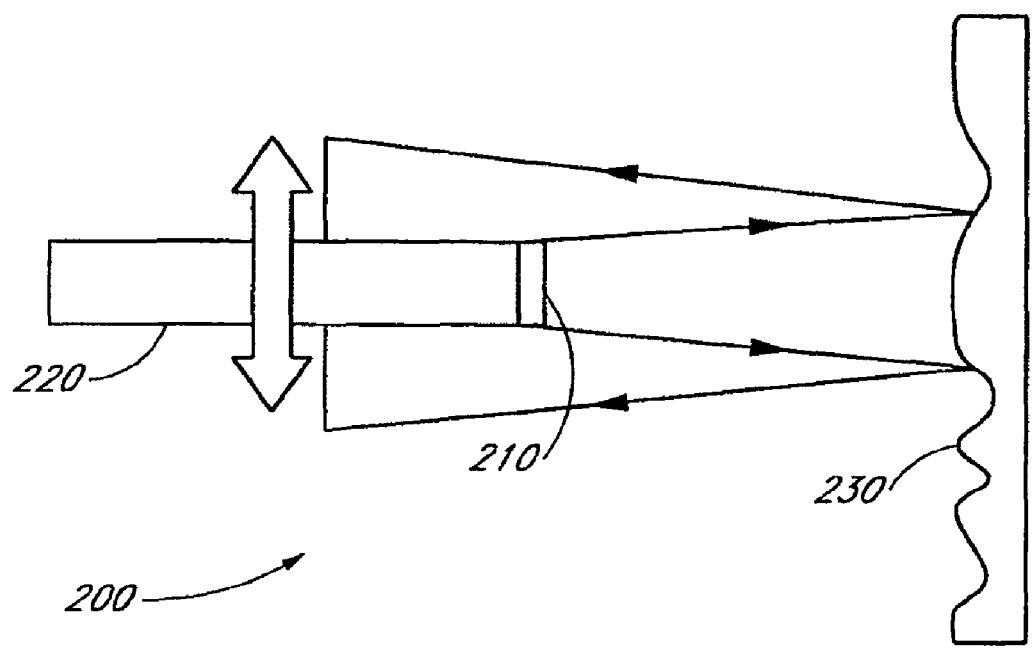
FIG. 22 schematically illustrates an example optical resonator having an optical fiber that is scanned across a reflective surface to be analyzed.

In certain embodiments, as schematically illustrated in FIGS. 21A-21C, the asymmetry of the lineshape is dependent on the curvature of the second reflective element 230. In certain other embodiments, the magnitude of the optical resonance is also dependent on the curvature of the second reflective element 230. This dependence of the asymmetry, the magnitude, or both the asymmetry and the magnitude, of the optical resonance lineshape can be exploited in various ways, as schematically illustrated by FIG. 22. In the configuration of FIG. 22, the optical fiber 220 is scanned across a reflective surface to be analyzed which serves as the second reflective element 230 of the optical resonance 200. By monitoring the lineshape of the optical resonance, information regarding the local topology of the reflective surface, such as the size and curvature of its bumps, can be advantageously obtained.

In certain embodiments, the dependence of the optical resonance lineshape on the curvature of the second reflective element 230 can be used in an accelerometer to detect acceleration. In certain embodiments in which the second reflective element 230 is sufficiently flexible to change curvature in response to acceleration (e.g., a flexible diaphragm), the direction of curvature depends on the direction of the acceleration of the second reflective element 230 and the amount of curvature depends on the magnitude of acceleration of the second reflective element 230. The acceleration of the irradiated portion of the second reflective element 230 can be detected by measuring corresponding changes of the resonance lineshape due to changes of the curvature of the second reflective element 230. Thus, in certain embodiments, the resonance lineshape can be used to monitor the acceleration of the optical resonator 200.

In certain embodiments, the dependence of the optical resonance lineshape on the curvature of the second reflective element 230 can be used to dynamically measure pressure waves or any other signal (e.g., stress in the second reflective element 230) which causes displacements or changes of curvature of the second reflective element 230.

Third Example of Utilization of the Asymmetric Optical Resonances

As shown in FIGS. 7-18, the magnitude of the asymmetric lineshape is not maximized even when the reflectivities of the first reflective element and the second reflective element are equal to one another. Because the optical fiber does not receive all of the reflected power due to the mode mismatch, the effective reflectivity of the second reflective element appears to be less than its actual value.

FIG. 23A schematically illustrates a regular Gires-Tournois (RGT) optical resonator 500 having a first reflective element 510 and a second reflective element 520. The second reflective element 520 has a high reflectivity such that substantially all of the light incident on the second reflective element 520 is reflected back, so the reflection spectrum of the optical resonator 500 is substantially flat across a range of wavelengths. Such a RGT optical resonator 500 can be used to generate a large time delay for light that has a wavelength close to a wavelength of one of the optical resonances of the optical resonator 500.

In certain embodiments, the optical resonator 500 is tunable such that at least one of the first reflective element 510 and the second reflective element 520 is movable to change the distance between the two. By changing the distance between the two reflective elements, the wavelength (or frequency) of the optical resonance can be tuned, so that the wavelength (or frequency) at which there occurs a large time delay of the light is tuned. In the configuration of the RGT optical resonator 500 schematically illustrated by FIG. 23A, the reflection spectrum is substantially flat, so there are no resonance dips or other features that can be tracked to monitor the distance between the first reflective element 510 and the second reflective element 520 during tuning. The phase of the reflected light can provide some information, but monitoring this phase utilizes more complex methods than merely monitoring the amplitude of the reflected light.

FIG. 23B schematically illustrates a fiber Gires-Tournois (FGT) optical resonator 550 compatible with certain embodiments described herein. The FGT optical resonator 550 of FIG. 23B comprises an optical fiber 560 optically coupled to the first reflective element 510. As described above, by virtue of the optical fiber 560 not receiving all of the reflected power due to the mode mismatch, the effective reflectivity of the second reflective element will be smaller, and an optical resonance with an asymmetric lineshape can be observed. Thus, the distance between the first reflective element 510 and the second reflective element 520 can be monitored. For example, in configurations without the optical fiber (e.g., having two regular mirrors), the reflection spectrum is flat and does not exhibit a dip at any specific wavelength. However, in configurations having the optical fiber, the reflection spectrum has a dip having a wavelength that is proportional to the distance between the mirrors. Thus, when the distance between the mirrors 510, 520 is changed, the wavelength of the dip changes correspondingly. By tracking the wavelength changes in the reflection spectra, the distance between the two mirrors 510, 520 can advantageously be monitored.

Example Acoustic Sensors Utilizing Photonic Crystal Structures

Present-day optical resonators which have sufficient quality factors to achieve sensitivities comparable to those of piezoelectric transducers are typically large and impractical to fabricate, install, align, and operate. In contrast, certain embodiments described herein comprise an acoustic sensor based on optical resonators formed by photonic crystal slab (PCS) structures with apertures which are orders of magnitude smaller than those of traditional optical cavities. The small size of certain such embodiments provides a sensitivity comparable to that of piezoelectric and capacitive displacement sensors for frequencies larger than about 10 kHz. Photonic crystal structures comprising a pair of PCSs can be used to provide notch and bandpass transmission and reflection filters, and such structures can be utilized in acoustic sensor systems compatible with various applications (e.g., oil exploration, undersea acoustic wave detection). In certain embodiments, the acoustic sensors described herein utilize the asymmetric lineshape of the optical resonance formed in part by the PCS structures to detect acoustic waves.

Figure 24:
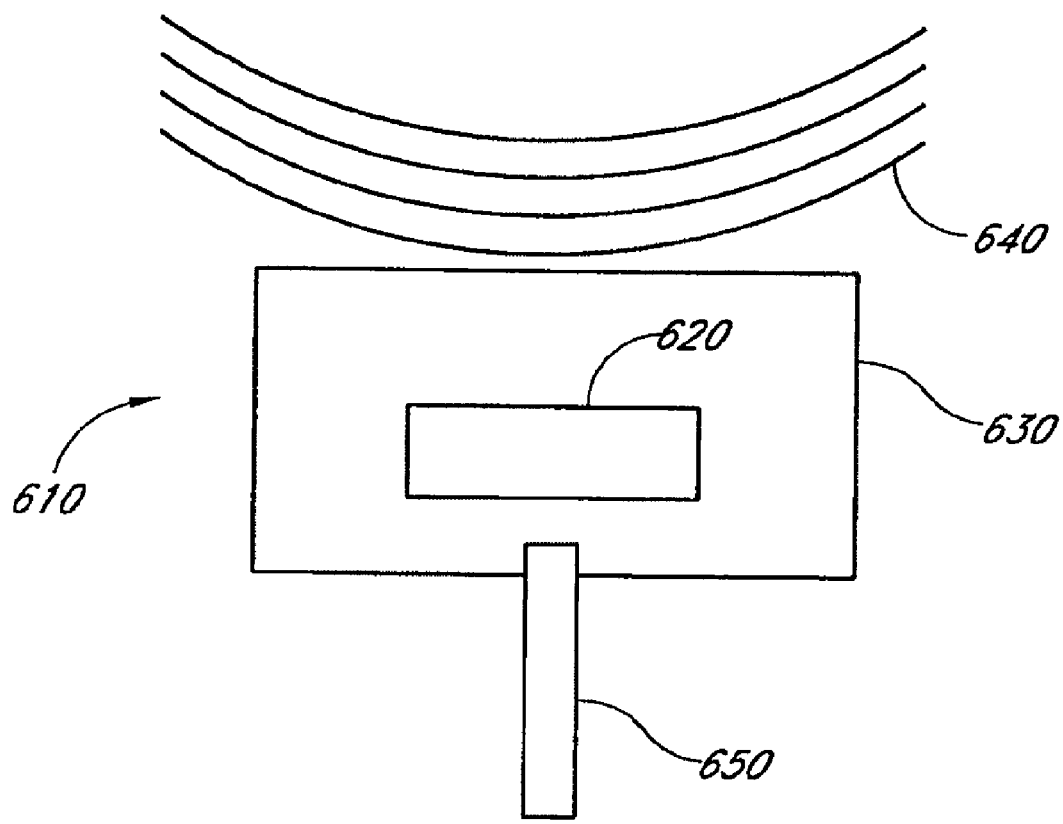
FIG. 24 schematically illustrates an example acoustic sensor compatible with certain embodiments described herein.

FIG. 24 schematically illustrates an example acoustic sensor 610 compatible with certain embodiments described herein. The acoustic sensor 610 comprises at least one photonic crystal structure 620. The acoustic sensor 610 further comprises a housing 630 substantially surrounding the at least one photonic crystal structure 620 and mechanically coupled to the at least one photonic crystal structure 620. As illustrated by FIG. 24, in certain embodiments, the acoustic sensor 610 further comprises an optical fiber 650 optically coupled to the at least one photonic crystal structure 620 to form an optical resonator having at least one optical resonance with a resonance frequency and a resonance lineshape. At least one of the resonance frequency and the resonance lineshape is responsive to acoustic waves 640 incident upon the housing 630.

Single PCS Structures

Figure 25A:
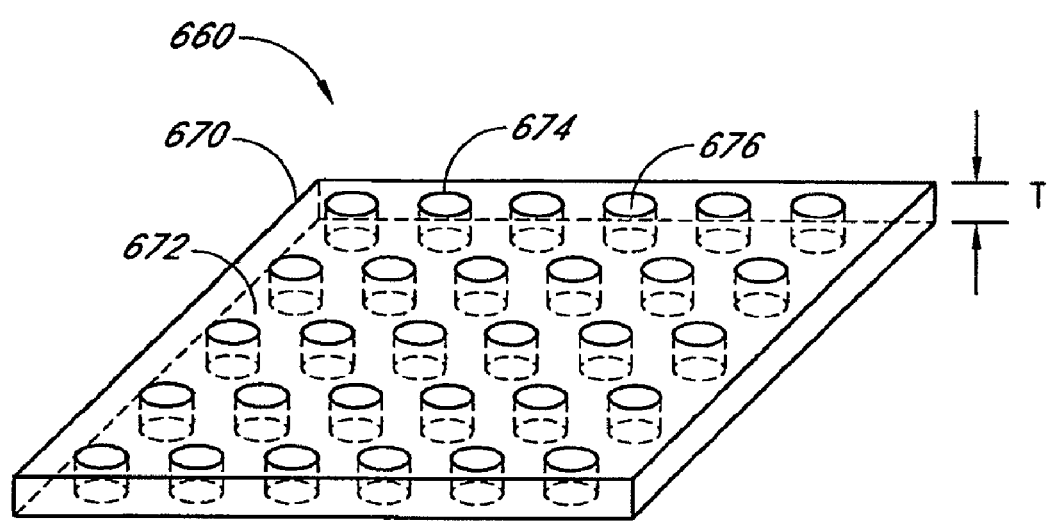
FIG. 25A schematically illustrates an example photonic crystal slab (PCS) having a substantially square array of substantially circular holes extending completely through the slab.

In certain embodiments, the at least one photonic crystal structure 620 comprises a PCS 670, an example of which is schematically illustrated by FIG. 25A. The PCS 670 comprises a first material 672 and an array of regions 674 within the PCS 670. The regions 674 comprise a second material 676 having a refractive index different from a refractive index of the first material 672. The PCS 670 of FIG. 25A has a thickness T and a substantially planar configuration.

In certain embodiments, the first material 672 comprises a solid dielectric material, examples of which include but are not limited to, silicon, silica, silicon nitride, ceramics, and plastics. In certain embodiments, the first material 672 comprises a solid semiconductor material, examples of which include but are not limited to, silicon, germanium, indium phosphide, gallium arsenide, or other III-V semiconductor materials. In certain embodiments, the second material 676 comprises a gas (e.g., air). In certain embodiments, the second material 676 comprises a fluid, examples of which include but are not limited to, water, isopropanol, ethanol, methanol, and other alcohols.

In certain embodiments, the thickness T of the PCS 670 is in a range between about 100 nanometers and about 1000 nanometers. In certain embodiments, the PCS 670 has a substantially square shape, while in other embodiments, the PCS 670 has a substantially circular, rectangular, hexagonal, elliptical, or other shape.

In certain embodiments, the regions 674 have a maximum width along a direction substantially parallel to the PCS 670 in a range between about 100 nanometers and about 1500 nanometers. In certain embodiments, the regions 674 have a substantially circular shape, while in certain other embodiments, the regions 674 have a substantially elliptical, oval, square, rectangular, triangular, pentagonal, hexagonal, semicircular, or other shape.

In certain embodiments, the array of regions 674 has a substantially two-dimensionally-periodic distribution. The periodicities of the distribution in two different directions generally parallel to the PCS 670 are substantially the same in certain embodiments, while in certain other embodiments, the periodicities are different. In certain embodiments, the center-to-center distance between nearest-neighboring regions 674 is in a range between about 100 nanometers and about 1550 nanometers. In certain embodiments, the substantially two-dimensionally-periodic distribution of the array of regions 674 is square, while in certain other embodiments, the substantially two-dimensionally-periodic distribution is rectangular, triangular, square, rhombic, oblique, or hexagonal. Other substantially two-dimensionally-periodic distributions are also compatible with certain embodiments described herein.

Figure 25B:
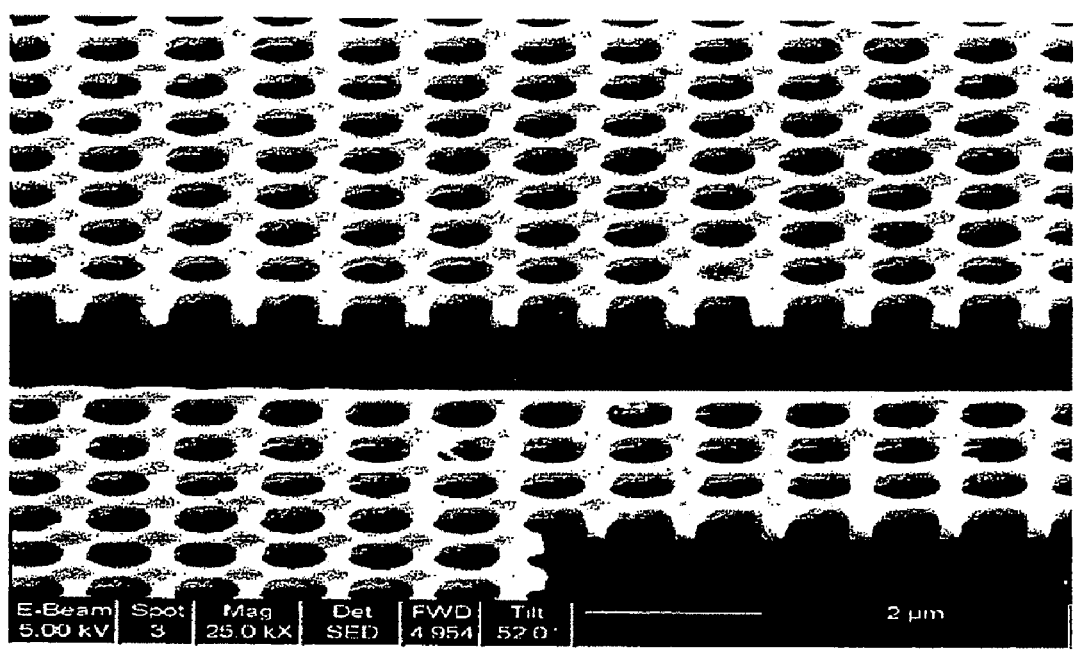
FIG. 25B illustrates a scanning electron microscope micrograph of portions of an example PCS.
Figure 25C:
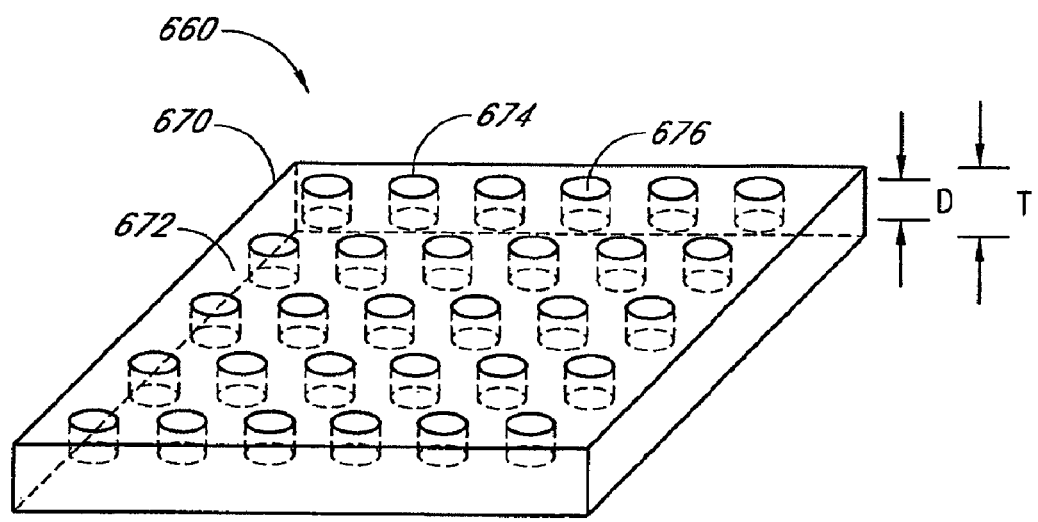
FIG. 25C schematically illustrates another example PCS having a substantially square array of substantially circular holes extending only partly through the PCS.

In certain embodiments, the regions 674 comprise a plurality of holes extending at least partially through the thickness of the PCS 670, containing the second material 676, and having a substantially two-dimensionally-periodic distribution within the PCS 670. For example, FIG. 25A schematically illustrates an example PCS 670 having an array of regions 674 comprising substantially circular holes extending completely through the thickness of the PCS 670 and having a substantially square distribution, in accordance with certain embodiments described herein. FIG. 25B illustrates a scanning electron microscope micrograph of portions of such an example PCS 670. FIG. 25C schematically illustrates another example PCS 670 having a substantially square array of regions 674 comprising substantially circular holes extending only partly through the thickness T of the PCS 670, thereby having a depth D less than the thickness T of the PCS 670, in accordance with certain other embodiments described herein.

Figure 25D:
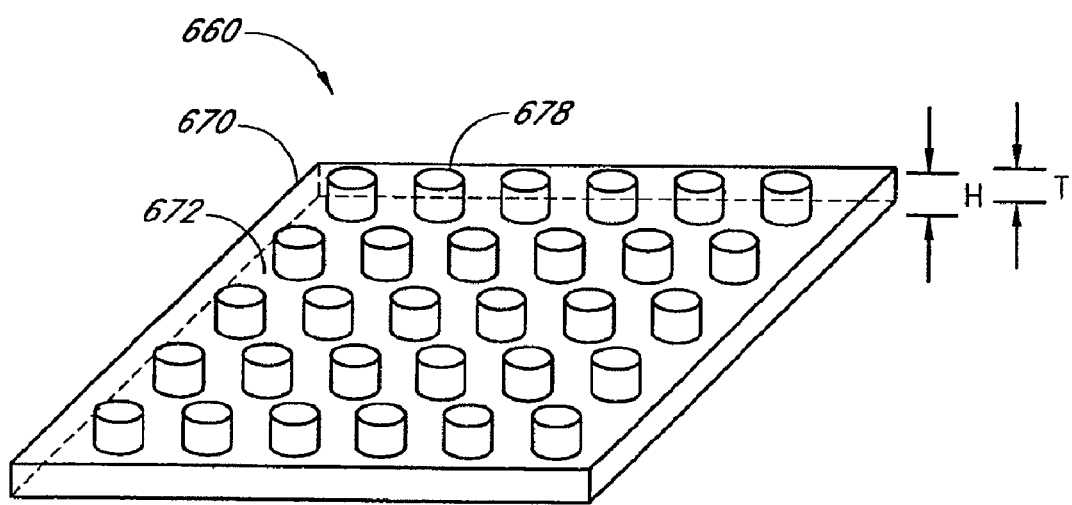
FIG. 25D schematically illustrates another example PCS having a substantially square distribution of protrusions.

FIG. 25D schematically illustrates another example PCS 670 having a substantially square distribution of protrusions 678 (e.g., pillars) having a substantially circular cross-section in a plane substantially parallel to the PCS 670, in accordance with certain other embodiments described herein. The protrusions 678 have a height H above the PCS 670 in a range between about 100 nanometers and about 1000 nanometers. In certain embodiments, the height H is greater than the thickness T, while in certain other embodiments, the height H is less than or equal to the thickness T. In certain embodiments, the protrusions 678 comprise the same material as does the underlying portions of the PCS 670, while in certain other embodiments, the protrusions 678 comprise a different material (e.g., the PCS 670 comprises silicon oxide while the protrusions 678 comprise silicon). In certain embodiments, the PCS 670 comprises a dielectric material (e.g., silicon, silica, silicon nitride, ceramics, plastics) or a semiconductor material (e.g., silicon, germanium, indium phosphide, gallium arsenide, or other III-V semiconductor). In certain embodiments, the protrusions 678 comprise a dielectric material (e.g., silicon, silica, silicon nitride, ceramics, plastics) or a semiconductor material (e.g., silicon, germanium, indium phosphide, gallium arsenide, or other III-V semiconductor). Other shapes, sizes, and distributions of the protrusions 678 are also compatible with certain embodiments described herein.

Figure 25E:
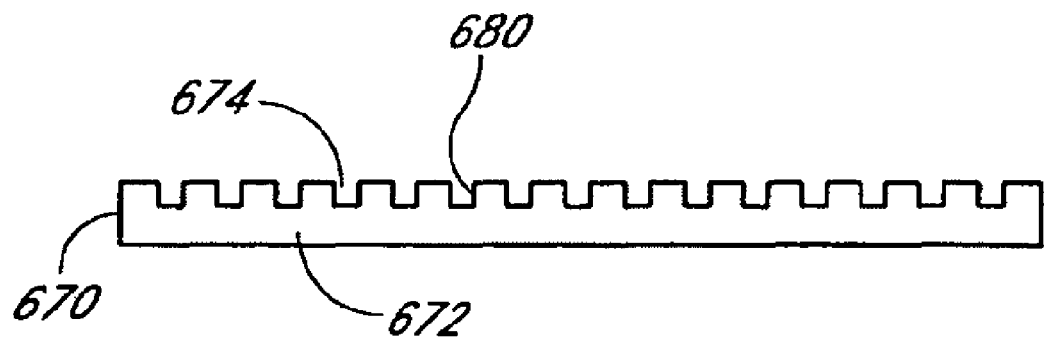
FIGS. 25E and 25F schematically illustrate cross-sectional views of other example PCSs having a plurality of elongated regions with a substantially one-dimensionally-periodic distribution.
Figure 25F:
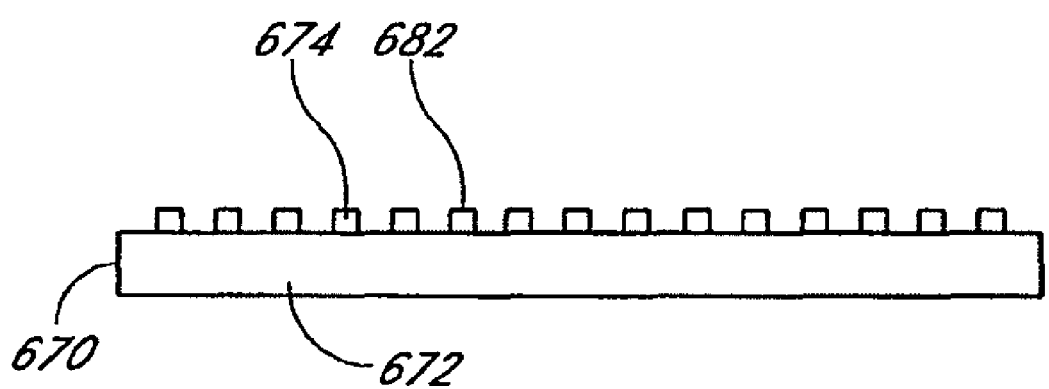

FIGS. 25E and 25F schematically illustrate cross-sectional views of other example slabs 670 having a plurality of elongated regions 674 with a substantially one-dimensionally-periodic distribution (e.g., a one-dimensional grating). In FIGS. 25E and 25F, the regions 674 extend in a direction substantially perpendicular to the cross-sectional view. In certain embodiments, the spacing between adjacent regions 674 is in a range between about 100 nanometers and about 1550 nanometers. In certain embodiments, the widths of the regions 674 are in a range between about 100 nanometers and about 1500 nanometers. In certain embodiments, the center-to-center spacing between adjacent regions 674 is in a range between about 100 nanometers and about 1550 nanometers.

As schematically illustrated by FIG. 25E, in certain embodiments, the PCS 670 comprises a first material (e.g., a dielectric material such as silica, silicon oxide, or silicon nitride) with regions 674 comprising troughs or grooves 680 within the PCS 670 containing the second material 676 (e.g., air or water). In certain embodiments, the grooves 680 extend completely through the thickness T of the PCS 670, while in certain other embodiments, the grooves 680 extend only partly through the thickness T of the PCS 670. The depth D of the grooves 680 is in a range between about 10 nanometers and about 1000 nanometers. In certain embodiments, the grooves 680 have a generally square, trapezoidal, curved or "U"-shaped, or triangular cross-section in a plane substantially perpendicular to the PCS 670. Other shapes and sizes of the grooves 680 are also compatible with certain embodiments described herein.

In certain other embodiments, as schematically illustrated by FIG. 25F, the regions 674 comprise protrusions 682 having a height H above the PCS 670 in a range between about 10 nanometers and about 1000 nanometers. The protrusions 682 of certain embodiments comprise the same material as does the underlying portions of the PCS 670, while in certain other embodiments, the protrusions 682 comprises a different material from the first material 672 (e.g., the PCS 670 comprises silicon oxide while the protrusions 682 comprise silicon). In certain embodiments, the PCS 670 comprises a dielectric material (e.g., silicon, silica, silicon nitride, ceramics, plastics) or a semiconductor material (e.g., silicon, germanium, indium phosphide, gallium arsenide, or other III-V semiconductor). In certain embodiments, the protrusions 682 comprise a dielectric material (e.g., silicon, silica, silicon nitride, ceramics, plastics) or a semiconductor material (e.g., silicon, germanium, indium phosphide, gallium arsenide, or other III-V semiconductor). In certain embodiments, the protrusions 682 have a generally square, trapezoidal, curved or "U"-shaped, or triangular cross-section in a plane substantially perpendicular to the PCS 670. Other shapes and sizes of the protrusions 682 are also compatible with certain embodiments described herein.

In certain embodiments, the at least one photonic crystal structure 620 comprises a single PCS 670 that exhibits at least one optical resonance having a resonance frequency and a resonance lineshape. FIGS. 26A-26C schematically illustrates an example PCS 670 (shown on the left) exhibiting an optical resonance in the simulated transmitted optical power spectrum (shown on the right) for light incident in a direction substantially perpendicular to the PCS 670. In FIGS. 26A-26C, the optical resonance is shown as a dip in the transmitted optical power spectrum. The horizontal axes of the simulated transmitted optical power spectra of FIGS. 26A-26C are in units of (c/a), where c is the speed of light in vacuum and a is the lattice constant of the PCS 670 (e.g., the center-to-center spacing of the holes). FIG. 26A illustrates the PCS 670 with no forces applied, FIG. 26B illustrates the PCS 670 with a compressive force applied, and FIG. 26C illustrates the PCS 670 with an expansive or stretching force applied. The compressive force shifts the frequency of the optical resonance towards higher frequencies, as shown by a comparison of FIGS. 26A and 26B. The expansive force shifts the frequency of the optical resonance towards lower frequencies, as shown by a comparison of FIGS. 26A and 26C.

Figure 27:
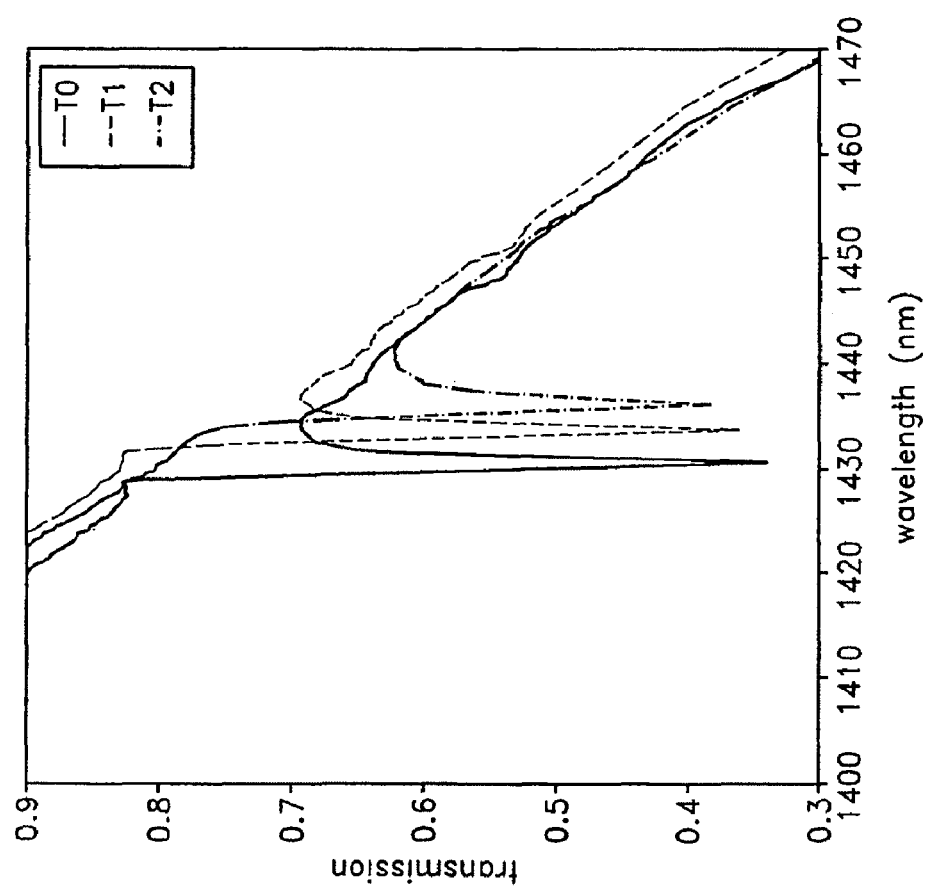
FIG. 27 schematically illustrates the measured resonance wavelength shift for substantially perpendicularly incident light on an example PCS as a function of temperature.

FIG. 27 schematically illustrates the measured resonance wavelength shift for substantially perpendicularly incident light on an example PCS 670 as a function of temperature. For temperature $T_0$ of about 25° C., the resonance wavelength is about 1431 nanometers, for temperature $T_1$ of about 450° C., the resonance wavelength is about 1434 nanometers, and for temperature $T_2$ of about 800° C., the resonance wavelength is about 1436 nanometers. By changing the temperature of the PCS 670, both the geometry is changed via thermal expansion and the dielectric constant is changed, both of which contribute to the shift of the resonance wavelength.

Figure 28:
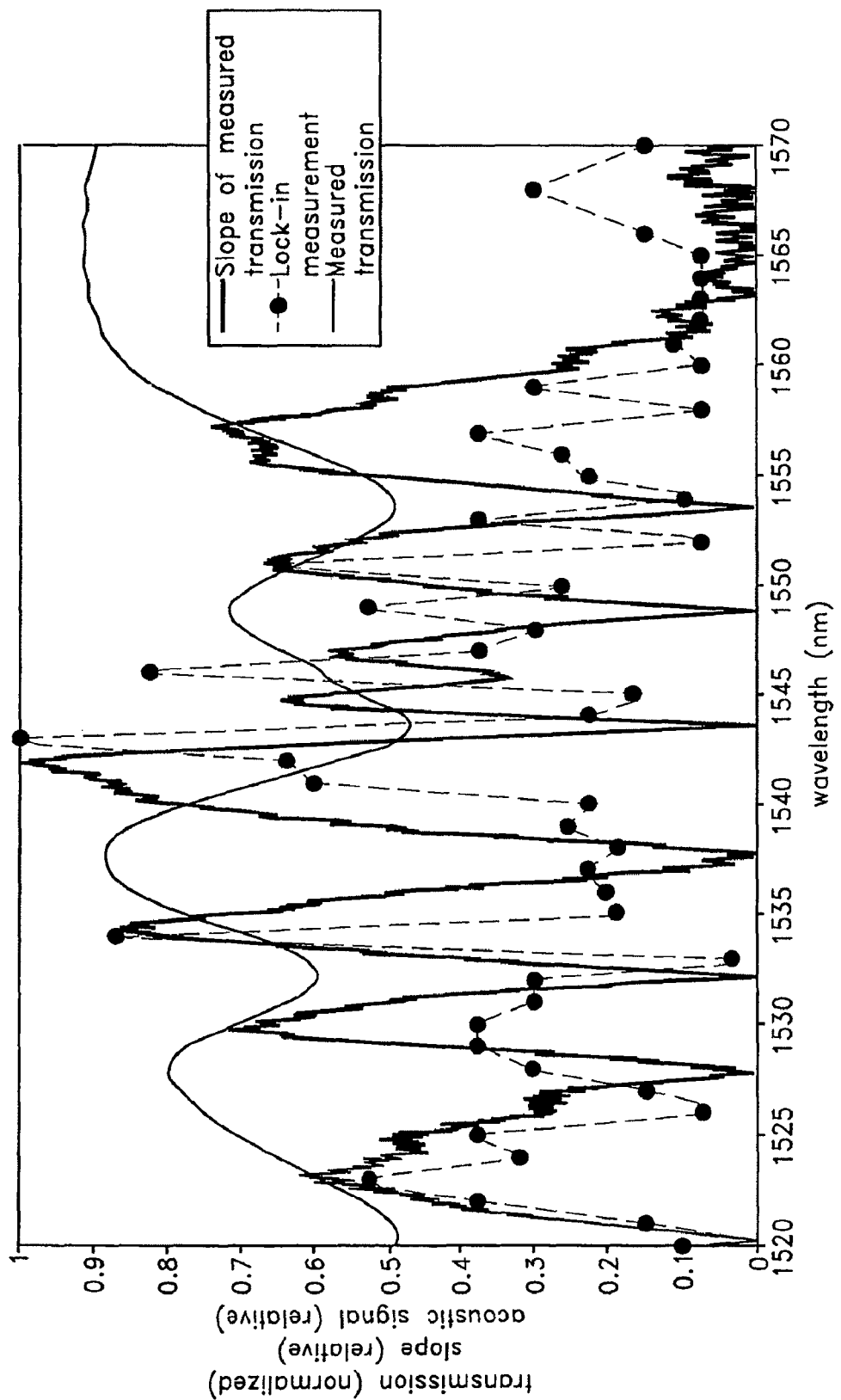
FIG. 28 illustrates the resonance wavelength shift for substantially perpendicularly incident light on an example PCS as a function of mechanical forces applied to the PCS.

FIG. 28 illustrates the resonance wavelength shift for substantially perpendicularly incident light on an example PCS 670 as a function of mechanical forces applied to the PCS 670. For the measurements illustrated by FIG. 28, one end of an example PCS 670 was fixedly mounted to a stationary position and the other end of the PCS 670 was mounted to a piezoelectric oscillator which was oscillated at 4.7 kHz using a 4-volt peak-to-peak voltage. The relative sensitivity of the change in optical power with respect to different optical wavelengths for a constant acoustic power generally follows the slope of the optical transmission spectrum of the PCS 670.

Figure 29:
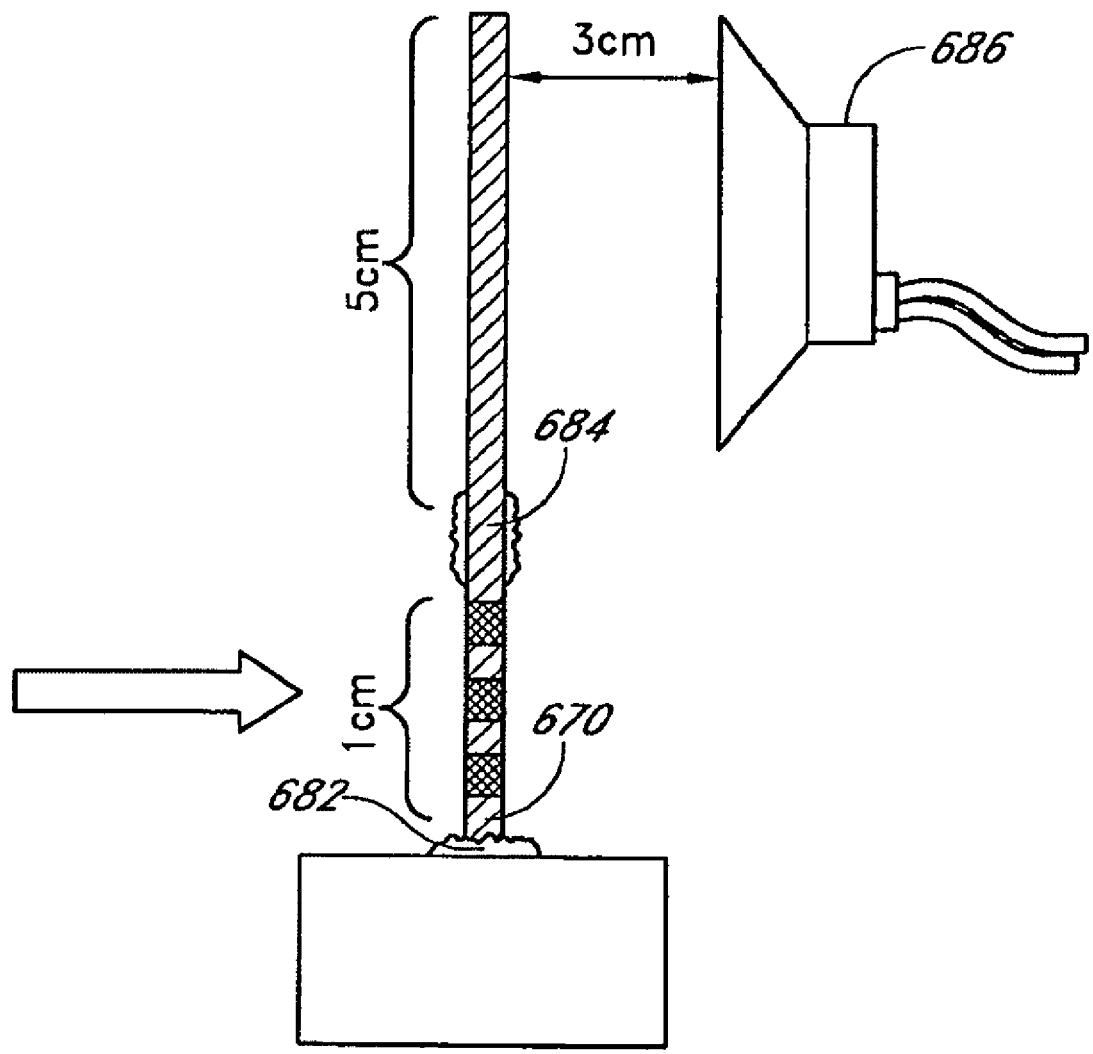
FIG. 29 schematically illustrates an experimental configuration of a 1-centimeter long PCS in proximity to an acoustic speaker.

Similar behavior was observed for a PCS 670 in the experimental apparatus schematically illustrated by FIG. 29. As shown by FIG. 29, one end 682 of a 1-centimeter long PCS 670 was fixedly mounted (e.g., by epoxy) to a stationary position, and the other end 684 was fixedly mounted (e.g., by epoxy) to one end of a movable cantilever which was used to reduce the frequency of the PCS structure. An audio speaker 686 facing the cantilever and spaced about 3 centimeters from the cantilever was oscillated at about 500 Hz using a 10-volt peak-to-peak voltage.

FIGS. 30A and 30B schematically illustrate an example acoustic sensor 610 having photonic crystal structure 620 comprising a single PCS 670 in accordance with certain embodiments described herein. The PCS 670 is mounted with a first end 692 fixedly mounted to a stationary position and a second end 694 fixedly mounted to a movable membrane 696. In certain embodiments, the membrane 696 is a portion of the housing 630. An optical fiber 650 is positioned to irradiate the PCS 670 with light in a direction substantially perpendicular to the PCS 670. In certain embodiments, light reflected by the PCS 670 re-enters the optical fiber 650 and is detected by an optical sensor (not shown), while in certain other embodiments, light transmitted through the PCS 670 is detected by an optical sensor (not shown). In certain embodiments, acoustic waves 640 incident on the membrane 696 induce forces (e.g., strain) in the plane of the PCS 670 (e.g., by stretching and compressing the PCS 670), thereby shifting at least one of the resonance frequency and the resonance lineshape of the PCS 670, as detected by either the reflection spectrum, the transmission spectrum, or both. In certain other embodiments, the PCS 670 is mounted to the membrane 696 such that acoustic waves 640 incident on the membrane 696 induce strain in the PCS 670 by bending the PCS 670. In certain such embodiments, the measured Q for the resonance is about 2500 to 3000. In certain such embodiments, the corresponding sensitivity of the acoustic sensor 610 is about 1 micropascal/$Hz^{1/2}$, and the dynamic range is limited by the yield strength of the PCS 670 to be about 50 decibels. In an example embodiment, a theoretical strain of about $1\times10^{-5}$ applied to a PCS 670 yields a $10^{-3}$ change in the transmitted power at a wavelength of about 1550 nanometers.

Dual PCS Structures

Figure 31:
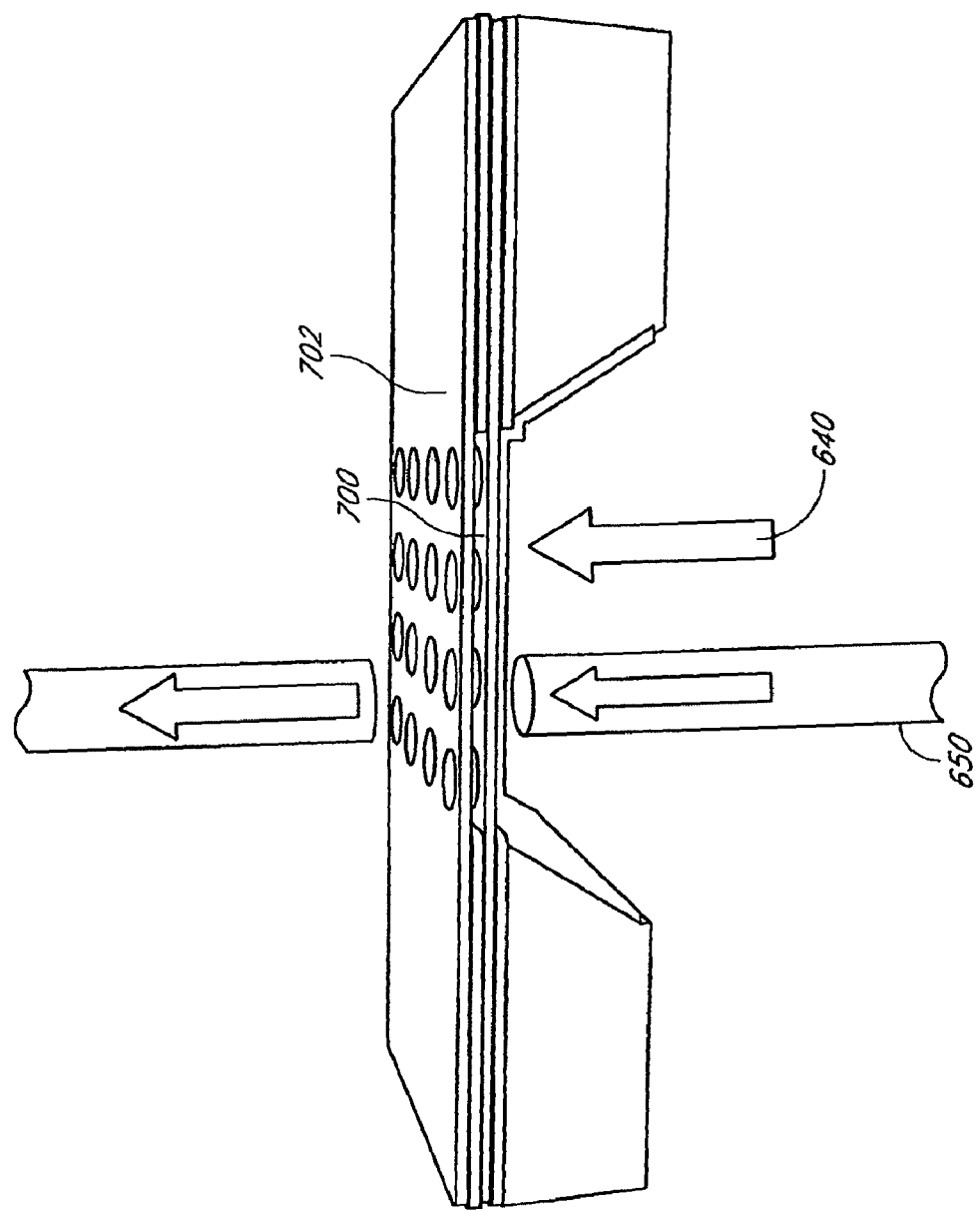
FIG. 31 schematically illustrates an example photonic crystal structure comprising a first PCS and a second PCS substantially parallel to the first PCS.

In certain embodiments, the photonic crystal structure 620 comprises a first PCS 700 and a second PCS 702 substantially parallel to the first PCS 700, as schematically illustrated by FIG. 31. Each of these PCSs 700, 702 can have physical parameters (e.g., thicknesses, region sizes, materials, periodicities, distributions) as described above for the single PCS structure.

In certain embodiments, there is no physical contact between the first PCS 700 and the second PCS 702. The first and second PCSs 700, 702 can undergo displacements relative to one another in response to incident acoustic waves 640. In certain embodiments, light is incident on the first and second PCSs 700, 702 in a direction substantially perpendicular to the PCSs 700, 702. In certain embodiments, the light is provided by an optical fiber 650, as schematically illustrated by FIG. 31, while in certain other embodiments, the light is collimated prior to irradiating the PCSs 700, 702.

Figure 32:
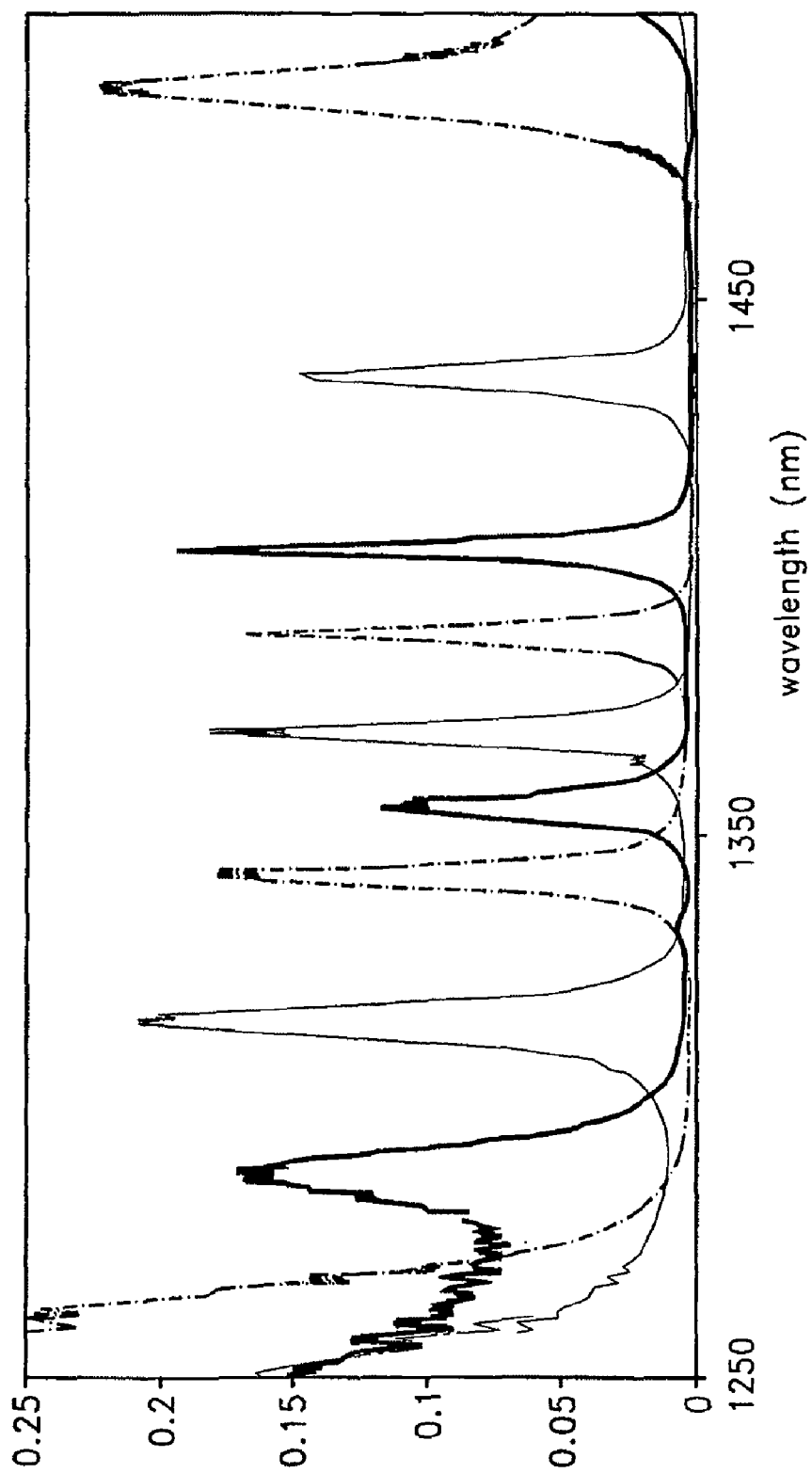
FIG. 32 is a plot of various normalized transmission spectra measured from a photonic crystal structure comprising a pair of PCSs.

FIG. 32 is a plot of various normalized transmission spectra measured from a photonic crystal structure 620 comprising a pair of PCSs (e.g., as shown in FIG. 31), each transmission spectrum corresponding to a different manual displacement between the two PCSs. The measured transmission spectra of FIG. 32 were obtained by using two PCSs in proximity to one another and a micron-actuator to manually vary the displacement between the two slabs. As can be seen from FIG. 32, the pair of PCSs exhibits optical resonances each having a resonance frequency and a resonance lineshape, and that both the resonance frequency and the resonance lineshape are responsive to changes of the relative position between the two PCSs. As shown in FIG. 32, one example resonance of the pair of PCSs has a tuning bandwidth of about 50 nanometers at a center wavelength of about 1377 nanometers. This resonance is sufficiently sharp (e.g., about 0.5 THz with a peak-to-floor ratio of 25 dB) to be used in an acoustic sensor system. Theoretical calculations can be used to design PCS structures with sharper resonances, to be used in acoustic sensor systems with even higher sensitivities.

The resonance frequency and the resonance lineshape of the pair of PCSs are both dependent on changes of the perpendicular distance between the two PCSs and on changes of the lateral relative positions of the two PCSs. The two PCSs exhibit optical behavior similar to that of a single PCS, and through the relative displacements, the geometry and optical properties of the photonic crystal structure can be tuned. U.S. Patent Application Publication No. US 2004/0080726 A1, which is incorporated in its entirety by reference herein, discloses calculations (e.g., temporal coupled-mode theory calculations and finite-difference time-domain simulations) of the transmission spectrum for a pair of PCSs as functions of the frequency of the incident light and of the displacement between the two PCSs. These calculations replicate the behavior shown in FIG. 32.

In certain embodiments, the two PCSs are brought sufficiently close to one another that they are optically coupled in the near-field to one another (referred to herein as a near-field configuration). In certain embodiments, the two PCSs are spaced apart from one another such that the PCSs are not optically coupled to one another, but form a cavity (referred to herein as a Fabry-Perot configuration). In either the Fabry-Perot configuration or the near-field configuration, the optical resonances shift in frequency (or wavelength) with changing displacement between the two PCSs. Thus, the amount of displacement between the two PCSs can be detected by measuring the transmitted power (or the reflected power) at a predetermined frequency (or wavelength). In general, the near-field configuration generates a larger shift of frequency (or wavelength) than does the Fabry-Perot configuration, such that the near-field configuration has a higher sensitivity to displacements than does the Fabry-Perot configuration.

In certain embodiments in which the two PCSs are optically coupled together in the near-field configuration, the optical resonances are split into two resonances. The amount of splitting varies with the displacement between the two PCSs which, in certain embodiments, provides a measure of the displacement. FIGS. 33A-33C schematically illustrate the dependence of the resonance frequencies of the photonic crystal structure 620 comprising a first PCS 700 and a second PCS 702. In FIG. 33A, a single PCS 670 is schematically shown with its transmission spectrum having a single optical resonance mode. In FIG. 33B, a pair of PCSs 700, 702 coupled in the near-field configuration are schematically shown and the transmission spectrum has a pair of optical resonance modes having frequencies that are split from one another. In FIG. 33C, one or both of the PCSs are displaced in a direction substantially perpendicular to the PCSs such that the distance between the two PCSs 700, 702 is decreased, thereby shifting the frequencies of the two modes such that the splitting between the frequencies of the two modes increases.

In certain embodiments in which the two PCSs are coupled in the near-field configuration, additional resonances appear in the transmission spectra when the PCSs are laterally displaced relative to one other in a direction substantially parallel to the PCSs, as schematically illustrated by FIG. 34. As discussed more fully below, these resonances are generated by breaking the mirror symmetry of the double PCS structure, which allows incident light to couple to non-degenerate resonances. These additional resonances shift in frequency (or wavelength) as a function of the perpendicular displacement between the two PCSs. These additional resonances shift in frequency (or wavelength) and their lineshapes (e.g., linewidths) also change as a function of the lateral displacement parallel to the two PCSs. In certain embodiments, by optically coupling the two PCSs, the linewidth and the frequency of these additional resonances can advantageously be tuned dynamically by displacements between the two PCSs perpendicular to the PCSs and parallel to the PCSs. In certain embodiments, a sub-Ångstrom displacement (either perpendicular or parallel to the PCSs) between the two PCSs introduces a detectable change in the transmitted or reflected power at a sensitive resonance wavelength. In certain embodiments, electrical actuation can be used to shift the PCSs in a direction generally parallel to the PCSs and using resonance frequency shifts due to acoustic-wave-induced displacements between the PCSs in a direction generally perpendicular to the PCSs. Certain such embodiments are advantageously used in acoustic sensor systems.

Fiber Compatibility

The sharp resonances of typical optical resonators or filters are sensitive to the incident angle of the light. Typically, to avoid this sensitivity to the incident angle, the incident light is collimated so as to approximate a plane wave. When using an optical fiber as the light source, the light emitted by the optical fiber possesses a certain angular distribution which is typically collimated for present-day optical resonators using additional collimation optics and additional fiber-to-fiber coupling hardware.

In contrast, certain embodiments described herein have one or more resonances which are substantially independent of the incidence angle of the optical beam over a range of incidence angles. In certain such embodiments, the light emitted by the optical fiber has an angular distribution such that a substantial fraction (e.g., more than 50%) of the light incident on the PCS is within the range of incidence angles for which the resonance frequency of such resonances does not change. For such resonances, the linewidth of the resonance is also essentially independent of the incidence angle. Such an angular insensitivity implies that the resonances do not have to be excited by a collimated beam (e.g., by light which approximates a plane wave).

In certain embodiments in which the resonance is insensitive to the incidence angle, the various angular components of the light emitted by the optical fiber are all affected by the PCS structure in the same way, so the acoustic sensor behaves in much the same way as if the light was collimated. In certain such embodiments, since the resonance is insensitive to the incidence angle, the light from the optical fiber directly impinges the PCS structure without intervening collimation optics between the optical fiber and the PCS structure. Certain such embodiments advantageously avoid using complicated collimation or coupling components, thereby simplifying integration and packaging and lowering cost.

The fiber-compatibility of the PCS structure advantageously permits certain embodiments described herein to be easily incorporated into already-present and widely-used fiber-based acoustic sensor systems. In addition, the angular insensitivity of the PCS structure advantageously facilitates incorporating several types of filters into fiber-based optical communication networks.

Figure 35:
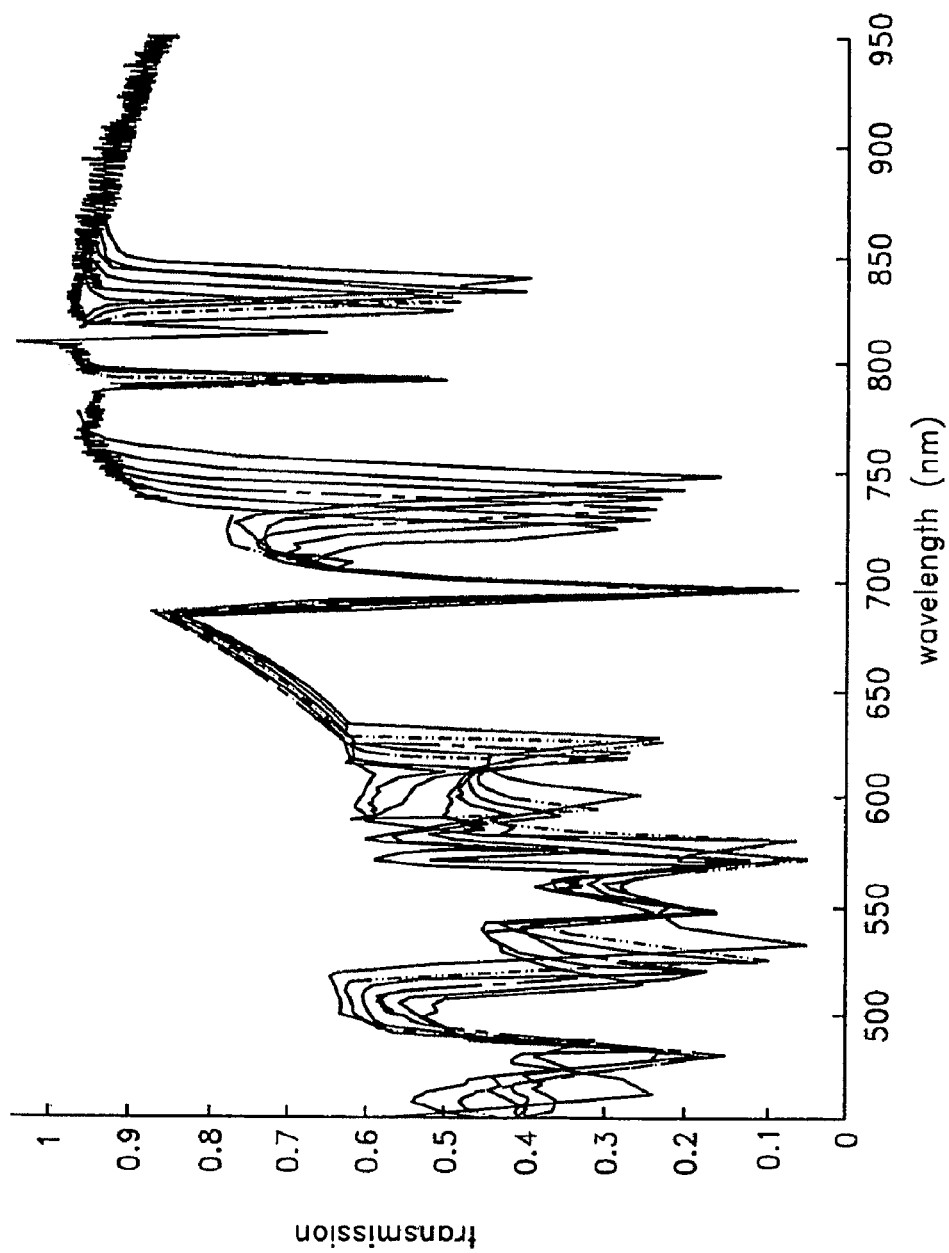
FIG. 35 illustrates the measured transmission spectra corresponding to TE polarized light incident on the PCS at various incidence angles.

In an example embodiment, a silicon-nitride PCS illuminated by transverse-electric (TE) polarized light has a resonance mode with a wavelength of about 695 nanometers. FIG. 35 illustrates the measured transmission spectra corresponding to TE polarized light incident on the PCS at various incidence angles. As shown in FIG. 35, the transmission spectra have various features which are dependent on the incidence angle, but the resonance mode at about 695 nanometers is substantially insensitive to the incidence angle of the TE polarized light. In another example embodiment, the silicon-nitride PCS is illuminated by transverse-magnetic (TM) polarized light, and exhibits a resonance mode with a wavelength of about 770 nanometers, and this resonance is substantially insensitive to the incidence angle of the TM polarized light.

In certain embodiments in which the acoustic sensor 610 further comprises an optical fiber 650 optically coupled to the at least one photonic crystal structure 620 (e.g., as schematically illustrated by FIG. 24), the light emitted from the optical fiber 650 is incident to the at least one photonic crystal structure 620 in a range of incidence angles within about 10 degrees from a direction perpendicular to the at least one photonic crystal structure 620. In certain such embodiments, the light is not collimated between being emitted from the optical fiber 650 and reaching the at least one photonic crystal structure 620.

Tailoring the Optical Resonance

Certain eigenmodes in a PCS possess infinite lifetimes, hence are uncoupled to outside radiation at normal incidence. Therefore, in present-day optical resonator systems utilizing photonic crystals, it is generally not possible to couple to certain resonances (referred to herein as non-degenerate resonances) with normally-incident plane waves due to a symmetry mismatch between the resonance mode and the incident wave. This effect was observed experimentally by Pacradouni et al., "*Photonic band structure of dielectric membranes periodically textured in two dimensions,*" Phys. Rev. B, vol. 62, page 4204 (2000), and discussed theoretically by Paddon and Young, "*Two-dimensional vector-coupled-mode theory for textured planar waveguides,*" Phys. Rev. B, vol. 61, page 2090 (2000). Using group theoretical arguments, Ochiai and Sakoda, in "*Dispersion relation and optical transmittance of a hexagonal photonic crystal slab,*" Phys. Rev. B, vol. 63, page 125107 (2001), showed that these resonances are uncoupled due to a symmetry mismatch with outside radiation.

However, measurements and group theory calculations show that it is possible to couple to these non-degenerate resonances in a PCS lacking mirror symmetry. As described more fully below, simulations and experimental results show that such non-degenerate resonances can indeed be excited by breaking the mirror symmetry of the PCS structure, either by breaking the periodicity of the lattice array or by breaking the mirror symmetry of the unit cells (e.g., in a square lattice array). In addition, it is possible to control the sharpness (e.g., linewidth, quality factor) of such resonances by adjusting the degree of asymmetry (e.g., the size of the non-symmetric region of the holes of the PCS structure). In certain embodiments, the quality factor of these resonances can be tuned from a finite minimum to infinity. Resonances sharper than the spectral linewidth of the source are generally practically useless, so in certain embodiments, the tuning is done from a finite minimum to a finite maximum (as determined by the linewidth of the incident light).

Such PCS structures are expected to have applications for mode selection and linewidth control in lasers, and will find use in acoustic sensor applications by advantageously improving and controlling the sensitivity of the acoustic sensor system. Certain embodiments described herein advantageously improve the sensitivity of the acoustic sensor system up to a limit imposed by other factors, such that the PCS structure is not the limiting element. In certain embodiments in which a lower sensitivity is desirable (e.g., to improve the dynamic range), the sensitivity of the acoustic sensor system is lowered such that the PCS structure is the limiting element. In certain embodiments, the lack of mirror symmetry is implemented for a PCS structure with a triangular lattice array or any other lattice array geometry, or in general, for any kind of an optical resonator system.

In certain embodiments, the non-degenerate resonances of a PCS with a symmetric structure that are uncoupled to normally-incident plane waves are excited in a mirror-symmetry-lacking PCS structure. In certain embodiments, one or more of the mirror symmetries of the PCS structure is advantageously broken or removed to allow coupling to the non-degenerate resonances. In certain embodiments, the coupling to these non-degenerate resonances is advantageously controlled by selecting the degree of asymmetry. In certain embodiments, the at least one photonic crystal structure has a symmetry axis and the light incident normal to the at least one photonic crystal structure is polarized in a direction substantially perpendicular to the symmetry axis. In certain other embodiments, the normally-incident light is polarized in a direction substantially parallel to the symmetry axis.

Figure 36D:
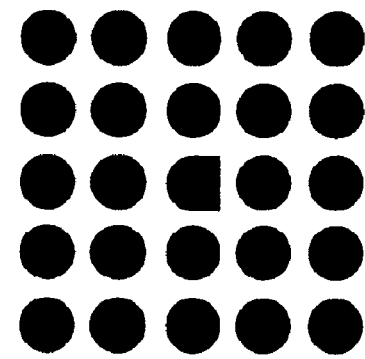
FIGS. 36A-36D schematically illustrate example PCS structures having at least one photonic crystal defect.
Figure 36C:
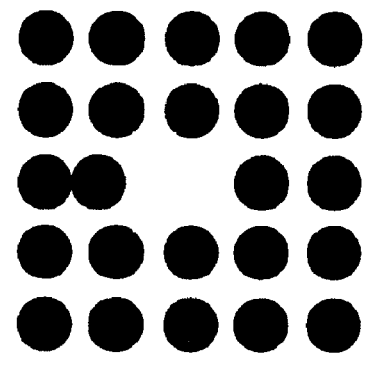
Figure 36B:
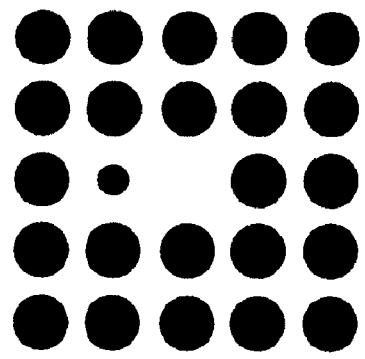

In certain embodiments, the asymmetry of the PCS structure is generated by an asymmetry in the substantially periodic distribution of holes. FIGS. 36A-36D schematically illustrate example PCS structures having at least one photonic crystal defect in the substantially periodic distribution. The PCS structure of FIG. 36A has a photonic crystal defect comprising a missing hole, and such a photonic crystal defect possesses mirror symmetry with respect to the horizontal and vertical axes. In certain embodiments, the PCS structure comprises at least one hole with a reduced size or an increased size as compared to the other holes of the PCS structure. In certain embodiments, this reduced-size or increased-size hole is at an expected lattice position of the substantially periodic distribution, while in other embodiments, it is displaced from the expected lattice position. In certain other embodiments, this reduced-size or increased-size hole is in proximity to the position of a missing hole. For example, FIG. 36B schematically illustrates a PCS structure with a hole having a reduced size and adjacent to the missing hole position. FIG. 36C shows a hole adjacent to the missing hole position to be slightly shifted from its expected lattice position of the substantially periodic distribution. FIG. 36D shows a hole which itself lacks a mirror symmetry acting as the defect. In certain other embodiments, the dielectric constant of a portion of the PCS structure is reduced or increased to break the mirror symmetry. For example, at least one of the holes of the PCS structure can contain a third material having a refractive index different from the refractive indices of the first material or the second material. The photonic crystal defects of FIGS. 36B, 36C, and 36D lack mirror symmetry with respect to the horizontal axis. Various possibilities to break the mirror symmetry, not limited to those schematically illustrated by FIGS. 36A-36D, are compatible with embodiments described herein. While FIGS. 36A-36D have been described in terms of a PCS structure comprising a plurality of holes, persons skilled in the art recognize that a PCS structure comprising a plurality of protrusions would exhibit similar behavior.

Figure 37B:
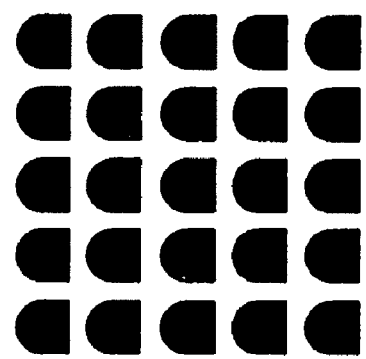
FIGS. 37A and 37B schematically illustrate an example implementation for mirror-symmetry breaking in a PCS structure compatible with certain embodiments described herein.
Figure 37A:
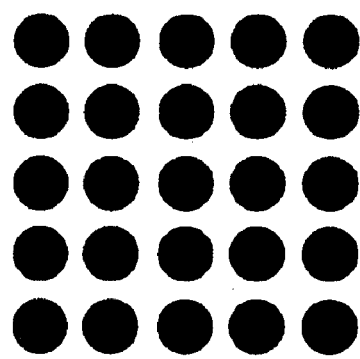
Figure 36A:
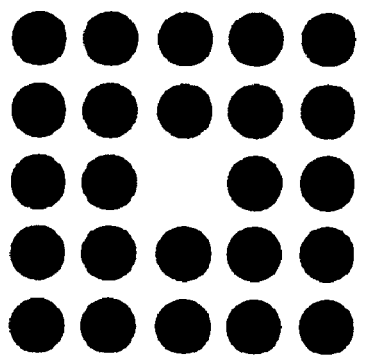

FIGS. 37A and 37B schematically illustrate an example implementation for mirror-symmetry breaking in a PCS structure compatible with certain embodiments described herein. The PCS structure shown in FIG. 37A possesses mirror symmetry with respect to both the horizontal and vertical axes. The PCS structure shown in FIG. 37B lacks mirror symmetry with respect to the horizontal axis.

Figure 38:
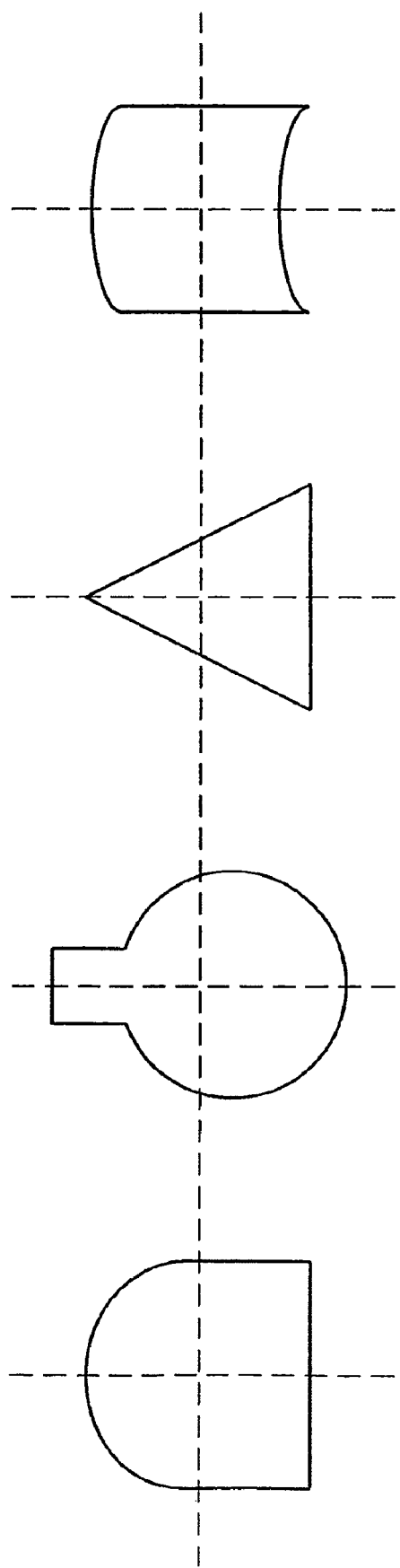
FIG. 38 schematically illustrates several example hole structures which break or remove one or more of the mirror symmetries of the PCS unit cell.

FIG. 38 schematically illustrates several example hole structures which break or remove one or more of the mirror symmetries of the PCS unit cell. Each of the structures schematically illustrated by FIG. 38 lack mirror symmetry with respect to the horizontal axis, while possessing mirror symmetry with respect to the vertical axis. Besides the structures schematically illustrated by FIG. 38, there is an infinite number of hole shapes compatible with embodiments described herein.

Figure 39B:
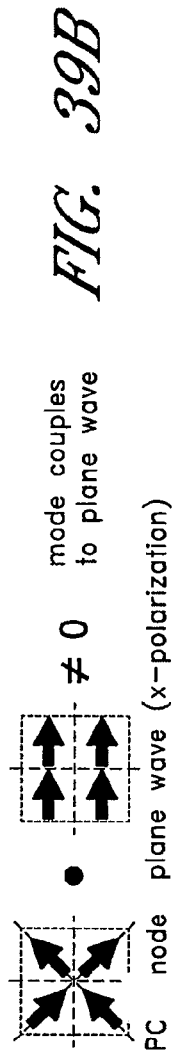
FIGS. 39B-39E schematically illustrate the dot products of various resonance modes of the PCS with plane waves polarized in the horizontal direction (x-polarization) and with plane waves polarized in the vertical direction (y-polarization).
Figure 39C:
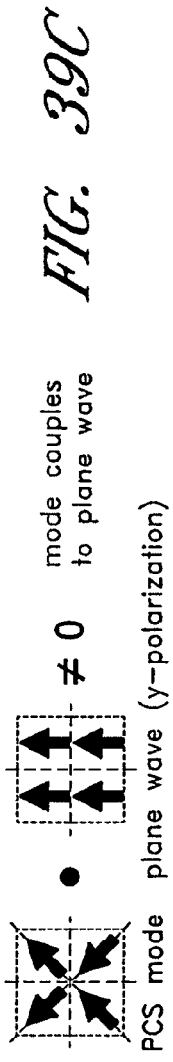
Figure 39D:
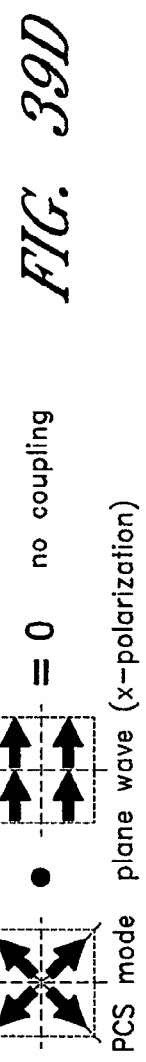
Figure 39E:
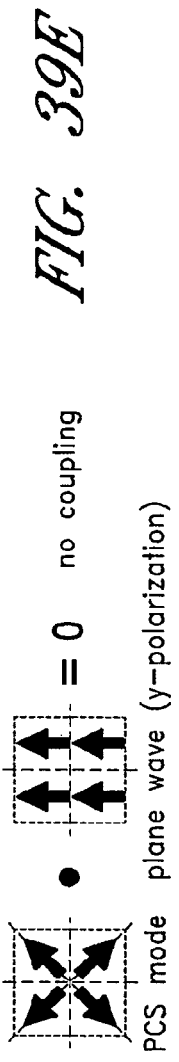
Figure 39A:
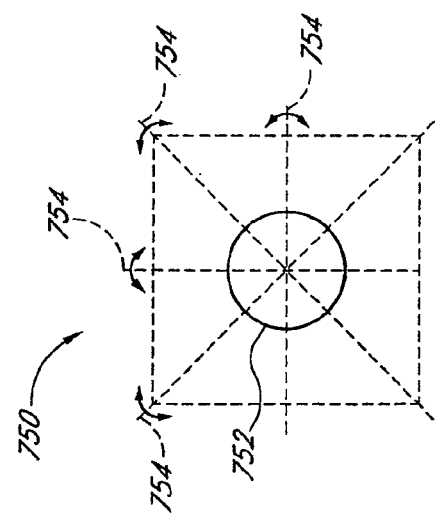
FIG. 39A schematically illustrates a unit cell of a PCS having circularly symmetric holes on a periodic square lattice distribution.

FIG. 39A schematically illustrates a unit cell 750 of a PCS having circularly symmetric holes 752 on a periodic square lattice distribution. The dashed lines of FIG. 39A denote various mirror symmetry axes 754 of the PCS. FIGS. 39B-39E schematically illustrate the dot products of various resonance modes of the PCS with plane waves polarized in the horizontal direction (x-polarization) and with plane waves polarized in the vertical direction (y-polarization). The dot products schematically illustrated by FIGS. 39B and 39C are not equal to zero, so these two resonance modes couple to incident plane wave. However, the dot products schematically illustrated by FIGS. 39D and 39E equal zero, so this resonance mode does not couple to incident plane waves, and is a non-degenerate resonance.

Figure 40A:
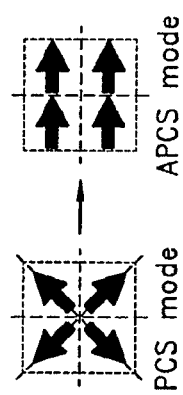
FIG. 40A schematically illustrates an example unit cell of a PCS having holes on a periodic square lattice distribution, in which each hole comprises a small region to one side of the hole.
Figure 40B:
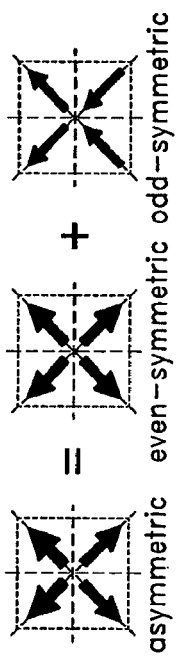
FIGS. 40B and 40C schematically illustrate an asymmetric resonance mode of the PCS of FIG. 40A.
Figure 40C:
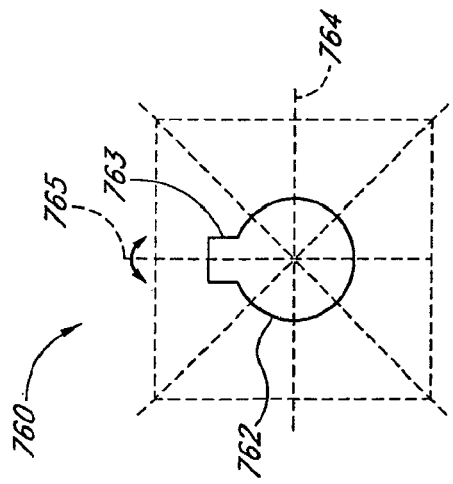
Figure 40D:
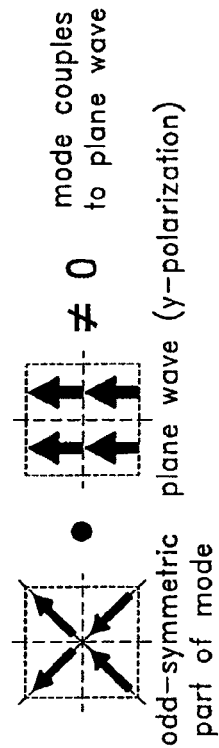
FIG. 40D schematically illustrates the dot product of the odd-symmetric resonance mode with an incident plane wave with y-polarization.

In certain embodiments, one or more of the mirror symmetries of the PCS structure is broken or removed. In certain such embodiments, one or more of the mirror symmetries of the unit cell of the periodic array of holes in the PCS is removed. FIG. 40A schematically illustrates an example unit cell 760 of a PCS having holes 762 on a periodic square lattice distribution, in which each hole 762 comprises a small region 763 to one side of the hole 762. The region 763 of FIG. 40A has a generally square shape, while in certain other embodiments, the region 763 has another shape (e.g., triangular, rectangular, irregular). As shown in FIG. 40A, the hole 762 does not have a mirror symmetry about the horizontal axis 764, as denoted by the horizontal dashed line marked by an "X," but the hole 762 maintains the mirror symmetry about the vertical axis 765. The region 763 removes one of the mirror symmetries of the unit cell 760, as compared to the circularly symmetric hole 750 of FIG. 39A, thereby changing the symmetry of the non-degenerate resonances. As schematically illustrated by FIGS. 40B and 40C, the region 763 modifies the resonance mode schematically illustrated by FIGS. 39D and 39E to be an asymmetric resonance mode, which can be equated to the sum of an even-symmetric resonance mode and an odd-symmetric resonance mode. As schematically illustrated by FIG. 40D, the dot product of this odd-symmetric resonance mode with an incident plane wave with y-polarization is non-zero, indicating that this odd-symmetric resonance mode can couple to incident plane waves. Thus, the change of the symmetry of the resonance modes by the asymmetric hole 762 makes coupling to the non-degenerate resonances possible using normally-incident plane waves.

FIG. 41A schematically illustrates a PCS unit cell 750 with the circularly symmetric hole 752 of FIG. 39A having four mirror symmetry axes 754. FIG. 41B schematically illustrates two doubly degenerate resonances ($E^{(1)}$ and $E^{(2)}$) and four non-degenerate resonances ($A_1$, $A_2$, $B_1$, $B_2$) of the PCS structure, and FIG. 41C schematically illustrates x-polarized ($e_x$) and y-polarized ($e_y$) incident plane waves and the corresponding electric fields. The hole 752 of FIG. 41A has a substantially symmetric shape possessing mirror symmetry with respect to a first axis (e.g. $\hat{\sigma}_x$) along the PCS 670 and with respect to a second axis (e.g., $\hat{\sigma}_y$) along the PCS 670, the second axis substantially perpendicular to the first axis. The dot products $E^{(1)} \bullet e_y$ and $E^{(2)} \bullet e_x$ are non-zero, indicating that these doubly degenerate resonances of FIG. 41B couple to y-polarized and x-polarized incident plane waves, respectively. The dot products $A_1 e_x$, $A_2 e_x$, $B_1 e_x$, $B_2 e_x$, $A_1 e_y$, $A_2 e_y$, $B_1 e_y$, and $B_2 e_y$, are each equal to zero, indicating that these non-degenerate resonances of FIG. 41B are not coupled to either x-polarized or y-polarized incident plane waves.

In certain embodiments, the coupling to the non-degenerate resonances can be controlled by advantageously selecting the degree of asymmetry of the hole. FIG. 41D schematically illustrates a PCS unit cell 760 with the asymmetric hole 762 with a region 763 to one side. The asymmetric hole 762 has a substantially asymmetric shape lacking mirror symmetry with respect to one axis along the PCS 670. For example, as shown in FIG. 41D, the hole 762 has the mirror symmetry about the horizontal axis broken and has the rotational symmetry broken, possesses mirror symmetry with respect to the vertical axis 765 along the PCS 670, the vertical axis 765 substantially perpendicular to the horizontal axis. FIG. 41E schematically illustrates a PCS unit cell 770 with a hole 772 having two similar regions 773 positioned to maintain the two mirror symmetry axes 774, while the rotational symmetry remains broken. The PCS structure corresponding to FIG. 41E can be used to demonstrate that it is the breaking of the mirror symmetry that is responsible for the excitation of the sharp non-degenerate resonances. As described more fully below, for PCS structures where only the rotational symmetry is broken (e.g., for elliptical holes), the non-degenerate resonances remain uncoupled to the normally-incident plane waves.

Figure 42B:
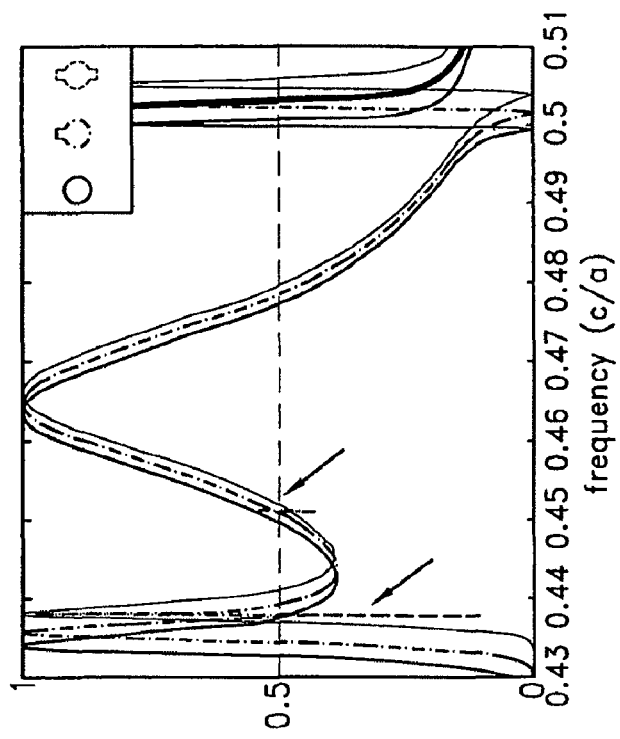
FIGS. 42A and 42B show finite-difference time-domain simulations (FDTD) of transmission spectra for the three different hole shapes of FIGS. 41A, 41D, and 41E for polarizations perpendicular and parallel, respectively, to the hole elongations.
Figure 42A:
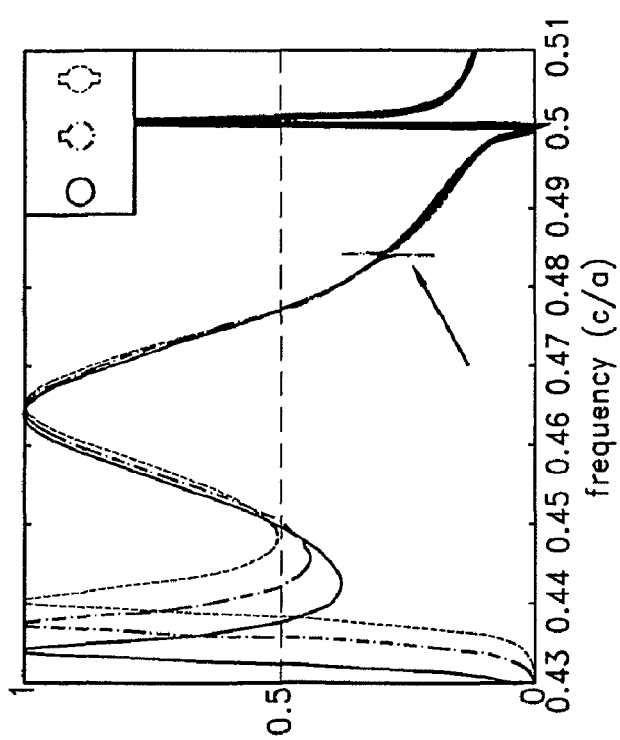

FIGS. 42A and 42B show finite-difference time-domain simulations (FDTD) of transmission spectra for these three different hole shapes for polarizations perpendicular and parallel, respectively, to the hole elongations. The transmission spectra of FIGS. 42A and 42B correspond to normal incidence transmission through a PCS structure with circular holes, mirror-asymmetric holes, and rotationally-asymmetric holes.

The simulations were done for a dielectric constant of 12, corresponding roughly to the dielectric constant of Si or GaAs at optical frequencies. The PCS thickness was chosen to be 0.75 a, where a is the lattice constant of the periodic structure. The radius of the circular portion of the hole was chosen to be 0.4 a and the width of the square-shaped regions was chosen to be 0.025 a. As can be seen in FIGS. 42A and 42B, additional sharp features (denoted by arrows) due to non-degenerate resonances are present only in the PCS structure lacking mirror symmetry. Each of these additional resonances appears only for one polarization and not for the other, thereby demonstrating the non-degenerate nature of these resonances.

Figure 43B:
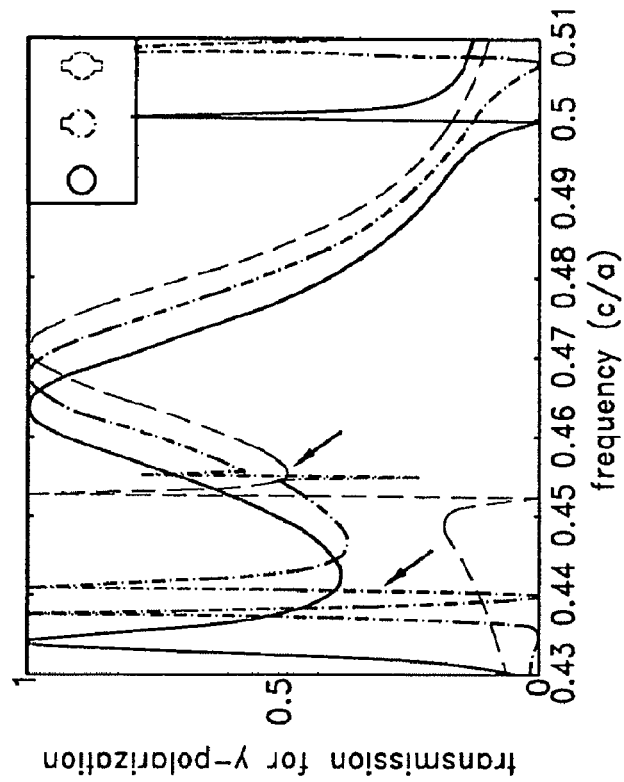
FIGS. 43A and 43B shows FDTD simulations of transmission spectra for incident light with polarizations perpendicular and parallel, respectively, to the hole elongations.
Figure 43A:
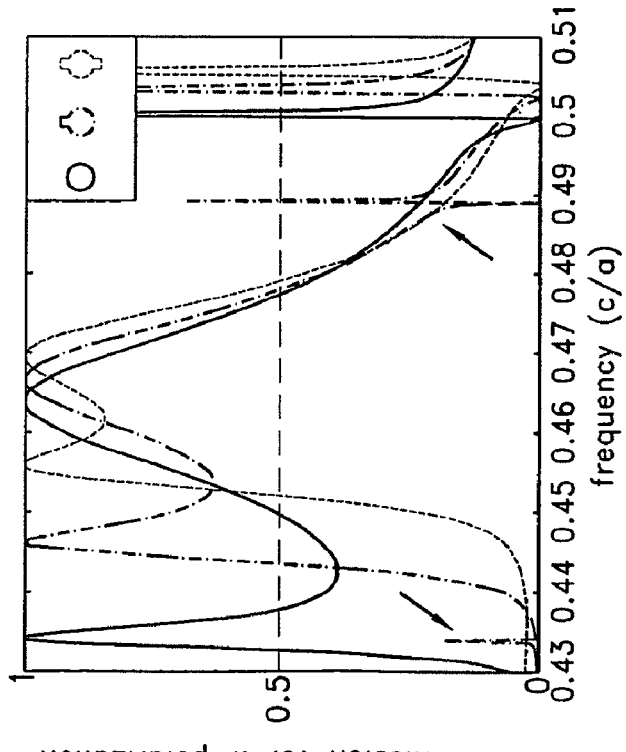

In certain embodiments, the magnitude of the asymmetry of the holes is selected to provide a desired amount of coupling to normally-incident plane waves. FIGS. 43A and 43B shows FDTD simulations of transmission spectra for incident light with polarizations perpendicular and parallel, respectively, to the hole elongations. To show that the quality factor of these resonances can be controlled, the size of the elongations was increased by 100% to 0.05 a. As shown by a comparison of FIGS. 43A and 43B with FIGS. 42A and 42B, the strength and linewidths of the non-degenerate resonances have increased with the increase in asymmetry. This behavior has also been measured from PCS structures with increasing asymmetry.

Figure 44A:
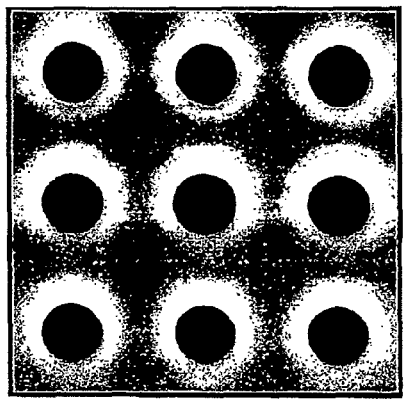
FIGS. 44A-44C are scanning-electron microscopy images of PCS structures with circularly-symmetric holes, mirror-asymmetric holes, and rotationally-asymmetric holes, respectively.
Figure 44D:
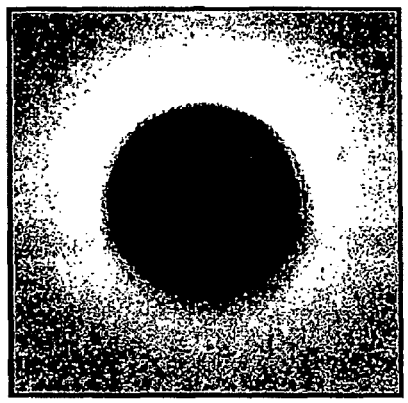
FIGS. 44D-44F are scanning-electron microscopy images of the circularly-symmetric holes, mirror-asymmetric holes, and rotationally-asymmetric holes, respectively.
Figure 44B:
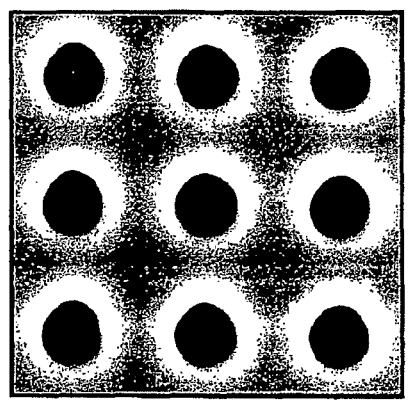
Figure 44E:
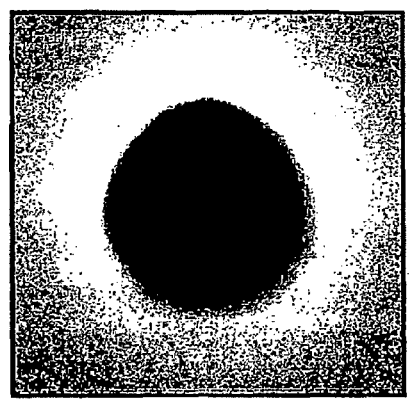
Figure 44C:
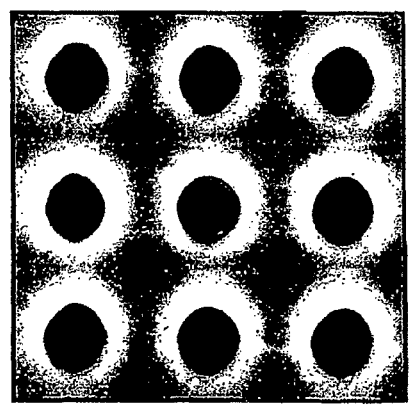
Figure 44F:
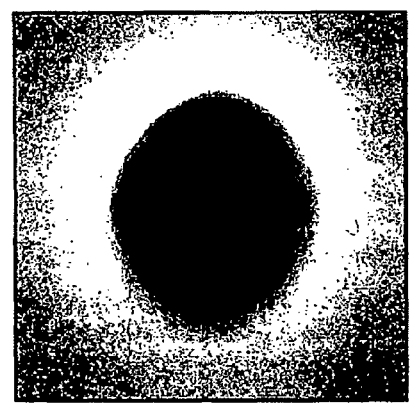

To demonstrate that the results of the analysis and simulations can be observed in a real structure, the three PCS structures generally corresponding to FIGS. 41A, 41D, and 41E were fabricated on free-standing silicon membranes. FIGS. 44A-44C are scanning-electron microscopy images of PCS structures with circularly-symmetric holes, mirror-asymmetric holes, and rotationally-asymmetric holes, respectively. FIGS. 44D-44F are scanning-electron microscopy images of the circularly-symmetric holes, mirror-asymmetric holes, and rotationally-asymmetric holes, respectively. The circular line overlaid on these SEM images facilitates seeing the small hole elongations of these PCS structures that produce the asymmetries. The material of the PCS was silicon, the thickness of the PCS was about 450 nanometers, the period of the lattice array was about 1000 nanometers, and the diameter of the holes was about 450 nanometers.

Figure 45A:
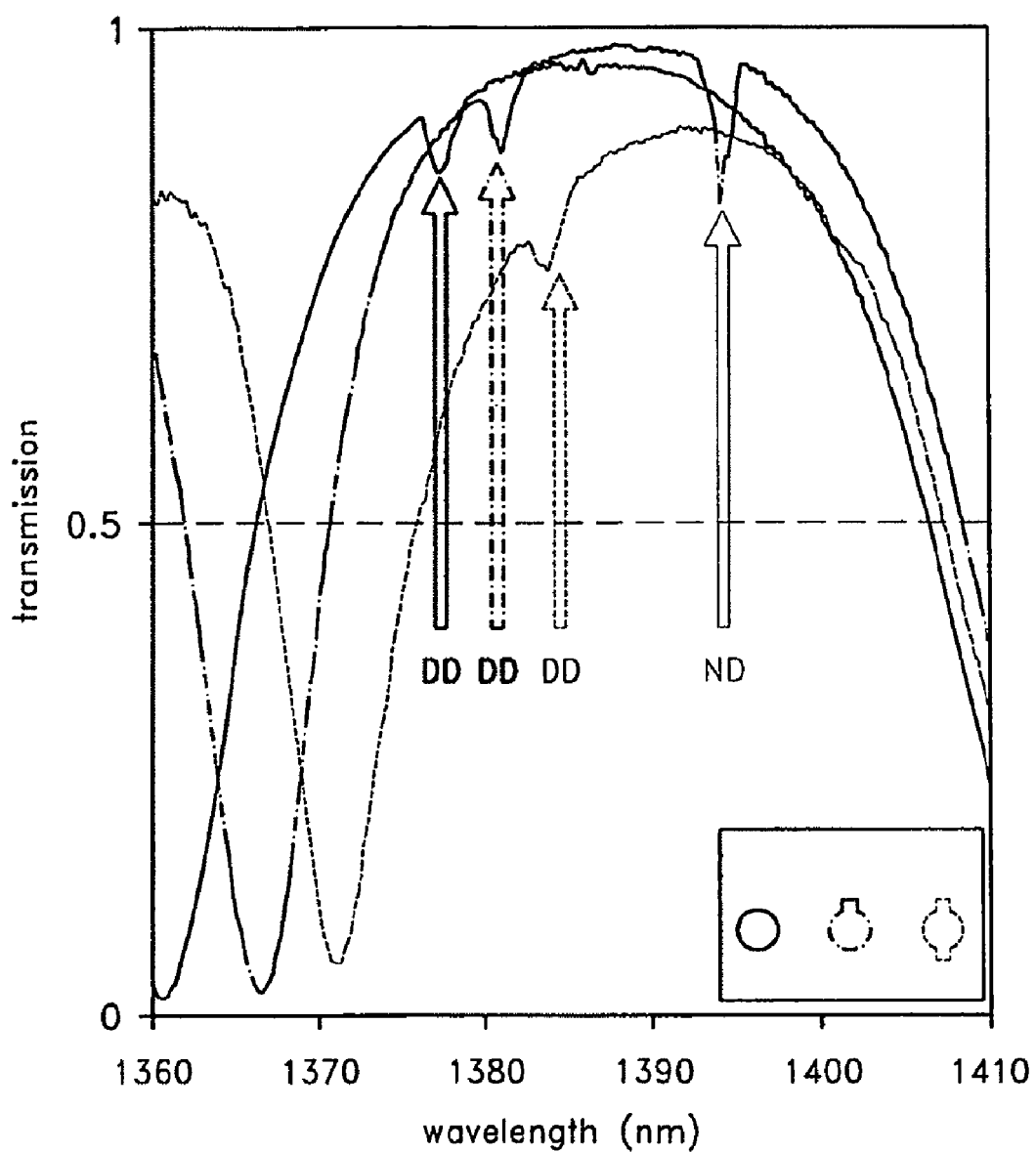
FIGS. 45A and 45B show experimental measurements of the transmission spectrum for the three different PCS structures for polarizations perpendicular and parallel, respectively, to the hole elongations.
Figure 45B:
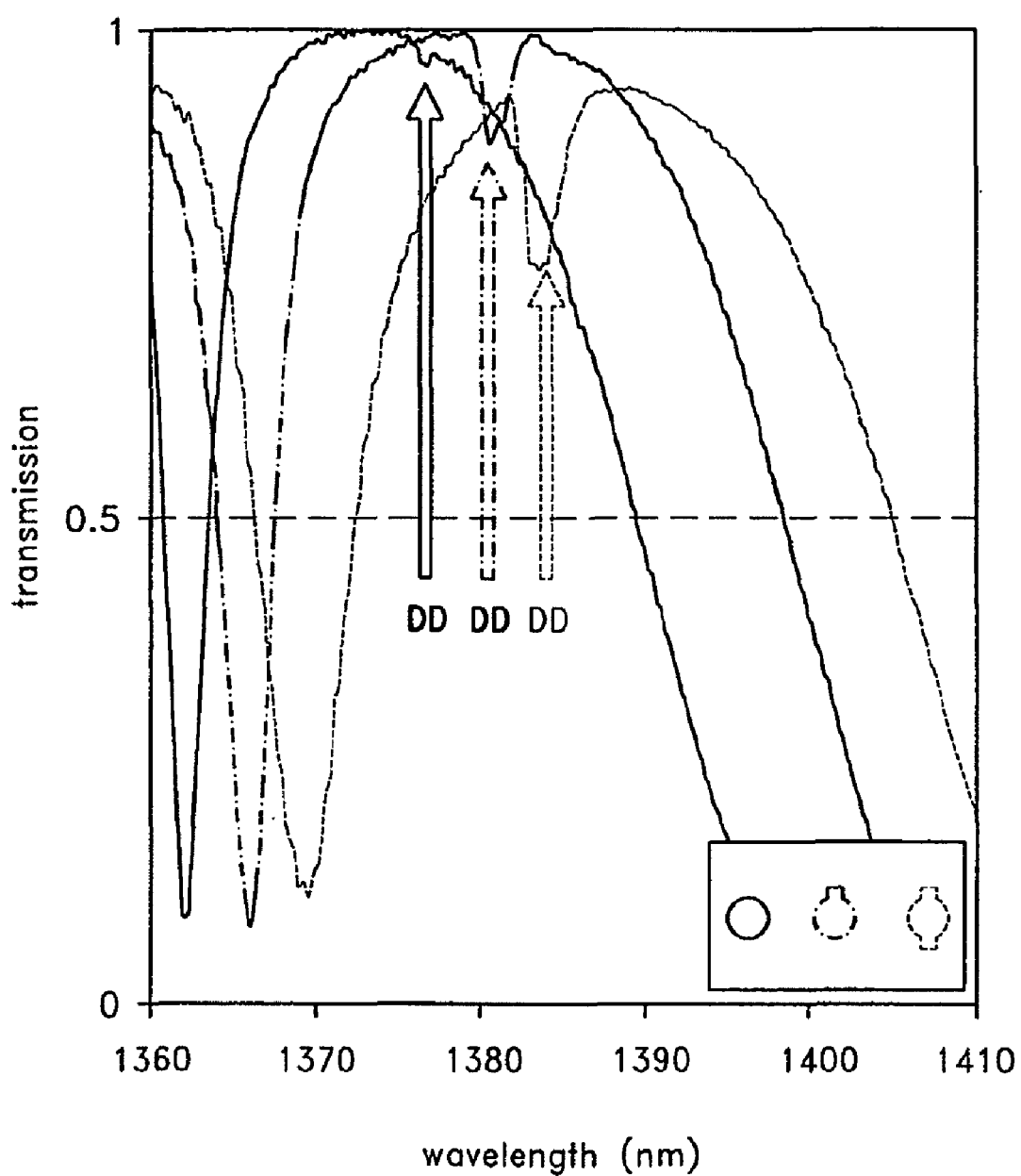

FIGS. 45A and 45B show experimental measurements of the transmission spectrum for the three different PCS structures for polarizations perpendicular and parallel, respectively, to the hole elongations. Sharp doubly-degenerate modes are observed for both polarizations, as denoted with arrows (labeled as DD) in all three of the PCS structures. There are also broader doubly-degenerate resonances present which are not denoted by arrows. As shown in FIG. 45A, there is an additional, relatively sharp resonance for the mirror-asymmetric PCS structure (corresponding to FIG. 44B and FIG. 44E) and this resonance is only present for one polarization (perpendicular to the hole elongation), showing its non-degeneracy (labeled as ND). There is a small difference in the transmission spectra for the two polarizations even for the case of the symmetric PCS structure (corresponding to FIG. 44A and FIG. 44D). This small difference is due to a small elongation of the lattice array in one direction due to the electron-beam exposure and subsequent fabrication steps used to form the PCS structure. However, this situation is not essential for the observation of the non-degenerate resonances.

The measured sharp resonances shown in FIGS. 45A and 45B do not vary over as large a transmission range as do the idealized calculations (which vary between 0 and 100% transmission in a range of one linewidth) due to the deterioration of the resonances through fabrication-related disorders. The measurements described herein were for a relatively large lattice array of size 100 microns by 100 microns, where disorder effects can play a significant role for sharp resonances. The angular content of the incident light with finite spot-size is another effect that can deteriorate sharp resonances. For a single defect cavity, such as one for a laser, the non-degenerate resonances can be much more dominant (e.g., they can vary from 0 to 100%).

Figure 46:
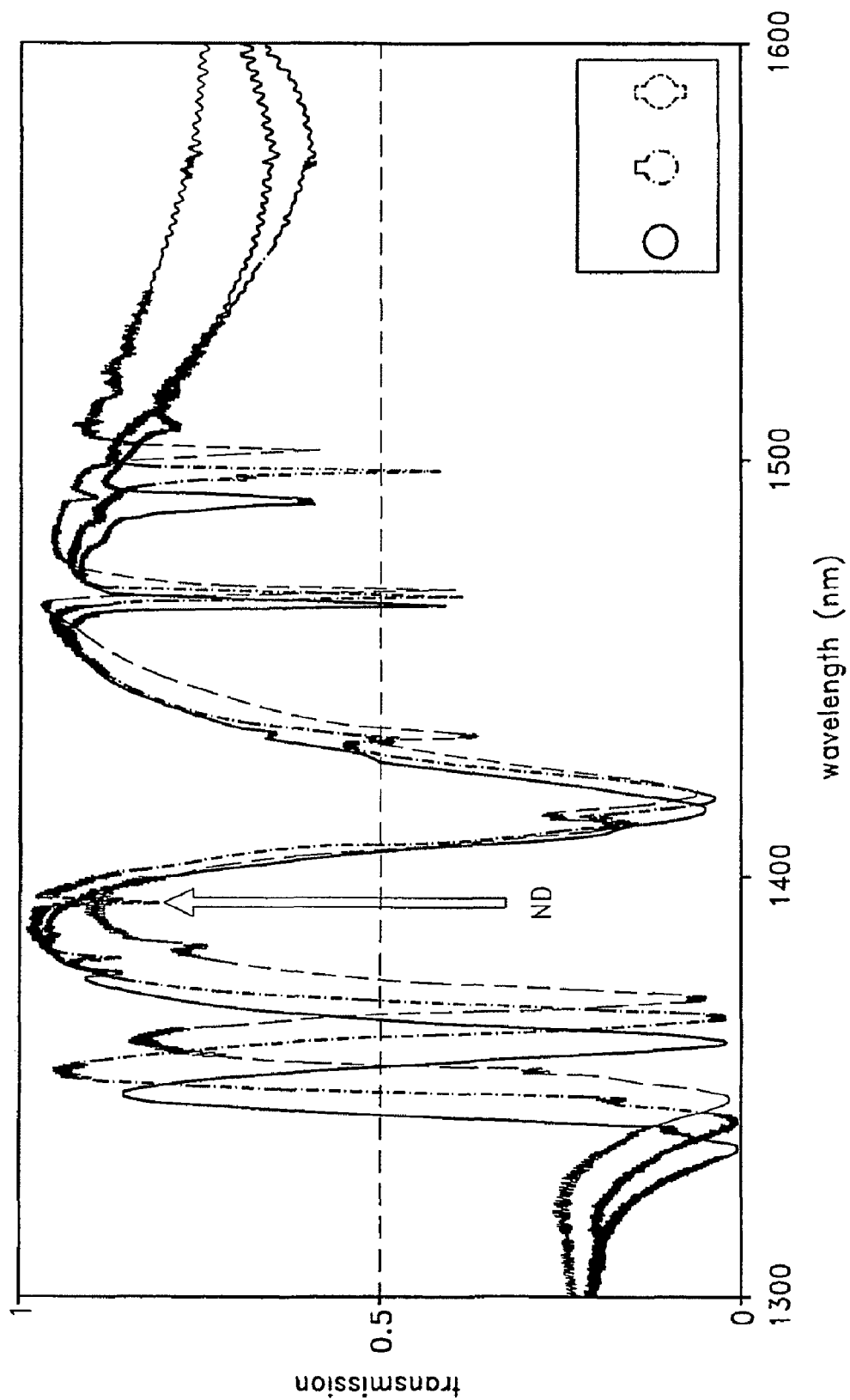
FIG. 46 illustrates the transmission spectra for the perpendicular polarization case of FIG. 45A on a larger wavelength range.

To illustrate that the non-degenerate resonance appears only in the mirror-asymmetric PCS structure (corresponding to FIG. 44B and FIG. 44E), FIG. 46 illustrates the transmission spectra for the perpendicular polarization case of FIG. 45A on a larger wavelength range. The non-degenerate nature of these resonances, combined with the fact that their inherently high quality factor can be tuned through a simple geometrical parameter that can be controlled lithographically enable a variety of applications including acoustic sensing systems and devices for mode selection and linewidth control in lasers. Such structures will also find use as very sharp filters in sensor applications.

Acoustic Sensor Systems

Figure 47:
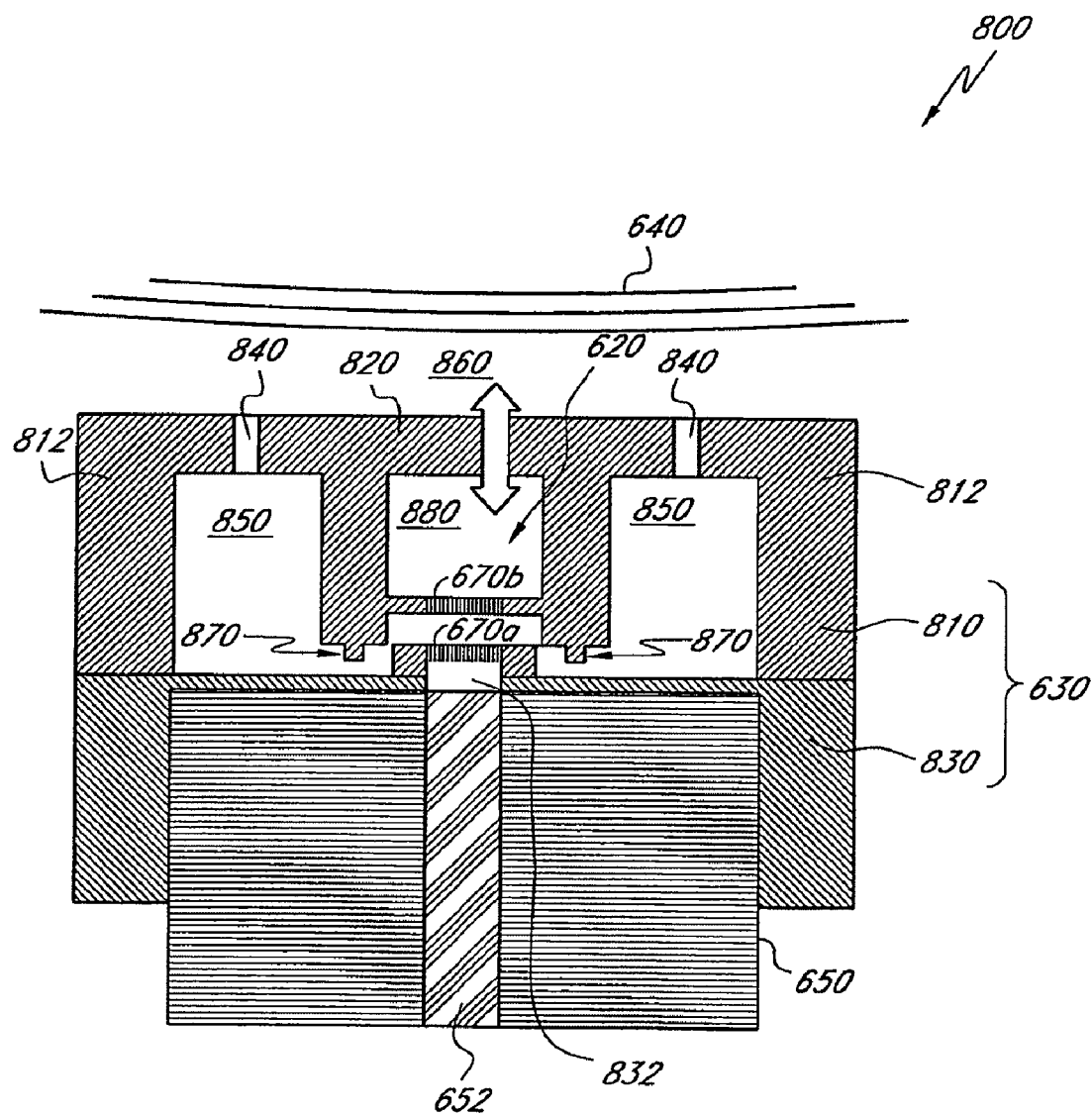
FIG. 47 schematically illustrates an example acoustic sensor system having a housing compatible with certain embodiments described herein.

FIG. 47 schematically illustrates an example acoustic sensor system 800 compatible with certain embodiments described herein. In certain embodiments, the acoustic sensor system 800 comprises at least one photonic crystal structure 620 having at least one optical resonance with a resonance frequency and a resonance lineshape. The acoustic sensor system 800 further comprises a housing 630 substantially surrounding the at least one photonic crystal structure 620 and mechanically coupled to the at least one photonic crystal structure 620. At least one of the resonance frequency and the resonance lineshape of the at least one photonic crystal structure 620 is responsive to acoustic waves 640 incident upon the housing 630. As illustrated by FIG. 47, in certain embodiments, the acoustic sensor system 800 further comprises an optical fiber 650 optically coupled to the at least one photonic crystal structure 620.

In certain embodiments, the acoustic sensor system 800 is compatible with operation in a liquid (e.g., seawater) or other media. As schematically illustrated in FIG. 47, an acoustic wave 640 impinges on, and is detected by, the acoustic sensor system 800.

In the embodiment schematically illustrated by FIG. 47, the at least one photonic crystal structure 620 comprises two PCSs 670a, 670b optically coupled to one another and in close proximity to one another (referred to herein as a double-PCS structure). In certain embodiments the two PCSs 670a, 670b are substantially parallel to one another. In certain embodiments, the two PCSs 670a, 670b are optically coupled to each other in the near-field configuration. In certain other embodiments, the two PCSs 670a, 670b are placed further apart so that they are not optically coupled in the near-field configuration, but form a simple Fabry-Perot cavity (i.e., the Fabry-Perot configuration). In certain embodiments, the resonances of the photonic crystal structure 620 shift in frequency (and in the corresponding wavelength) when the vertical distance between the two PCSs 670a, 670b is changed. Example photonic crystal structures 620 compatible with certain embodiments described herein are described in "*Displacement-sensitive photonic crystal structures based on guided resonance in photonic crystal slabs*," W. Suh et al., Appl. Phys. Lett. vol. 82, No. 13, pages 1999-2001 (1999), and U.S. Patent Publication No. 2004/0080726 A1 which is incorporated in its entirety by reference herein.

In certain embodiments, the PCSs 670a, 670b undergo movement relative to one another (e.g., one movable PCS 670b moves relative to a non-moving PCS 670a) in response to forces applied to the at least one photonic crystal structure 620. In the embodiment schematically illustrated by FIG. 47, the PCSs 670a, 670b of the photonic crystal structure 620 are illuminated by light emitted from the fiber core 652 of the optical fiber 650. When the PCSs 670a, 670b move vertically with respect to one another, the frequency (and the corresponding wavelength) of the sharp optical resonances supported by the photonic crystal structure 620 shift due to the changed optical coupling between the guided resonances of the individual PCSs 670a, 670b. This shift results in a change of the intensity or the phase of the light reflected from or transmitted through the photonic crystal structure 620 and provides an observable quantity to measure the relative displacement between the two PCSs 670a, 670b.

In certain embodiments, the housing 630 comprises a structure 810 comprising one or more supports 812 and a movable portion 820. The housing 630 further comprises a coupler 830 configured to be coupled to the optical fiber 650. The movable portion 820 is mechanically coupled to the coupler 830 by the one or more supports 812. The optical fiber 650 of certain embodiments passes through an opening in the coupler 830 and the fiber core 652 is in proximity to and is optically coupled with the photonic crystal structure 620.

Example materials for the structure 810, the movable portion 820, and the supports 812 include, but are not limited to, crystalline silicon, polysilicon, silica, silicon nitride, ceramics, plastics, amorphous diamond, germanium, indium phosphide, gallium arsenide, and metals and metal alloys. Example materials for the coupler 830 include, but are not limited to, crystalline silicon, Pyrex glass, quartz, polysilicon, silica, silicon nitride, ceramics, plastics, amorphous diamond, germanium, indium phosphide, gallium arsenide, and metals and metal alloys.

In certain embodiments, the coupler 830 comprises an optically transmissive portion 832 (e.g., a hole, a window, an optically transmissive membrane) through which the optical fiber 650 emits light to irradiate the photonic crystal structure 620. The optically transmissive portion 832 allows light emitted by the fiber core 652 to irradiate the photonic crystal structure 620, and allows light reflected by the photonic crystal structure 620 to be received by the fiber core 652.

The movable portion 820 is configured to move (e.g., as denoted by the double-headed arrow in FIG. 47) in response to the pressure modulations of an acoustic wave 640 incident on the movable portion 820. In the embodiment schematically illustrated by FIG. 47, one PCS 670a (e.g., the PCS closer to the optical fiber 650) is generally stationary, while the other PCS 670b (e.g., the PCS farther from the optical fiber 650) is attached to the movable portion 820 of the structure 810. In certain other embodiments, the PCS 670b is generally stationary while the PCS 670a is attached to the movable portion 820.

In certain embodiments, the movement of the PCS 670b has a component in a direction substantially perpendicular to the PCS 670a, wherein the movement changes a distance between the PCSs 670a, 670b. In the embodiment schematically illustrated by FIG. 47, the PCS 670b attached to the structure 810 will simultaneously move in response to an incident acoustic wave 640, such that the acoustic wave 640 modulates the distance between the two PCSs 670a, 670b. In this way, the reflectivity (e.g., the power of the reflected light) and/or the transmissivity (e.g., the power of the transmitted light) of the photonic crystal structure 620 is modulated by the incident acoustic wave 640. The optical signal reflected from the photonic crystal structure 620 is transmitted back to the optical fiber 650 and directed to a detector (not shown), which measures the reflected signal power. In certain embodiments, the phase of the reflected light is measured instead of the power of the reflected light. In certain embodiments, the movement of the PCS 670b has a component in a direction substantially parallel to the PCS 670a.

In certain embodiments, the sensitivity (e.g., the change of the detected reflected power per unit of incident acoustic pressure) of the photonic crystal structure 620 is advantageously increased by utilizing a signal having a frequency (or wavelength) offset slightly from one of the resonance frequencies (or wavelengths) of the double-PCS photonic crystal structure 620. In certain embodiments utilizing extremely high sensitivities, the PCSs 670a, 670b are designed to have extremely sharp resonances, e.g., by breaking a mirror symmetry of at least one of the PCSs 670a, 670b, as described herein.

In certain embodiments, the mechanical properties of the acoustic sensor structure 800 (e.g., mechanical resonance frequency, spring constant) are dependent on both the movable portion 820 of the structure 810 and the one or more supports 812. In certain embodiments, the movable portion 820 serves as the mechanical spring by providing a restoring force in response to displacements of the movable portion 820 by acoustic waves 640. In certain other embodiments, the supports 812 serve as the mechanical spring by providing the restoring force in response to displacements of the movable portion 820 by acoustic waves 640. Other embodiments utilizing other spring designs for the structure 810 or the supports 812 are also compatible with embodiments described herein.

In certain embodiments, the acoustic sensor system 800 is insensitive to static pressure variations in the medium (e.g., seawater) in which it operates. As an example, the acoustic sensor system 800 of certain embodiments is operable close to the surface of seawater, or several feet below the surface of seawater. In certain embodiments, the housing 630 comprises at least one pressure conduit 840 between an inner region 850 within the housing 630 and an outer region 860 outside the housing 630. In certain embodiments, the at least one pressure conduit 840 comprises the movable portion 820 of the housing 630. In certain such embodiments, the movable portion 820 comprises an elastic membrane that is responsive to a pressure differential between the inner region 850 and the outer region 860 by moving to remove the pressure differential. In certain embodiments, the supports 810 provide the restoring force to the movable portion 820 and are responsive to a pressure differential across the movable portion by moving the movable portion 820 to reduce the pressure differential. The at least one pressure conduit 840 of certain embodiments serves as low-pass filters that equalize the static pressure between the inner region 850 and the outer region 860.

In certain embodiments, the at least one pressure conduit 840 comprises a hole through the housing 630, with the hole fluidly coupling the inner region 850 with the outer region 860. In certain such embodiments, the inner region 850 is filled with the same medium (e.g., seawater) of the acoustic waves 640 as is the outer region 860, and the medium is free to flow between the inner region 850 and the outer region 860. In certain embodiments, the at least one pressure conduit 840 comprises a hole through the housing 630 and an elastic membrane that seals the at least one pressure conduit 840 to fluidly isolate the inner region 850 from the outer region 860. The membrane of certain embodiments is responsive to a pressure differential between the inner region 850 and the outer region 860 by moving to reduce the pressure differential, thereby still acting as a low-pass filter equalizing the pressure inside and outside the acoustic sensor system 800, while keeping the medium (e.g., seawater) from entering the acoustic sensor system 800. In certain such embodiments in which it is desirable to not expose the photonic crystal structure 620 or other internal components of the acoustic sensor system 800 to the medium (e.g., seawater) which can be corrosive and dirty, the membrane advantageously keeps the medium of the acoustic waves 640 from entering the inner region 850 within the housing 630. Example materials for the membrane include, but are not limited to, silicon nitride or rubber.

In certain embodiments, the acoustic sensor system 800 includes other structural components for better performance and reliability. These other structural components are not crucial for the operation of the acoustic sensor system 800. In certain embodiments, the acoustic sensor system 800 comprises one or more spacers 870 positioned to avoid contact between the two PCSs 670a, 670b in response to a large-magnitude pressure wave incident on the acoustic sensor system 800, thereby advantageously avoiding stiction between the two PCSs 670a, 670b. The spacers 870 of certain embodiments serve as safety structures which define a minimum separation between the two PCSs 670a, 670b, thereby preventing the two PCSs 670a, 670b from contacting and sticking to each other. Example materials for the spacers 870 include, but are not limited to, crystalline silicon, polysilicon, silicon nitride, silicon oxide, amorphous diamond, ceramics, plastics, germanium, indium phosphide, gallium arsenide, and metals and metal alloys. In certain embodiments, amorphous diamond is used because it is hydrophobic which facilitates the prevention of sticking of the two PCSs 670a, 670b.

Due to the sensitivity of the optical properties of the photonic crystal structure 20 on the medium surrounding the PCSs 670a, 670b, in certain embodiments, the medium in which the acoustic sensor system 800 is placed (e.g., water) is advantageously restricted from the region 880 within the acoustic sensor system 800. In certain such embodiments, the PCSs 670a, 670b of the photonic crystal structure 620 operate within a gas (e.g., air). In certain embodiments, the housing 630 defines a region (e.g., inner region 850) comprising a liquid and external to the at least one photonic crystal structure 620 and defines the region 880 containing the at least one photonic crystal structure 620 and that is substantially free of the liquid. While liquid may be able to intrude into the region 880 through the opening under the spacers 870, in certain embodiments, both the pressure of the gas inside the region 880 and the small size of the openings under the spacers 870 are selected to advantageously prevent intrusion of the liquid into the region 880, which could otherwise degrade the operation of the acoustic sensor system 800. Certain embodiments advantageously improve the liquid expulsion out of the region 880 further by providing at least a portion of the photonic crystal structure 620 with a hydrophobic surface configured to restrict the liquid from the region 880.

Figure 48:
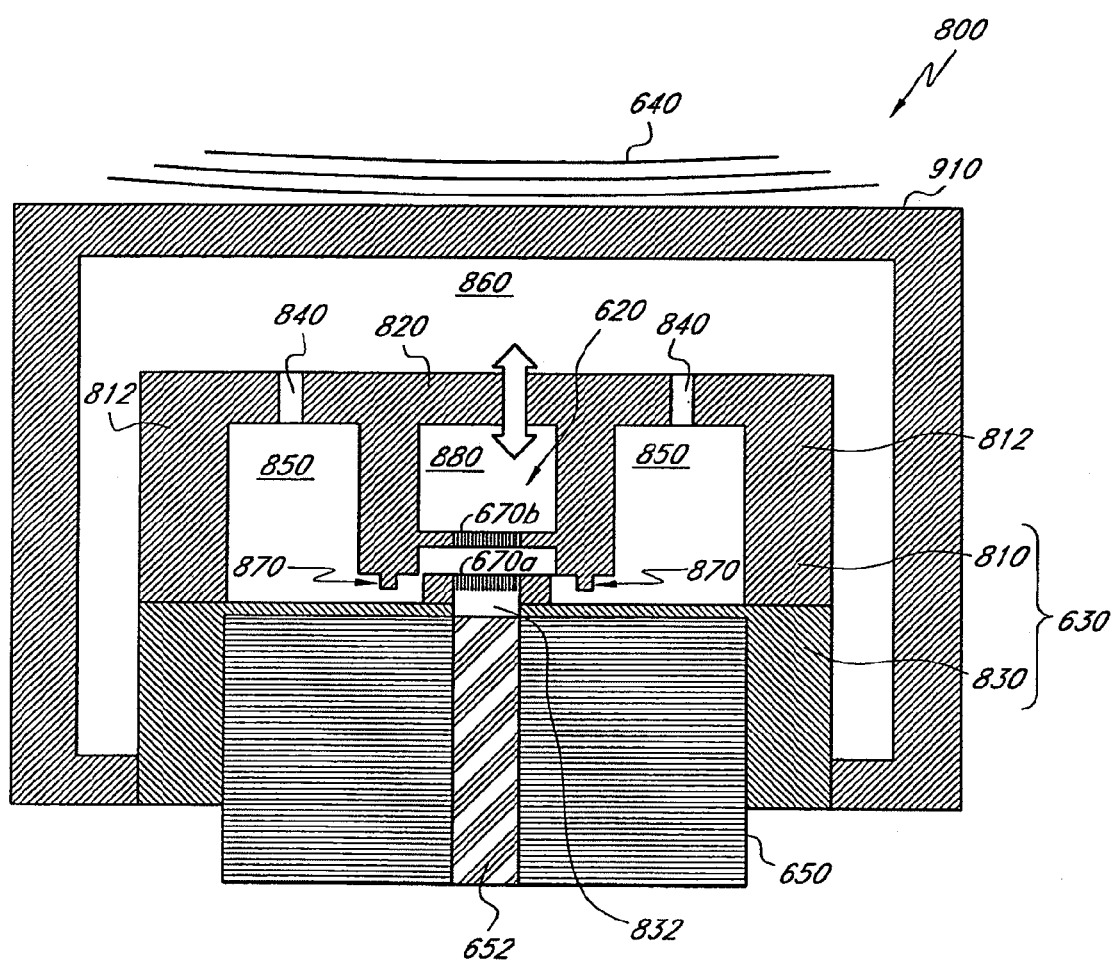
FIG. 48 schematically illustrates an example acoustic sensor system having a secondary housing compatible with certain embodiments described herein.

FIG. 48 schematically illustrates an example acoustic sensor system 800 comprising a secondary housing 910. The secondary housing 910 of certain embodiments is mechanically coupled to the housing 630 and contains a non-corrosive liquid or gas, including but not limited to, deionized water, isopropanol, or air. Certain such embodiments advantageously protect various components of the acoustic sensor system 800 from corrosion or other damage from the medium (e.g., seawater) in which the acoustic waves 640 are being measured.

In certain embodiments, the secondary housing 910 is sufficiently elastic to equalize the pressure outside and inside the secondary housing 910 such that pressure modulations due to the incident acoustic wave 640 are translated into the medium (e.g., gas or fluid) within the secondary housing 910. In certain such embodiments, the secondary housing 910 comprises a balloon. In certain other embodiments, the secondary housing 910 comprises a rigid portion and an elastic membrane.

Figure 49:
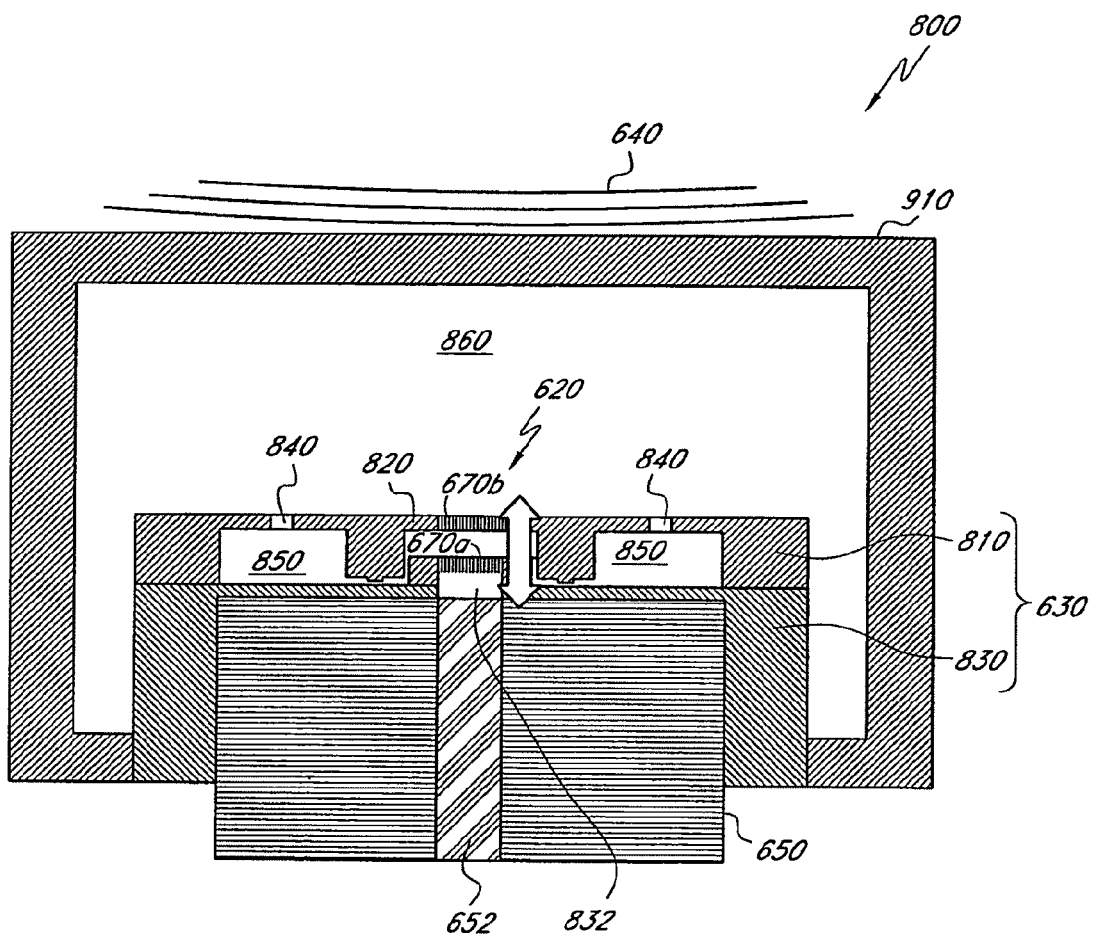
FIG. 49 schematically illustrates another example acoustic sensor system having a secondary housing compatible with certain embodiments described herein.

FIG. 49 schematically illustrates another example acoustic sensor system 800 having a secondary housing 910 which protects the photonic crystal structure 620 within the secondary housing 910. In certain embodiments, the photonic crystal structure 620 is sealed within the secondary housing 910 with a clean, non-corrosive, and non-damaging liquid or gas in the inner region 850 and in the outer region 860. In certain such embodiments, the movable PCS 670b of the photonic crystal structure 620 is directly on the movable portion 820 of the housing 630.

Figure 50:
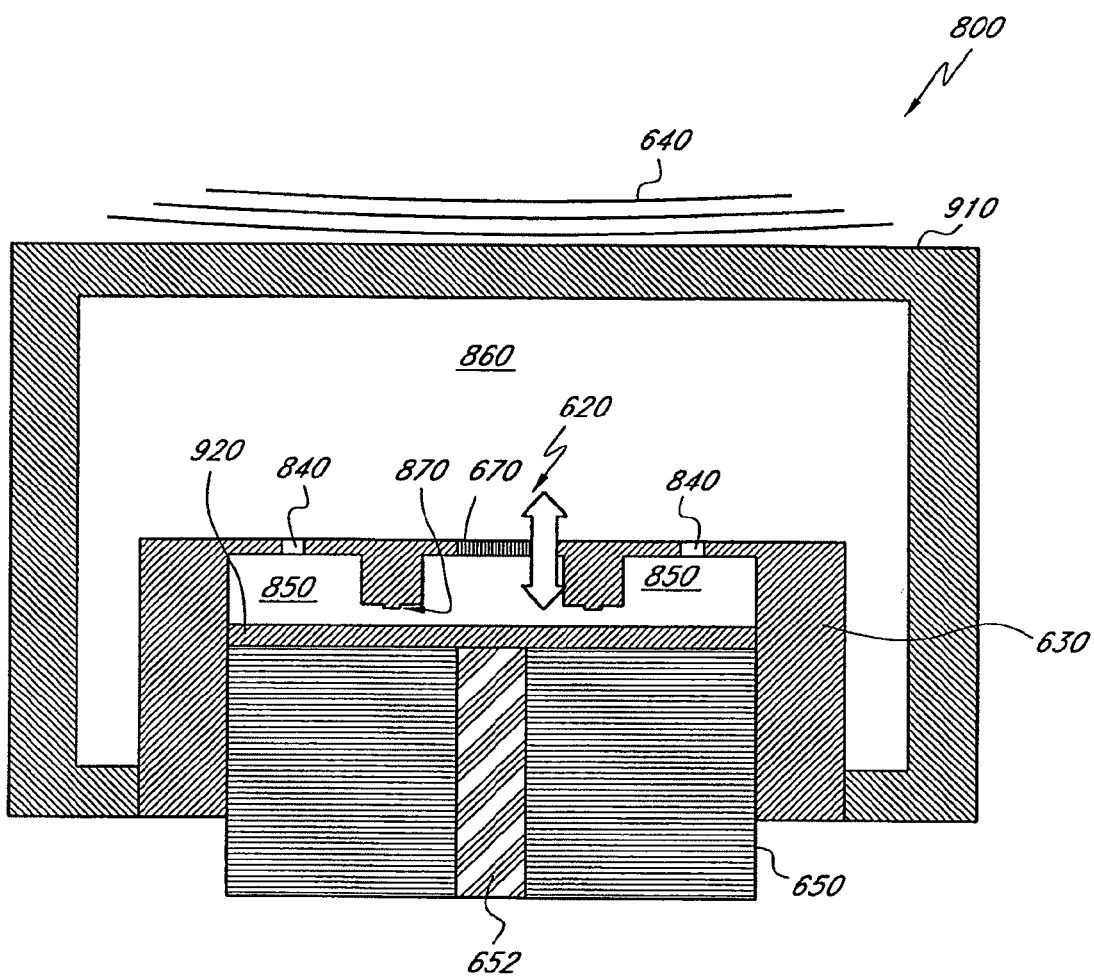
FIG. 50 schematically illustrates an example acoustic sensor system having a metal layer on the optical fiber and a single PCS compatible with certain embodiments described herein.

FIG. 50 schematically illustrates an example acoustic sensor system 800 comprising a photonic crystal structure 620 comprising a single PCS 670. The acoustic sensor system 800 further comprises a metal layer 920 that is at least partially transmissive and at least partially reflective to light emitted by the optical fiber 650. In certain embodiments, the metal layer 920 is a metal coating on the end of the optical fiber 650. In certain embodiments, the PCS 670 and the metal layer 920 form a Fabry-Perot interferometric cavity that is sensitive to displacements of the PCS 670 relative to the metal layer 920. In certain embodiments, the metal layer 920 comprises a thin adhesion layer (e.g., chromium or titanium layer with a thickness of about 4 nanometers) on the optical fiber 650, and a gold or silver layer on the adhesion layer and having a thickness in a range between about 5 nanometers and about 50 nanometers. In certain other embodiments, the metal layer 920 comprises an aluminum layer on the optical fiber 650 and having a thickness in a range between about 5 nanometers and about 50 nanometers. In certain other embodiments, other metals and metal alloys can be used. In certain embodiments, utilizing the metal layer 920 simplifies the fabrication process of the device.

Figure 51:
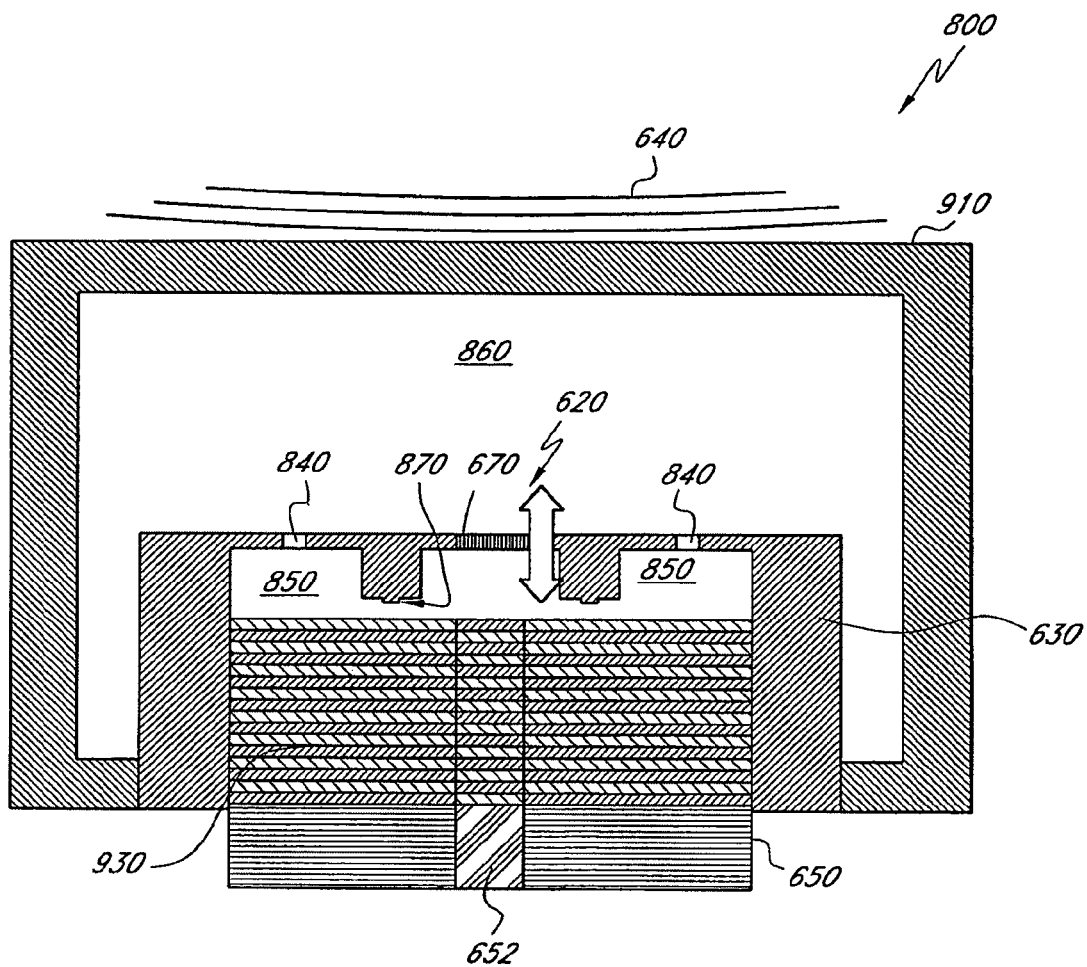
FIG. 51 schematically illustrates an example acoustic sensor system having a fiber Bragg grating and a single PCS compatible with certain embodiments described herein.

FIG. 51 schematically illustrates an example acoustic sensor system 800 comprising a photonic crystal structure 620 comprising a single PCS 670. The acoustic sensor system 800 further comprises a Bragg grating at or near the end of the optical fiber 650. In certain embodiments, the Bragg grating comprises a grating deposited at or near the end of the optical fiber 650 and that is a few micrometers thick. In certain other embodiments, as schematically illustrated by FIG. 51, the Bragg grating comprises a fiber Bragg grating 930 which is part of the optical fiber 650. The fiber Bragg grating 930 is at least partially transmissive and at least partially reflective to light emitted by the optical fiber 650. In certain embodiments, the PCS 670 and the fiber Bragg grating 930 form a Fabry-Perot interferometric cavity that is sensitive to displacements of the PCS 670 relative to the fiber Bragg grating 930. Typically, fiber Bragg gratings have a pitch of several hundred nanometers and a total length ranging from several hundred micrometers to several millimeters. The fiber Bragg grating of certain embodiments provides a reflectivity from a few percent up to almost 100% in a wavelength bandwidth ranging from picometers up to several nanometers. The optical properties of such combinations of a single PCS 670 and a fiber Bragg grating 930 are described more fully below. Fiber Bragg gratings 930 compatible with certain embodiments described herein are commercially available and use of such fiber Bragg gratings can simplify fabrication of the acoustic sensor system 800.

Figure 52:
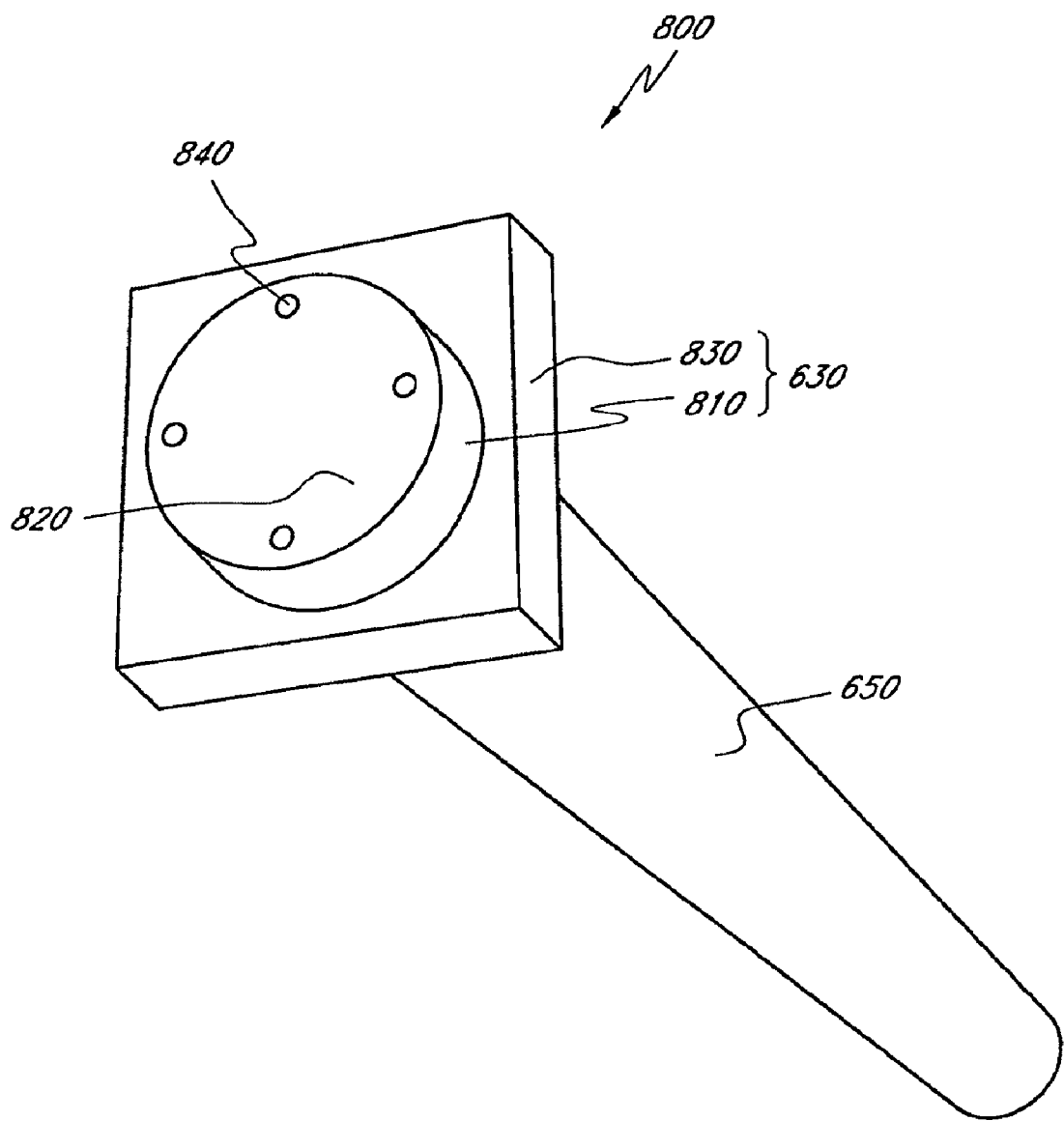
FIG. 52 schematically illustrates a perspective view of an example configuration of an acoustic sensor system coupled to one end of an optical fiber.

FIG. 52 schematically illustrates a perspective view of an example configuration of an acoustic sensor system 800 coupled to one end of an optical fiber 650. The acoustic sensor system 800 comprises a housing 630 having a structure 810 with a movable portion 820 and pressure conduits 840 (e.g., holes) and a coupler 830. Other configurations of the acoustic sensor system and the optical fiber are also compatible with embodiments described herein.

Certain embodiments of the acoustic sensor system 800 described herein provide various advantages over standard fiber-based sensor systems. In certain embodiments, the acoustic sensor system 800 advantageously achieves higher frequency operation due to the flexibility provided by MEMS fabrication technology. In certain such embodiments, the acoustic sensor system 800 is designed to operate at frequencies larger than 10 kHz, a range that is inaccessible for present-day acoustic fiber sensor systems, and in certain embodiments, can operate at frequencies up to about 50 kHz. In certain embodiments, the PCS-based acoustic sensor system described herein is advantageously more sensitive at higher frequencies than are present-day acoustic fiber sensor systems. In certain embodiments, the acoustic sensor system 800 advantageously provides high sensitivity (e.g., sensitive to less than 30 micropascals/$Hz^{1/2}$). In certain embodiments, the acoustic sensor system 800 comprises a photonic crystal structure 620 that can be fabricated on substrates (e.g., chips) using lithography techniques (as described more fully below), thereby facilitating mass production and low cost, and that is fiber-compatible. In certain embodiments, utilizing MEMS fabrication technology to fabricate the acoustic sensor system 800 advantageously results in acoustic sensor systems that are small in size, light, and compact. In certain embodiments, the compactness of the PCS-based acoustic sensor systems described herein advantageously facilitates their deployment. In certain embodiments, the PCS-based acoustic sensor systems described herein can be advantageously designed to be insensitive to the polarization of the incident light, thereby eliminating the need for compensation for polarization-induced signal fading.

Fabrication

In certain embodiments, surface micromachining techniques and bulk micromachining techniques are used in the fabrication process flow to form various components of the acoustic sensor system 800. Lithography techniques compatible with embodiments described herein include, but are not limited to, optical lithography, electron-beam lithography, nano-imprinting techniques, and other techniques generally compatible with microelectromechanical system (MEMS) fabrication. Surface micromachining techniques compatible with embodiments described herein include, but are not limited to, film deposition, dry etching, wet etching, epitaxial growth, wafer bonding, and sacrificial releasing. Bulk micromachining techniques compatible with embodiments described herein include, but are not limited to, anisotropic or isotropic deep reactive ion etching, anisotropic wet etching using KOH (potassium hydroxide) or TMAH (tetramethylammonium hydroxide), and isotropic wet etching.

Figure 53A:
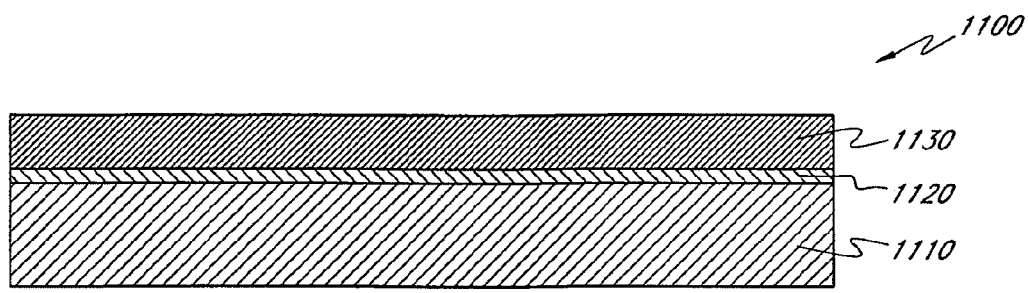
FIGS. 53A-53Q schematically illustrate an example fabrication process flow compatible with certain embodiments described herein for the components of the acoustic sensor system.
Figure 53B:
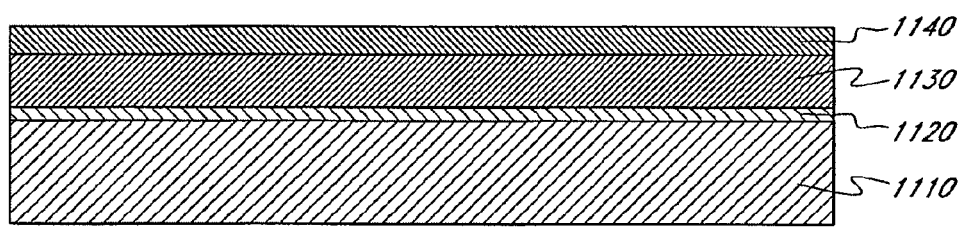
Figure 53C:
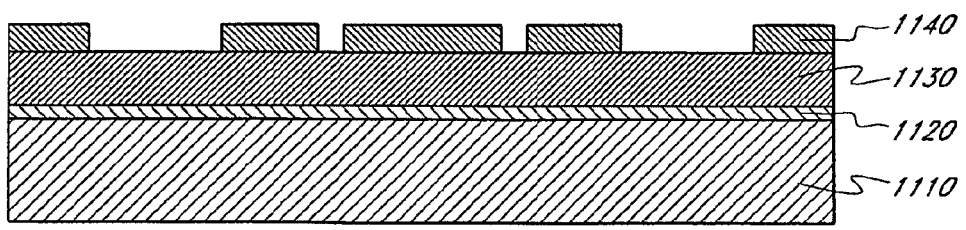
Figure 53D:
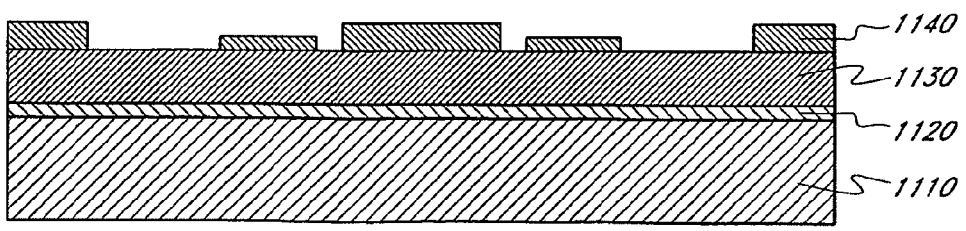
Figure 53E:
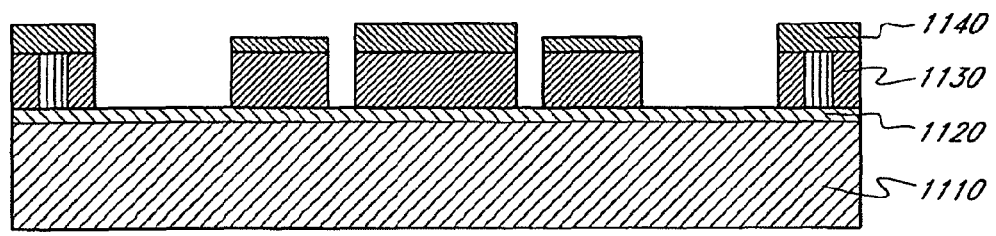
Figure 53F:
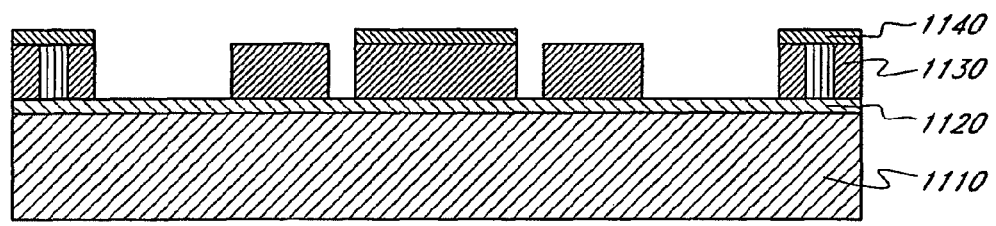
Figure 53G:
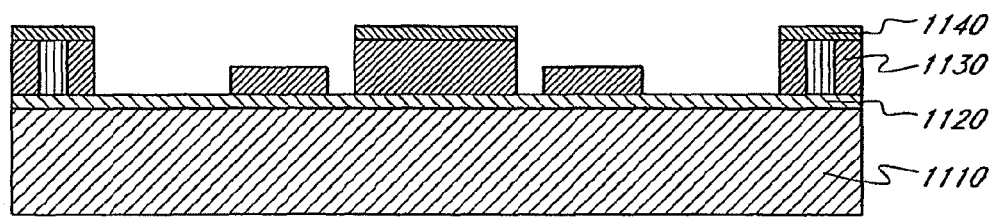
Figure 53H:
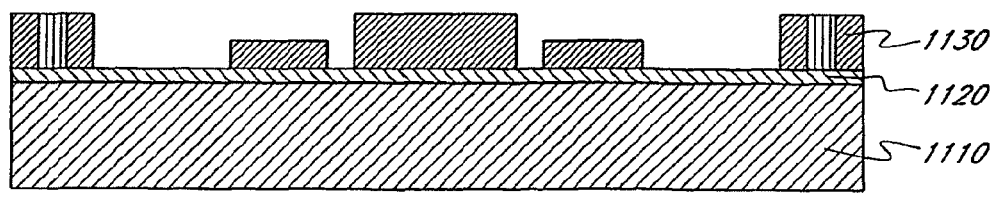
Figure 53I:
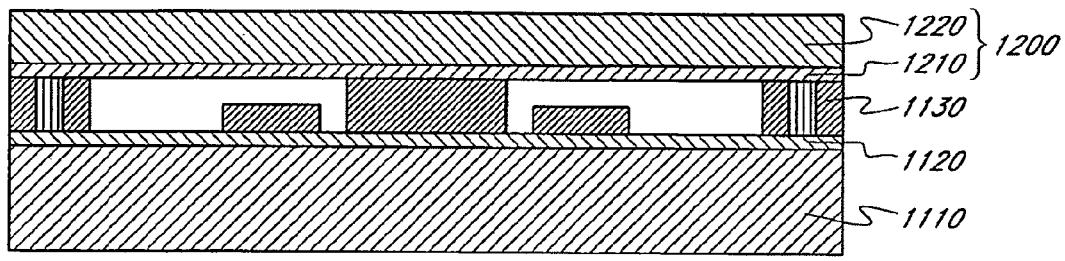
Figure 53J:
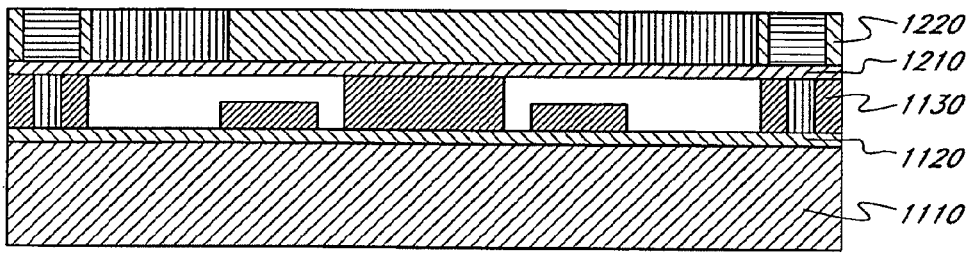
Figure 53K:
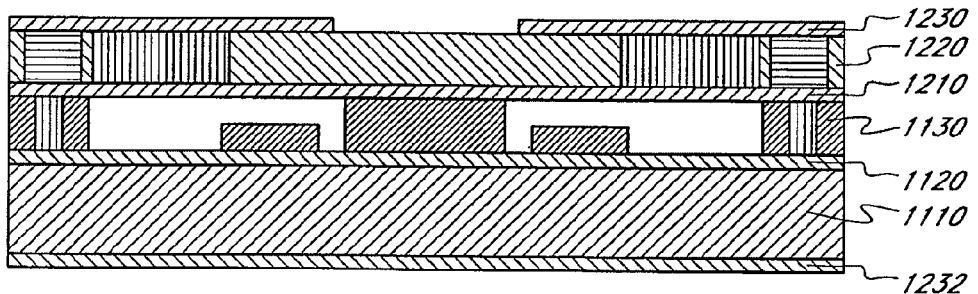
Figure 53L:
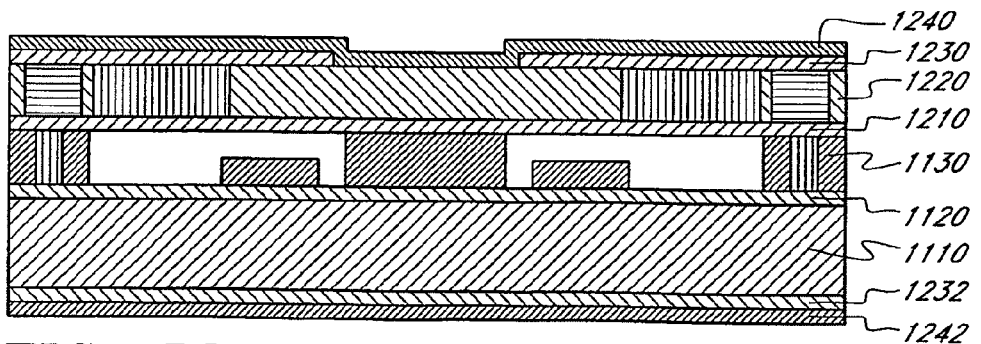
Figure 53M:
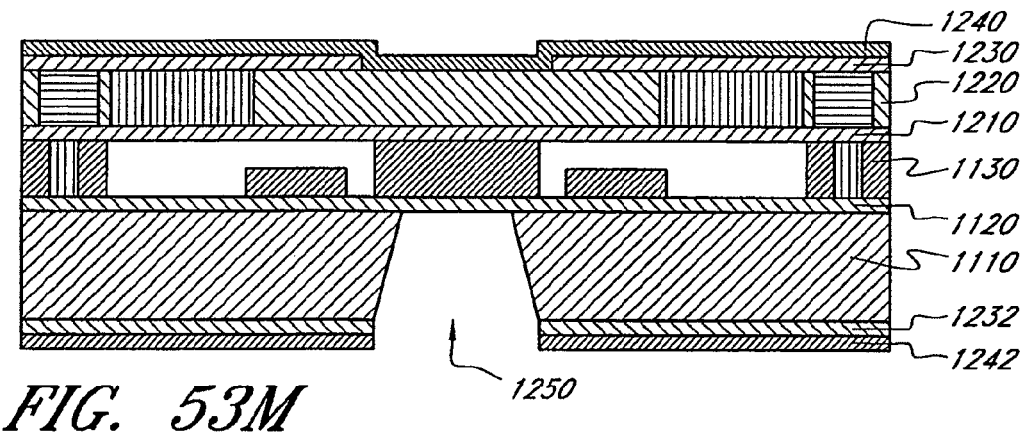
Figure 53N:
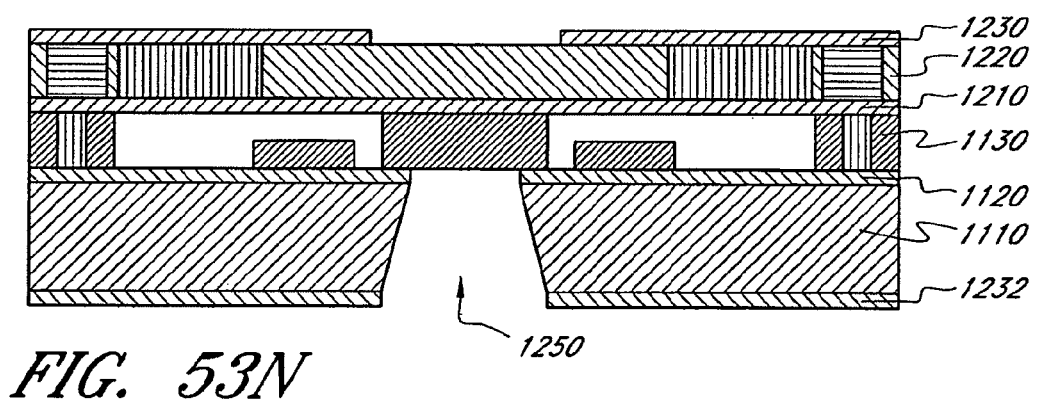
Figure 53O:
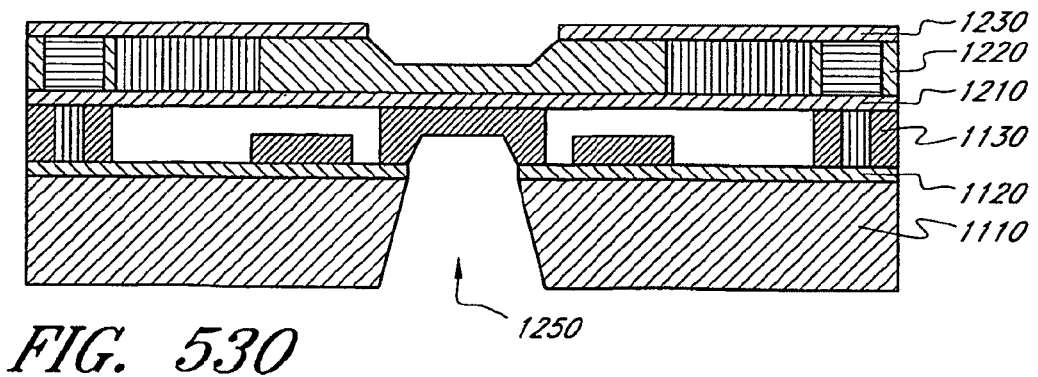
Figure 53P:
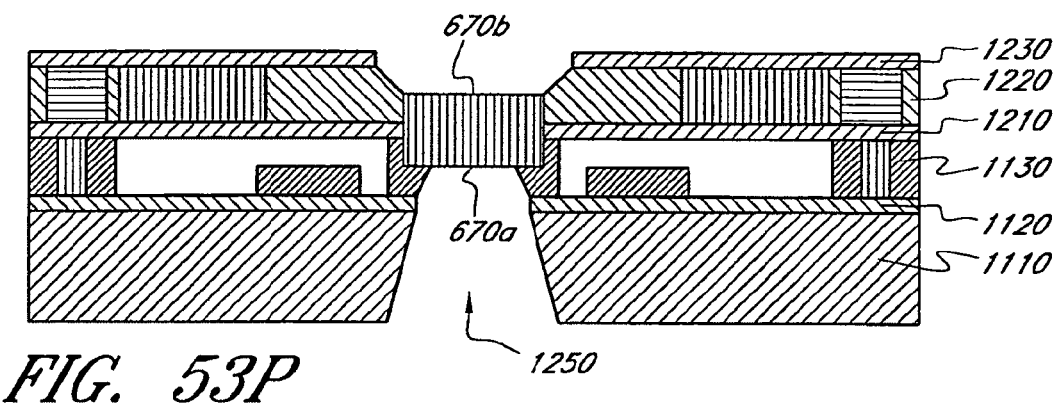
Figure 53Q:
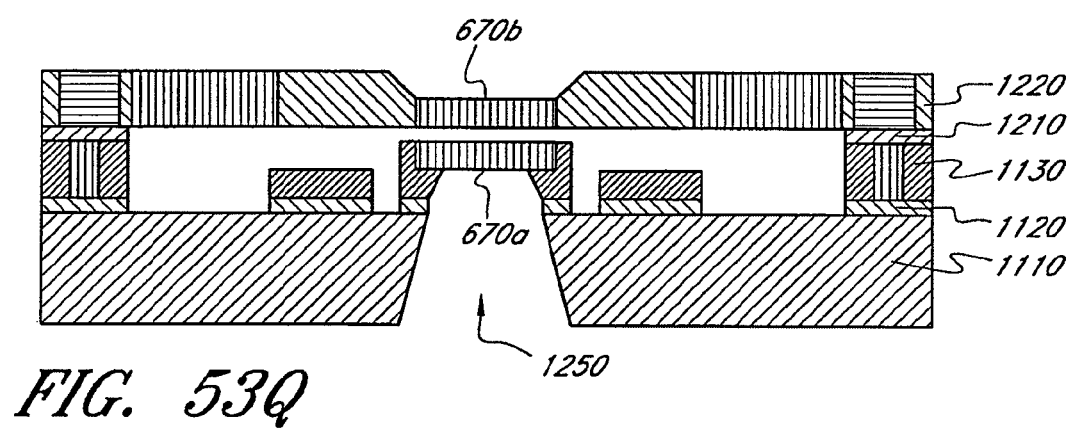

FIGS. 53A-53Q schematically illustrate an example fabrication process flow compatible with certain embodiments described herein for the components of the acoustic sensor system 800. Many other fabrication process flows, with different process steps, number of process steps, and/or order of process steps are also compatible with certain embodiments described herein, and the choice of which process flow to use is typically dependent on the types of equipment that are available for use. As schematically illustrated by FIG. 53A, the starting material for fabrication is a silicon-on-insulator (SOI) wafer 1100 having a substrate 1110 with a (100) crystal orientation and a thickness of about 500 microns, an oxide layer 1120 over the substrate 1110 with a thickness of about 1 micron, and a silicon layer 1130 over the oxide layer 1110 with a thickness of about 10 microns. Other materials for the wafer 1100 are also compatible with certain embodiments described herein.

As schematically illustrated by FIG. 53B, the SOI wafer 1100 is oxidized to form an oxide layer 1140 over the silicon layer 1130 and having a thickness of about 1 micron. As schematically illustrated by FIG. 53C, the oxide layer 1140 is patterned by etching the oxide layer 1140 down to the silicon layer 1130 (e.g., by using a first mask) to isolate various portions of the oxide layer 1140 from one another. As schematically illustrated by FIG. 53D, portions of the oxide layer 1140 are further etched (e.g., by using a second mask) by about 500 nanometers.

As schematically illustrated by FIG. 53E, the silicon layer 1120 is etched down to the oxide layer 1110. As schematically illustrated by FIG. 53F, the oxide layer 1130 is etched down by about 500 nanometers, thereby removing portions of the oxide layer 1140. As schematically illustrated by FIG. 53G, portions of the silicon layer 1130 are etched down by about 5 microns. As schematically illustrated by FIG. 53H, the oxide layer 1140 is removed.

As schematically illustrated by FIG. 53I, a silicon wafer 1200 having an oxide layer 1210 on at least one side is bonded to the SOI wafer 1100 with the oxide layer 1210 in contact with the silicon layer 1130. In certain embodiments, the oxide layer 1210 has a thickness of about 10 microns. In certain embodiments, the side of the silicon wafer 1200 that is not in contact with the silicon layer 1130 is polished or grinded down to produce a silicon layer 1220 having a thickness of about 10 microns on top of the oxide layer 1210.

As schematically illustrated by FIG. 53J, the silicon layer 1220 is patterned to make alignment marks visible and to form MEMS structures. In certain embodiments, this patterning includes using a third mask and etching the silicon layer 1220 down to the oxide layer 1210.

As schematically illustrated by FIG. 53K, an oxide layer 1230 is formed on the silicon layer 1220 (e.g., deposited and patterned using a fourth mask and etching with hydrogen fluoride) and an oxide layer 1232 is formed on the silicon layer 1110. In certain embodiments, each of the oxide layer 1230 and the oxide layer 1232 has a thickness of about 2 microns. As schematically illustrated by FIG. 53L, another oxide layer 1240 is formed on the oxide layer 1230 and on the exposed portions of the silicon layer 1220 and another oxide layer 1242 is formed on the oxide layer 1232. In certain embodiments, each of the oxide layer 1240 and the oxide layer 1242 has a thickness of about 2 microns.

As schematically illustrated by FIG. 53M, the SOI wafer 1100 is patterned (e.g., using a fifth mask) by etching an aperture 1250 through the oxide layer 1242, the oxide layer 1232, and the silicon layer 1110, stopping at the oxide layer 1120. As schematically illustrated by FIG. 53N, the aperture is extended by etching away a portion of the oxide layer 1120, stopping at the silicon layer 1130, and the oxide layer 1240 is etched away. In certain embodiments, the etching of the oxide layer 1242, the oxide layer 1232, the silicon layer 1132, the oxide layer 1120, and the oxide layer 1240 are performed during the same etching step. In certain embodiments, the resultant structure is separated into individual chips, and the subsequent process steps are performed on the chip scale.

As schematically illustrated by FIG. 53O, a controlled etch of a portion of the silicon layer 1130 through the aperture 1250 is performed (e.g., the aperture 1150 self-aligns and masks the silicon layer 1130) and a controlled etch of a portion of the silicon layer 1220 through a portion of the oxide layer 1230 is performed. In certain embodiments, the remaining portion 1260 of the silicon layer 1130 has a thickness of about 450 nanometers and the remaining portion 1270 of the silicon layer 1220 has a thickness of about 450 nanometers. These remaining portions 1260, 1270 serve as the silicon substrates for the photonic crystal slabs 670a, 670b of the acoustic sensor system 800. In certain embodiments, the oxide layer 1232 is removed.

As schematically illustrated by FIG. 53P, the lattice of the photonic crystal structure 620 is formed by patterning (e.g., by PMMA coating, electron-beam exposure, etching, and stripping resist) to form the two photonic crystal slabs 670a, 670b and the oxide layer 1210 is removed, as schematically illustrated by FIG. 53Q. In certain embodiments, the two PCSs 670a, 670b are self-aligned with the same geometrical parameters. To avoid detrimental stress effects due to the oxide layer 1210 underneath the portion 1270 resulting from the silicon layer 1130, in certain embodiments, hydrofluoric acid can be used to remove the oxide layer 1210 from portions of the membrane before the lattice is patterned. For defining the lattice, a Raith150 electron-beam lithography tool can be used. In certain embodiments, the primary masking material for transferring the photonic crystal lattice onto the membrane is a monolayer of 496,000 relative molecular mass polymethylmethacrylate (PMMA), a high resolution, high current positive resist. The exposed patterns are developed in a 1:2 solution of methyl isobutyl ketone:isopropyl alcohol and then anisotropically etched with a plasma etcher, using a plasma of $SF_6$ and $CHClF_2$, resulting in near 90° sidewalls. A single masking material gives reproducible and well-resolved structures. In certain embodiments, the size of the individual photonic crystal slabs 670a, 670b is about 100 microns×100 microns. A similar fabrication method can be adapted for other materials such as silicon nitride or silicon oxide.

In certain embodiments, to create 100 micron×100 micron free-standing silicon PCSs 670a, 670b, 808-micron-wide square apertures 1250 are formed on the back of the SOI wafer 1100 using anisotropic etching to etch through the 500-micron-thick substrate 1110. Using an anisotropic etchant of 30% KOH in water with 1% isopropyl alcohol to reduce surface tension, well-defined structures with smooth etched surfaces can be achieved.

Analysis of the Mechanics of a Diaphragm

The mechanics of the movable portion 820 and of the elastic portions (e.g., the secondary housing 910) of the acoustic sensor system 800 affect the performance of various embodiments described herein. These mechanics are analyzed below for various configurations of the acoustic sensor system 800. While the calculations below provide some insight into the operation of various embodiments described herein, but are not intended to be limiting.

A. Free Vibration of a Diaphragm

The equation of motion for the transverse displacement u of a stretched diaphragm with thickness h, and density ρ can be expressed as:

$$\left(h\rho\frac{\partial^2}{\partial t^2} + D\nabla^4 - h\sigma\nabla^2\right)u = 0 \tag{33}$$

(See, e.g., I. Ladabaum et al., "*Surface micromachined capacitive ultrasonic transducers*," Ultrasonics, Ferroelectrics and Frequency Control, IEEE Transactions, vol. 45, issue 3, pages 678-690 (May 1998); and M. Yu, "*Fiber-Optic Sensor Systems for Acoustic Measurements*," Ph.D. Dissertation, University of Maryland, College Park, Md.) Here σ is the residual stress and D is the flexural rigidity, defined as:

$$D = \frac{Eh^3}{12(1-v^2)} \tag{34}$$

where E is the Young's modulus, and v is Poisson's ratio. It should be noted that equation (33) is only applicable for small transverse displacements. When the deflection is large, the equation becomes non-linear.

For a clamped circular diaphragm with radius a, assuming a solution $u(r,\theta,t)=u(r,\theta)e^{j\omega t}$, equation (33) becomes:

$$D\nabla^4 u - h\sigma\nabla^2 u = h\rho\omega^2 u \tag{35}$$

which has a solution of the form:

$$u(r,\theta)=[AJ_m(\alpha r)+BI_m(\beta r)]\cos(m\theta) \tag{36}$$

where $J_m()$ is the Bessel function of the first kind of order m, and $I_m()$ is the modified Bessel function of the first kind of order m, with $$\alpha^2 = \frac{\sqrt{h^2\sigma^2 + 4\rho hD\omega^2} - h\sigma}{2D} \tag{37}$$

and $$\beta^2 = \frac{\sqrt{h^2\sigma^2 + 4\rho hD\omega^2} + h\sigma}{2D}.$$

The boundary conditions state that $u(a,\theta)=0$, $$\text{and } \frac{\partial}{\partial r}u(a,\theta) = 0.$$

These conditions reduce to the eigenvalue equation:

$$J_m(\alpha a)\frac{d}{dr}I_m(\beta a) - I_m(\beta a)\frac{d}{dr}J_m(\alpha a) = 0 \tag{38}$$

that can be solved together with equations (37), which can be summarized as:

$$(\beta a)^2 - (\alpha a)^2 = \kappa^2 \tag{39}$$

where κ is the useful "tension parameter" defined as $\kappa = a\sqrt{h\sigma/D}$.

The solutions to equations (38) and (39) for each m=0, 1, 2, . . . can be denoted as $\alpha_m$ and $\beta_{mn}$, where n=1, 2, 3 . . . denotes the $n^{th}$ root. The boundary conditions give the eigenmodes as:

$$u_{mn}(r,\theta) = C\left[J_m(\alpha_{mn}r) - \frac{J_m(\alpha_{mn}a)}{I_m(\beta_{mn}a)}I_m(\beta_{mn}r)\right]\cos(m\theta) \tag{40}$$

where the eigenfrequency of a mode is found through equations (37) as:

$$\omega_{mn} = \alpha_{mn}\beta_{mn}\sqrt{\frac{D}{h\rho}} \tag{41}$$

B. Forced Oscillation of a Diaphragm

For a forced and damped diaphragm, the equation of motion becomes:

$$\left(h\rho\frac{\partial^2}{\partial t^2} + b\frac{\partial}{\partial t} + D\nabla^4 - h\sigma\nabla^2\right)u = P(r,\theta,t) \tag{42}$$

where b is the damping coefficient, and P is the pressure applied on the diaphragm surface. In the case of a miniature microphone, where $\lambda_{acoustic} \gg a$, the pressure wave will be a plane wave, hence $P(r,\theta,t)=P(t)=P_0 e^{j\omega t}$.

Due to the similarity to the free vibration problem, we expect a solution of the form:

$$u(r, \theta, t) = \sum_{m,n} A_{mn}(t) u_{mn}(r, \theta) \quad (43)$$

where $u_{mn}$ are the modes from the free vibration problem, and $A_{mn}$ are modal participation factors. Putting equation (43) into equation (42) provides the following:

$$\sum_{m,n} \left[ u_{mn}\left( h\rho \frac{\partial^2 A_{mn}}{\partial t^2} + n \frac{\partial A_{mn}}{\partial t} \right) + A_{mn}(D\nabla^4 u_{mn} - h\sigma \nabla^2 u_{mn}) \right] = P_0 e^{j\omega t} \quad (44)$$

The second term on the left-hand-side is given by equation (35). Hence, equation (44) becomes:

$$\sum_{m,n} \left( h\rho \frac{\partial^2 A_{mn}}{\partial t^2} + b \frac{\partial A_{mn}}{\partial t} + h\rho \omega_{mn}^2 A_{mn} \right) u_{mn} = P_0 e^{j\omega t} \quad (45)$$

To solve this equation, the orthogonality of the eigenmodes can be exploited, which is:

$$\int_0^{2\pi} \int_0^a u_{mn} u_{kl} r dr d\theta = \delta_{mk} \delta_{nl} \int_0^{2\pi} \int_0^a u_{mn}^2 r dr d\theta \quad (46)$$

Using the orthogonality, the left-hand-side in equation (45) becomes:

$$\left( h\rho \frac{\partial^2 A_{mn}}{\partial t^2} + b \frac{\partial A_{mn}}{\partial t} + h\rho \omega_{mn}^2 A_{mn} \right) \int_0^{2\pi} \int_0^a u_{mn}^2 r dr d\theta$$

while the right-hand-side becomes:

$$P_0 e^{j\omega t} \int_0^{2\pi} \int_0^a u_{mn}(r, \theta) r dr d\theta = P_0 e^{j\omega t} \int_0^a u_{mn}(r) r dr \int_0^{2\pi} \cos(m\theta) d\theta$$

Since $$\int_0^{2\pi} \cos(m\theta) d\theta = \begin{cases} 2\pi, & m = 0 \\ 0, & m \neq 0, \end{cases}$$

the incident pressure wave only couples to modes with m=0, the modes that have only radial nodes (no polar nodes). Therefore, the index m can be dropped, so that only the index n is used.

In this case, the eigenvalue equation (38) reduces to:

$$\frac{\alpha_n}{\beta_n} = \frac{J_0(\alpha_n a)}{J_1(\alpha_n a)} \cdot \frac{I_1(\beta_n a)}{I_0(\beta_n a)} \quad (47)$$

And the eigenmodes in equation (40) become:

$$u_n(r) = C\left[ J_0(\alpha_n r) - \frac{J_0(\alpha_n a)}{I_0(\beta_n a)} I_0(\beta_n r) \right] \quad (48)$$

The equation for the modal participation factor $A_n$ becomes then:

$$\frac{\partial^2 A_n}{\partial t^2} + \frac{\omega_n}{Q_n} \frac{\partial A_n}{\partial t} + \omega_n^2 A_n = \frac{U_n}{h\rho} P_0 e^{j\omega t} \quad (49)$$

where $Q_n = h\rho\omega_n/b$ is the quality factor of the $n^{th}$ mode, and the constant $U_n$ is:

$$U_n = \frac{\int_0^a u_n r dr}{\int_0^a u_n^2 r dr}$$

Assuming a solution of the form $A_n(t)=A_n e^{j(\omega t+\phi_n)}$, equation (49) gives:

$$A_n(t) = \frac{U_n P_0 e^{j\omega t}}{h\rho(\omega_n^2 - \omega^2 + j\omega_n\omega/Q_n)} \quad (50)$$

Hence, we get the displacement as:

$$u(r, t) = \sum_n A_n(t) u_n(r) = P_0 e^{j\omega t} \sum_n \frac{U_n u_n(r)}{h\rho(\omega_n^2 - \omega^2 + j\omega_n\omega/Q_n)} \quad (51)$$

This is the general solution for any frequency. For low frequencies, such that $\omega \ll \omega_n$:

$$u(r, t) = P_0 e^{j\omega t} \sum_n \frac{U_n u_n(r)}{h\rho\omega_n^2 \left(1 + j\frac{1}{Q_n}\frac{\omega}{\omega_n}\right)} \quad (52)$$

This is a general solution for the transverse displacement of a stretched diaphragm that is vibrated by a pressure plane wave at a frequency below resonance.

C. Solutions for the Special Cases of Membrane and Plate

Two different kinds of structures, which are diaphragms made of silicon-nitride and crystalline-silicon, are of interest. Due to the mechanical properties of these two materials, the diaphragm solutions have closed forms as is discussed below.

C.1 Membrane Solution

A membrane is a diaphragm where the residual stress is dominant, e.g. $\kappa \to \infty$. The membrane structure is a good approximation for $\kappa > 20$, which is the case for a silicon-nitride diaphragm that usually has a high residual stress. In this case, since $\beta_n \to \kappa/a \to \infty$, the eigenvalue equation (47) becomes simply $J_0(\alpha_n a)=0$. For notational simplicity, $\alpha_n a = z_n$, where $z_n$ denotes the $n^{th}$ zero of $J_0(x)$.

Also, the eigenmodes in equation (48) become $u_n(r)=CJ_0(z_n r/a)$, so that:

$$U_n u_n(r) = \frac{\int_0^a J_0(z_n r/a) r dr}{\int_0^a J_0^2(z_n r/a) r dr} J_0(z_n r/a) = \frac{2}{z_n} \cdot \frac{J_0(z_n r/a)}{J_1(z_n)}$$

The eigenfrequencies in equation (41), on the other hand, become:

$$\omega_n = \frac{z_n}{a}\sqrt{\frac{\sigma}{\rho}}$$

Using these in the general solution of equation (52):

$$u(r,t) = P_0 e^{j\omega t}\frac{2a^2}{h\sigma}\sum_n \frac{1}{z_n^3}\cdot\frac{J_0(z_n r/a)}{J_1(z_n)}\left(1+j\frac{\omega b a^2}{h\sigma}\cdot\frac{1}{z_n^2}\right)^{-1} \quad (53)$$

To find a closed form of this expression, two different damping conditions, which are b=0, and b→∞ will be considered.

C.1.a Membrane Solution—Negligible Damping Case

For b=0, the displacement in equation (53) becomes:

$$u(r,t) = P_0 e^{j\omega t}\frac{2a^2}{h\sigma}\sum_n \frac{1}{z_n^3}\cdot\frac{J_0(z_n r/a)}{J_1(z_n)}$$

which can be recognized as a Fourier-Bessel series. A function in the interval x=(0,1) can be expanded in a Fourier-Bessel series as:

$$f(x) = \sum_n C_n J_0(z_n x)$$

where the coefficients $C_n$ are given as:

$$C_n = \frac{2}{J_1^2(z_n)}\int_0^1 f(x) J_0(z_n x) x\,dx$$

Considering the integral $$\int_0^1 (1-x^2) J_0(z_n x) x\,dx = \frac{4 J_1(z_n)}{z_n^3},$$

the displacement for negligible damping in a closed form can be expressed as:

$$u(r,t) = P_0 e^{j\omega t}\frac{a^2}{4h\sigma}\left(1-\frac{r^2}{a^2}\right) \quad (54)$$

This solution is also consistent with other reports. See, e.g., W. P. Eaton et al., "*A new analytical solution for diaphragm deflection and its application to a surface micromachined pressure sensor*," Int'l Conf. on Modeling and Simulation of Microsystems, 1999. Note that equation (54) is an exact solution applicable to the whole range of r=(0,a).

C.1.b Membrane Solution—Strong Damping Case

For b→∞, the displacement in equation (53) becomes:

$$u(r,t) = P_0 e^{j\omega t}\frac{2}{j\omega b}\sum_n \frac{1}{z_n}\cdot\frac{J_0(z_n r/a)}{J_1(z_n)}$$

Considering the integral $$\int_0^1 J_0(z_n x) x\,dx = \frac{J_1(z_n)}{z_n},$$

the displacement for strong damping in a closed form can be expressed as:

$$u(r,t) = P_0 e^{j\omega t}\frac{1}{j\omega b} \quad (55)$$

Therefore, when the damping is very strong, the membrane tends to move as a whole without a noticeable bending.

C.2 Plate Solution

A plate is a diaphragm where the bending stiffness is dominant, e.g. κ=0. The plate structure is a good approximation for κ<2, which is the case for a crystalline-silicon diaphragm that usually has very low residual stress.

In this case, since $\beta_n = \alpha_n$, the eigenvalue equation (47) becomes:

$$J_0(\alpha_n a) + \frac{J_1(\alpha_n a)}{I_1(\alpha_n a)} I_0(\alpha_n a) = 0$$

For notational simplicity, $\alpha_n a = z_n$, where $z_n$ denotes the $n^{th}$ zero of the function $\Im_0(x)$ that is defined as:

$$\Im_0(z_n r/a) = J_0(z_n r/a) + \frac{J_1(z_n)}{I_1(z_n)} I_0(z_n r/a)$$

Whence, the eigenmodes in equation (48) become $u_n(r) = C\Im_0(z_n r/a)$, so that:

$$U_n u_n(r) = \frac{\int_0^a \Im_0(z_n r/a) r\,dr}{\int_0^a \Im_0^2(z_n r/a) r\,dr}\Im_0(z_n r/a) = \frac{2}{z_n}\cdot\frac{J_1(z_n)}{J_0^2(z_n)}\Im_0(z_n r/a)$$

The eigenfrequencies in equation (41), on the other hand, become:

$$\omega_n = \frac{z_n^2}{a^2}\sqrt{\frac{D}{h\rho}}$$

Using these in the general solution of equation (52):

$$u(r,t) = P_0 e^{j\omega t}\frac{2a^4}{D}\sum_n \frac{1}{z_n^5}\cdot\frac{J_1(z_n)}{J_0^2(z_n)}\Im_0(z_n r/a)\left(1+j\frac{\omega b a^4}{D}\cdot\frac{1}{z_n^4}\right)^{-1} \quad (56)$$

To find a closed form of this expression, two different damping conditions, which are b=0, and b→∞ are considered.

C.2.a Plate Solution—Negligible Damping Case

For b=0, the displacement in equation (56) becomes:

$$u(r,t) = P_0 e^{j\omega t} \frac{2a^4}{D} \sum_n \frac{1}{z_n^5} \cdot \frac{J_1(z_n)}{J_0^2(z_n)} \mathfrak{I}_0(z_n r/a)$$

It is possible to define a generalized Fourier-Bessel series for the function $\mathfrak{I}_0(x)$, using the orthogonality of $\mathfrak{I}_0(z_n x)$, which is:

$$\int_0^1 \mathfrak{I}_0(z_n x) \mathfrak{I}_0(z_m x) x\, dx = \delta_{nm} J_0^2(z_n)$$

Using this orthogonality, a function in the interval x=(0,1) can be expanded as:

$$f(x) = \sum_n C_n \mathfrak{I}_0(z_n x)$$

Where the coefficients $C_n$ are given in this case as:

$$C_n = \frac{1}{J_0^2(z_n)} \int_0^1 f(x) \mathfrak{I}_0(z_n x) x\, dx$$

Calculation shows that $$\int_0^1 (1-x^2)^2 \mathfrak{I}_0(z_n x) x\, dx = 64 \frac{2 J_1(z_n)}{z_n^5}$$

Hence, the displacement for negligible damping in a closed form can be expressed as:

$$u(r,t) = P_0 e^{j\omega t} \frac{a^4}{64 D} \left(1 - \frac{r^2}{a^2}\right)^2 \quad (57)$$

Note that this is an exact solution applicable to the whole range of r=(0,a). This solution is also consistent with other reports. See, e.g., W. P. Eaton et al., "*A new analytical solution for diaphragm deflection and its application to a surface micromachined pressure sensor*," Int'l Conf. on Modeling and Simulation of Microsystems, 1999. Also note that the decay from r=0 to r=a is more rapid compared to the membrane case.

C.2.b Plate Solution—Strong Damping Case

For b→∞, the displacement in equation (53) becomes:

$$u(r,t) = P_0 e^{j\omega t} \frac{2}{j\omega b} \sum_n \frac{1}{z_n} \cdot \frac{J_1(z_n)}{J_0^2(z_n)} \mathfrak{I}_0(z_n r/a)$$

Calculation shows that $$\int_0^1 \mathfrak{I}_0(z_n x) x\, dx = \frac{2 J_1(z_n)}{z_n}$$

Hence, the displacement for strong damping in a closed form can be expressed as:

$$u(r,t) = P_0 e^{j\omega t} \frac{1}{j\omega b} \quad (58)$$

Therefore, as in the membrane case, when the damping is very strong, the plate tends to move as a whole without a noticeable bending.

D. Mechanical Impedance Effects of the Surrounding Medium

Calculations of mechanical impedances can facilitate understanding what effect the surrounding medium (such as air or water), and the damping, will have on the displacement of the diaphragm. The mechanical impedance Z is defined as the ratio of pressure to speed, namely Z=P/v. In the case discussed here, $v(r) = j\omega u(r)$. To calculate the impedance of the diaphragm, the lumped speed is used, which is:

$$\bar{v} = \frac{1}{\pi a^2} \int_0^a v(r) 2\pi r\, dr = \frac{2 j\omega}{a^2} \int_0^a u(r) r\, dr$$

so that, $$Z = \frac{P}{\bar{v}} = \frac{P_0 e^{j\omega t}}{\bar{v}}.$$

Using equation (54), the impedance of a diaphragm that can be approximated by a membrane is then:

$$Z_d = \frac{P_0 e^{j\omega t}}{\frac{2 j\omega}{a^2} \left(P_0 e^{j\omega t} \frac{a^4}{16 h\sigma}\right)} = -j \frac{8 h\sigma}{\omega a^2} \quad (59)$$

And similarly, using equation (57), the impedance of a diaphragm that can be approximated by a plate is then:

$$Z_d = \frac{P_0 e^{j\omega t}}{\frac{2 j\omega}{a^2} \left(P_0 e^{j\omega t} \frac{a^6}{384 D}\right)} = -j \frac{192 D}{\omega a^4} \quad (60)$$

The impedance due to the damping will be just $Z_b = b$, as can be verified using equation (55) or equation (58). The fact that the damping impedance is a real number means that it is responsible for dissipation loss in the system.

To calculate the impedance of the surrounding medium, the expression for the displacement of particles in an acoustic wave can be used:

$$u_a = \frac{1}{\omega \rho_a v_a} P_0 e^{j\omega t} \quad (61)$$

where $\rho_a$ is the density of the medium, and $v_a$ is the speed of the acoustic wave (not to be confused with the speed of the particles that are displaced in the medium). Using equation (61), the impedance of the surrounding medium can be expressed as:

$$Z_s = \frac{P_0 e^{j\omega t}}{j\omega \left(P_0 e^{j\omega t} \frac{1}{\omega \rho_a v_a}\right)} = -j \rho_a v_a \quad (62)$$

The total impedance of the system will then be the sum of the impedance of the diaphragm, the damping impedance, and the impedance of the surrounding medium:

$$Z_{total} = Z_d + Z_b + Z_s$$

The total displacement of the diaphragm will depend on the value of this total impedance. If one of the impedances is much larger than the others, the diaphragm displacement will be dominated by it. For example, if the membrane impedance is dominant, i.e. $Z_d \gg Z_b, Z_s$, the displacement will be just as in equation (54) or equation (57), the diaphragm displacements under negligible damping. If the damping impedance is dominant, i.e. $Z_b \gg Z_d, Z_s$, the displacement will be just as in equation (55) or equation (58), the diaphragm displacements under large damping conditions. And, if the impedance of the surrounding medium is dominant, i.e. $Z_s \gg Z_d, Z_b$, the displacement will be just as in equation (29), which is the displacement of the particles in the acoustic wave.

E. Numerical Values for the Impedances

As an example system, a circular diaphragm made of either silicon-nitride or crystalline-silicon has the radius of a typical SMF-28 singlemode fiber (e.g., 62.5 microns), and is separated by a distance d from the end of the fiber. Table 1 gives values of various parameters and constants to be used in the calculations.

TABLE 1

| Parameters and constants | |
| --- | --- |
| Diaphragm parameters | |
| radius of diaphragm: | a = 62.5 microns |
| thickness of diaphragm: | h = 0.5 micron |
| gap length between diaphragm and fiber: | d = 1 micron |
| operation frequency: | $\omega = 2\pi \times 30$ kHz |
| Silicon-nitride constants | |
| density: | $\rho_{siN}$ = 3270 kg/m$^3$ |
| estimates residual stress in high stress nitride film: | $\sigma_{siN}$ = 300 MPa |
| Young's modulus: | $E_{siN}$ = 320 GPa |
| Poisson's ratio: | $\nu_{siN}$ = 0.26 |
| Crystalline-silicon constants | |
| density: | $\rho_{si}$ = 2330 kg/m$^3$ |
| residual stress (estimated to be insignificant): | $\sigma_{si} \approx 0$ MPa |
| Young's modulus: | $E_{si}$ = 150 GPa |
| Poisson's ratio: | $\nu_{si}$ = 0.2 |
| Air constants | |
| density (of dry air at 1 atm pressure and 20° C.): | $\rho_{air}$ = 1.21 kg/m$^3$ |
| speed of sound (at 20° C.): | $\upsilon_{air}$ = 343 m/s |
| dynamic viscosity (at 20° C.): | $\mu_{air}$ = 1.82 × 10$^{-5}$ kg/m/s |
| Water constants | |
| density (of pure water at 20° C.): | $\rho_{water}$ = 998 kg/m$^3$ |
| speed of sound (in pure water at 20° C.): | $\upsilon_{water}$ = 1482 m/s |
| dynamic viscosity (at 20° C.): | $\mu_{water}$ = 9.77 × 10$^{-4}$ kg/m/s |
| density (of sea water with 3.5% salinity at 20° C.): | $\rho_{sea-water}$ = 1025 kg/m$^3$ |
| speed of sound (in sea water with 3.5% salinity at 20° C.): | $\upsilon_{sea-water}$ = 1522 m/s |

Other than the formulas given in the previous sections, an expression can be used to calculate the damping. The calculation of damping is usually complex, and has also a strong dependence on the overall geometry. However, an estimate of the damping can still be made. Because of the close proximity of the diaphragm and the fiber end, the dominant damping will be the squeeze film damping which can estimated as:

$$b \approx \frac{1}{\pi a^2}\left(0.42 \frac{\mu A^2}{d^3}\right)$$

where μ is the dynamic viscosity of the medium, $A = \pi a^2$ is the area of the plates, and d is the gap length (see, e.g., M. Andrews et al., "*A comparison of squeeze-film theory with measurements on a microstructure*, Sensors and Actuators A, vol. 36, pages 79-87 (1993)).

Using the values in Table 1:

$b_{air} = 9.38 \times 10^4$ kg/m$^2$/s, damping in air $b_{water} = 5.04 \times 10^6$ kg/m$^2$/s, damping in water Similarly, using the values in Table 1 in the impedance formulas equations (59), (60), and (62):

$|Z_{SiN}| = 1.62 \times 10^6$ kg/m$^2$/s, impedance of a silicon-nitride membrane $|Z_{Si}| = 1.09 \times 10^5$ kg/m$^2$/s, impedance of a silicon plate $|Z_{air}| = 415$ kg/m$^2$/s, impedance of air $|Z_{water}| = 1.48 \times 10^6$ kg/m$^2$/s, impedance of water $|Z_{sea-water}| = 1.56 \times 10^6$ kg/m$^2$/s, impedance of sea-water These results show that for the given dimensions, the impedances of the membranes are comparable to the damping and water impedances. A larger diaphragm diameter would yield more advantageous results. A diaphragm radius more than 50% larger would make the silicon-nitride calculations more accurate, since in this case, the tension parameter value of $\kappa \approx 13$ is insufficient to model the nitride diaphragm as a membrane. Also, the damping impedance can be reduced through careful design, such as the size and position of the pressure equalizing holes.

These results show that the initial assumptions about the displacement of the diaphragm in air and water were inaccurate, and these calculations can be used to make a more optimal sensor design, either for air or water operation.

Fiber Fabry-Perot-based Acoustic Sensor Designs

Figure 54:
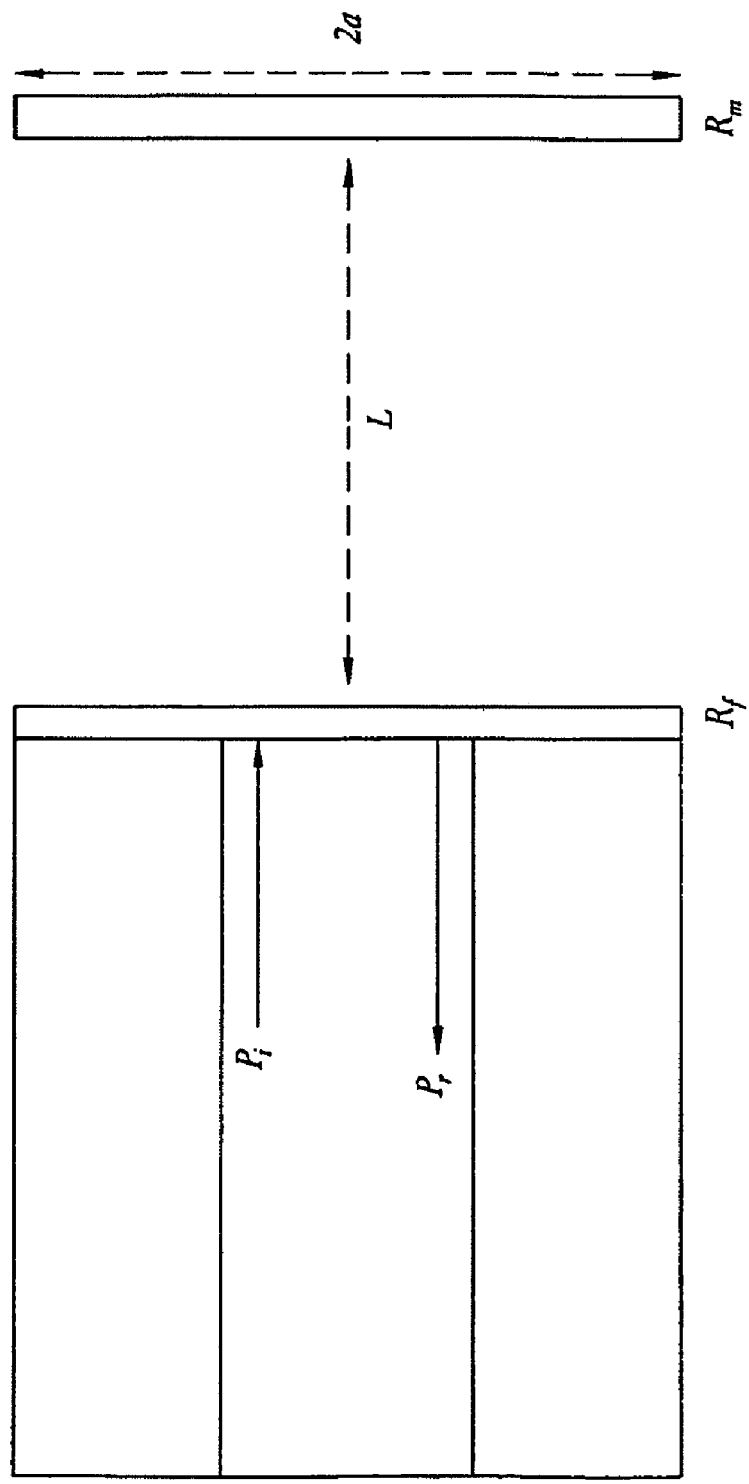
FIG. 54 schematically illustrates an example configuration of a movable reflective element (e.g., a membrane) and an optical fiber.

The expressions previously derived can be used to find optimal parameters for the acoustic sensor systems. FIG. 54 schematically illustrates an example configuration of a movable reflective element (e.g., a membrane) and an optical fiber. The main parameters to be optimized, shown schematically in FIG. 54, are the cavity length (L), the radius of the membrane (a), and the reflectivities of the fiber end ($R_f$) and the membrane mirror ($R_m$).

As a first step, the limitations or ranges of these parameters can be calculated. The membrane radius a is preferably equal to at least the radius of the fiber, which is about 62.5 microns, so that the impedance of the membrane does not becomes excessively large so that it limits the pressure sensitivity of the sensor. The size of the membrane is preferably sufficiently small to provide a compact and robust sensor. Therefore, the membrane diameter advantageously does not exceed about 300 microns, above which it becomes large and fragile.

For reasons shown below, the reflectivity of the membrane mirror $R_m$ is preferably as large as possible (e.g., $R_m \sim 1$), which is achieved in certain embodiments with a photonic crystal mirror. The reflectivity of the fiber end ($R_f$) is preferably as small as possible. The reasons for this are discussed more fully below. Also, a small reflectivity on the fiber end is preferably used, since it is usually difficult to deposit a highly reflective mirror, either metal or dielectric, on the end of a fiber. Also, if a fiber Bragg mirror is used, its length is preferably reduced by requiring a small reflectivity, as it was explained in previous texts.

To calculate limitations on the cavity length L, several factors are considered. From the mechanical point of view, it is advantageous to have a large length, since this results in a smaller damping. However, when the optical properties are considered, there are certain limitations on the cavity length, as calculated below.

The contrast of the resonance tends to decrease with increasing mirror reflectivities, so that for very high reflectivities, it appears that there is almost no visible resonance. This effect can be avoided by balancing the mirrors of the Fabry-Perot. In fact, as calculated, full contrast can be restored by having:

$$R_f = R_m 2^{-L/z_0}$$

where $z_0 = \pi w_0^2 n_c/\lambda = k w_0^2/2$ is the Rayleigh range, a characteristic length over which the beam does not diverge significantly.

Also, the maximum sensitivity to displacement occurs at the point where the overall reflection is $R_p = P_r/P_i = \frac{1}{2}$, on the steeper side of the asymmetric resonance. At that point, the sensitivity is equal to the sensitivity of a regular Fabry-Perot that has an effective reflectivity of:

$$R_{eff} = \sqrt{R_f R_m} = R_m 2^{-L/2z_0}$$

The sensitivity to displacement $\sigma = \partial R_p / \partial L$ of a regular Fabry-Perot at the point $R_p = \frac{1}{2}$ is calculated as:

$$\sigma = \frac{\pi}{\lambda}\sqrt{K}$$

where $K = 4R_{eff}/(1-R_{eff})^2$.

The above relations can be used to calculate the maximum L. This calculated value is dependent on the minimum reflectivity $R_{eff}$ that is used to achieve the required sensitivity. The minimum required reflectivity for the best case scenario corresponds to the noise level being in the shot-noise limit, and the impedance of water being dominant, so that the membrane displaces with the water particles.

The relations between pressure and water displacement is expressed as:

$$\Delta L = \left(\frac{1}{\omega v \rho}\right) \cdot P$$

Using the values $v_{water} = 1482$ m/s, $\rho_{water} = 998$ kg/m$^3$, and the numbers wanted for the sensor $\omega = 2\pi \times 30$ kHz, and $P = 30 \mu$Pa/$\sqrt{Hz}$:

$$\Delta L = 1.08 \times 10^{-7} \text{ nm}/\sqrt{Hz}$$

When the noise level is at the shot-noise limit, then the minimum detectable displacement is:

$$\Delta L_{min} = \frac{\sqrt{2}}{\pi}\lambda\sqrt{\frac{\Delta f h v}{K \eta P_i}}$$

Substituting $\Delta L_{min}$ with the above number, and using the values, $P_i = 1$ mW, $\lambda = 1550$ nm, $\eta = 0.9$, and solving for $R_{eff}$:

$$R_{eff} = 0.954$$

This is the minimum effective reflectivity to achieve the desired sensitivity under the best conditions. This value can be used to calculate the maximum cavity length. Using the above expression $R_{eff} = R_m 2^{-L/2z_0}$, and requiring that $R_m \neq 1$:

$$L_{max} = \frac{2z_0}{\ln 2}\ln\left(\frac{R_m}{R_{eff}}\right) = 9.48 \ \mu m$$

This is the maximum cavity length in water, a limitation imposed by the optical properties of the fiber Fabry-Perot. This number is smaller (7.21 microns) in air, due to the difference in the Rayleigh range, calculated for a regular SMF-28 fiber.

The other constraint on the cavity length is that it is a multiple of half the operation wavelength, which in certain embodiments is $\lambda = 1550$ nm.

With this knowledge of the limitations for the main parameters: the cavity length (L), the radius of the membrane (a), and the reflectivities of the fiber end ($R_f$) and the membrane mirror ($R_m$), the values can be optimized.

To optimize these parameters, the mechanical properties of the device are considered. In the mechanics calculations, the following impedance values were found for the parameters a=62.5 $\mu$m (=radius of an SMF-28 fiber) and L=1 $\mu$m:

$$Z_{water} = 1.48 \times 10^6 \text{ kg/m}^2/\text{s, impedance of water}$$

$$b_{water} = 5.04 \times 10^6 \text{ kg/m}^2/\text{s, damping in water}$$

$$Z_{Si} = 1.09 \times 10^5 \text{ kg/m}^2/\text{s, impedance of a silicon plate}$$

The three impedances are on the same order, which means that the displacement of the membrane will be reduced by a factor f with respect to the displacement of water particles, where:

$$f \approx \frac{Z_{water}}{Z_{water} + b_{water} + Z_{Si}} = 0.22$$

With these impedance values, the membrane will displace only by about 22% of the displacement of the water particles. This number is advantageously closer to about 90% for a sensitive device. To achieve this result, the damping in water, and also possibly, the impedance of the silicon plate are advantageously reduced to have:

$$b_{water} + Z_{Si} \approx 1.64 \times 10^5 \text{ kg/m}^2/\text{s}$$

The expressions we need to consider are:

$$b_{water} \approx \frac{\mu \pi a^2}{2L^3}, \text{ and } Z_{Si} = \frac{192D}{\omega a^4}$$

To reduce the overall impedance, L can be increased without changing a, since $b_{water}$ has a larger contribution. In such a case, $Z_{Si}$ will remain unchanged, so that advantageously:

$$b_{water} \approx 5.50 \times 10^4 \text{ kg/m}^2/\text{s}$$

Hence, the length is advantageously:

$$L = 1 \ \mu m \times \left( \frac{5.04 \times 10^6 \text{ kg/m}^2/\text{s}}{5.50 \times 10^4 \text{ kg/m}^2/\text{s}} \right)^{1/3} = 4.51 \ \mu m$$

Since the cavity length is a multiple of half the operation wavelength, the closest number to this is $6 \times 1.55 \ \mu m/2 = 4.65 \ \mu m$, which is still within the range of $L_{max} = 9.48 \ \mu m$. Using the cavity length $L = 4.65 \ \mu m$, the reduction factor is $f = 0.9 = 90\%$. Since $a = 62.5 \ \mu m$ remained unchanged in this calculation, the other two design parameters $R_f$ and $R_m$ remain to be optimized.

The displacement of the membrane will be:

$$\Delta L \approx f \times \Delta L_{water} = 0.9 \times 1.08 \times 10^{-7} \text{ nm}/\sqrt{\text{Hz}} = 9.72 \times 10^{-8} \text{ nm}/\sqrt{\text{Hz}}$$

which results in $R_{eff} = 0.958$ and $R_m = R_{eff} 2^{L/2z_0} = 0.980$, and $R_f = R_m 2^{-L/z_0} = 0.936$.

Therefore, a set of parameters for an example design that provides a sensitivity of 30 $\mu$Pa/$\sqrt{\text{Hz}}$ at 30 kHz are: $a = 62.5$ microns, $L = 4.65$ microns, $R_m = 0.980$, and $R_f = 0.936$. Other values are also compatible with certain embodiments described herein.

Fabry-Perot-Based Acoustic Sensor Compared to a Fiber Bragg Grating

A simple Fabry-Perot structure to be employed as an acoustic sensor can be constructed with a photonic crystal mirror and a fiber Bragg grating, (e.g., as shown in FIG. 51), or with just two photonic crystal mirrors, as described herein. The sensitivity of such a sensor can be calculated from the basic Fabry-Perot equations. (See, e.g., Thomson et al., "*A Fabry-Perot acoustic surface vibration detector-application to acoustic holography*," J. Phys. D: Appl. Phys., Vol. 6, page 677 (1973).) In certain embodiments, both of the mirrors forming the Fabry-Perot cavity have a high reflectivity R. Then, for $K = 4R/(1-R)^2$ and $\phi = 2\pi L/\lambda$, with L being the mirror spacing, the relation between the reflected power $P_r$ and the incident power $P_i$ can be calculated as:

$$\frac{P_r}{P_i} = 1 - (1 + K\sin^2\phi)^{-1} \tag{63}$$

The sensitivity $\sigma$ to the displacement L will then be:

$$\sigma = \frac{d}{dL}\left(\frac{P_r}{P_i}\right) \tag{64}$$

To find the maximum sensitivity, equation (64) is solved for $d\sigma/dL = 0$, which is satisfied for $\phi = (3K)^{-1/2} + m\pi$, keeping in mind that $K \gg 1$. This result is expected, stating that the highest sensitivity is at the side of a resonance. Using this value, the maximum sensitivity can be expressed as:

$$\sigma_{max} = \frac{3\sqrt{3}\,\pi}{4\lambda}\sqrt{K} \tag{65}$$

Therefore, the maximum sensitivity only depends on the reflectivity of the mirrors, provided that the linewidth of the laser is much smaller than the linewidth of the Fabry-Perot resonance. This condition is satisfied if $L \ll c/\Delta v_{laser} \pi \sqrt{K}$, where $\Delta v_{laser}$ is the linewidth of a single-mode laser (or the frequency spread of a multi-mode laser). Thus, for a sensitive measurement, the linewidth of the laser $\Delta v_{laser}$ is advantageously selected to be much smaller than the linewidth of the Fabry-Perot resonance $\Delta v_{F-P} = c/L\pi\sqrt{K}$, which is dependent on the cavity length L. Thus, equation (65) for the maximum sensitivity imposes a limit on the maximum cavity length on the Fabry-Perot cavity depending on the laser linewidth.

For a sufficiently large laser power such as 1 milliwatt, the dominant noise will be the photodiode shot current. The mean current in the photodiode measuring the reflected power will be $I_0 = P_r e \eta/h\nu$, where $\eta$ is the quantum efficiency of the photodiode. At the maximum sensitivity point, calculated from equation (63), $P_r = P_i/4$. This current gives rise to a shot noise current:

$$I_N = \sqrt{2eI_0 \Delta f} = \sqrt{\frac{P_i e^2 \eta \Delta f}{2h\nu}}, \tag{66}$$

where $\Delta f$ is the electronic system bandwidth.

For a small mirror displacement with peak amplitude $\Delta L$, the signal current in the photodiode will be:

$$I_S = \frac{1}{\sqrt{2}} \frac{\Delta P_r e \eta}{h\nu} \tag{67}$$

and $\Delta P_r$ can be calculated using equation (34) to be:

$$\sigma = \frac{1}{P_i}\left(\frac{\Delta P_r}{\Delta L}\right), \tag{68}$$

hence $\Delta P_r = \sigma P_i \Delta L$.

Operating at maximum sensitivity given in equation (65), the power signal of equation (68) inside the signal current expression of equation (67):

$$I_S = \frac{3\sqrt{3}\,\pi}{4\sqrt{2}}\left(\frac{\Delta L}{\lambda}\right)\frac{\sqrt{K}\,e\eta}{h\nu}P_i \tag{69}$$

From which the signal-to-noise ratio can be expressed as:

$$\frac{S}{N} = \frac{I_S^2}{I_N^2} = \frac{27\pi^2}{16}\frac{K\eta P_i}{\Delta f h\nu}\left(\frac{\Delta L}{\lambda}\right)^2 \tag{70}$$

For a unity signal-to-noise ratio, the detection sensitivity of the system will then be:

$$\Delta L_{min} = \frac{4}{3\sqrt{3}\,\pi}\lambda\sqrt{\frac{\Delta f h\nu}{K\eta P_i}}. \tag{71}$$

Using the values, $P_i = 1$ mW, $\lambda = 1500$ nm, $\eta = 0.9$, and a modest reflectivity $R = 0.99$, the value of $\Delta L_{min} = 2.25 \cdot 10^{-8}$ nm/$\sqrt{\text{Hz}}$ is obtained. The sensitivity can be increased through the reflectivity of the mirrors. For example, a reflectivity of R=0.999 provides about 10 times better sensitivity. Throughout the calculations below, the value of $\Delta L_{min}=10^{-6}$ nm/$\sqrt{Hz}$ is used, since the experimental values have previously been reported to be about an order of magnitude worse than the theoretical limit.

The sensitivity given in equation (65) is only dependent on the mirror reflectivity. It may be expected that the length of the cavity would play a crucial role in the sensitivity, so that a much smaller sensitivity would be provided by a long cavity. If equation (65) is written in terms of the cavity length L, and the resonance linewidth $\Delta v_{1/2}$:

$$\sigma_{max} = \frac{3\sqrt{3}}{4\lambda}\left(\frac{c}{\Delta v_{1/2}L}\right) \quad (72)$$

which is an expected result. The sensitivity drops with increasing length. Also, as expected, the sensitivity drops with increasing linewidth, since the resonances become less steep. However, in a Fabry-Perot cavity with high reflectivity mirrors, the resonance linewidth is dependent on L, so that the resonances become sharper for longer cavity lengths:

$$\Delta v_{1/2} = \frac{c}{\pi\sqrt{K}} \cdot \frac{1}{L} \quad (73)$$

(See, e.g., P. Yeh, "*Optical Waves in Layered Media*," (Wiley, New York, 1988).) Therefore, the dependence on L in the sensitivity equation (72) cancels out, so that it is the mirror reflectivity provides the dominant contribution (as long as it is high). In certain such embodiments, the important criterion is therefore that the laser linewidth should be much smaller than the Fabry-Perot resonance linewidth.

To calculate the dynamic range, the minimum detectable length is known, and therefore the maximum length shift is to be calculated. For a Fabry-Perot cavity, L=constant·λ, hence:

$$\frac{\Delta L}{L} = \frac{\Delta\lambda}{\lambda} \quad (74)$$

Therefore, the maximum shift is $\Delta L_{max}=(L/\lambda) \Delta\lambda_{max}$. The maximum wavelength shift one can detect is one-quarter the linewidth of the Fabry-Perot resonance. Therefore, the maximum detectable cavity length change is, using equation (73):

$$\Delta L_{max} = \frac{L}{\lambda}\frac{\Delta\lambda_{1/2}}{4} = \frac{\lambda}{4\pi\sqrt{K}} \quad (75)$$

Hence, the dynamic range is:

$$DR = \frac{\Delta L_{max}}{\Delta L_{min}} = \frac{3\sqrt{3}}{16}\sqrt{\frac{\eta P_i}{\Delta f h v}} \quad (76)$$

which shows that the dynamic range is independent of the Fabry-Perot parameters such as the reflectivity or the cavity length. For the values used above, a dynamic range about 130 dB (20 log) results. Again, assuming an order of magnitude less sensitivity ($10^{-6}$ nm/$\sqrt{Hz}$) than that predicted, the dynamic range is then around 110 dB. Although this dynamic range is for the displacement measurements, it also applies for pressure, since the displacement is proportional to the pressure.

Figure 55:
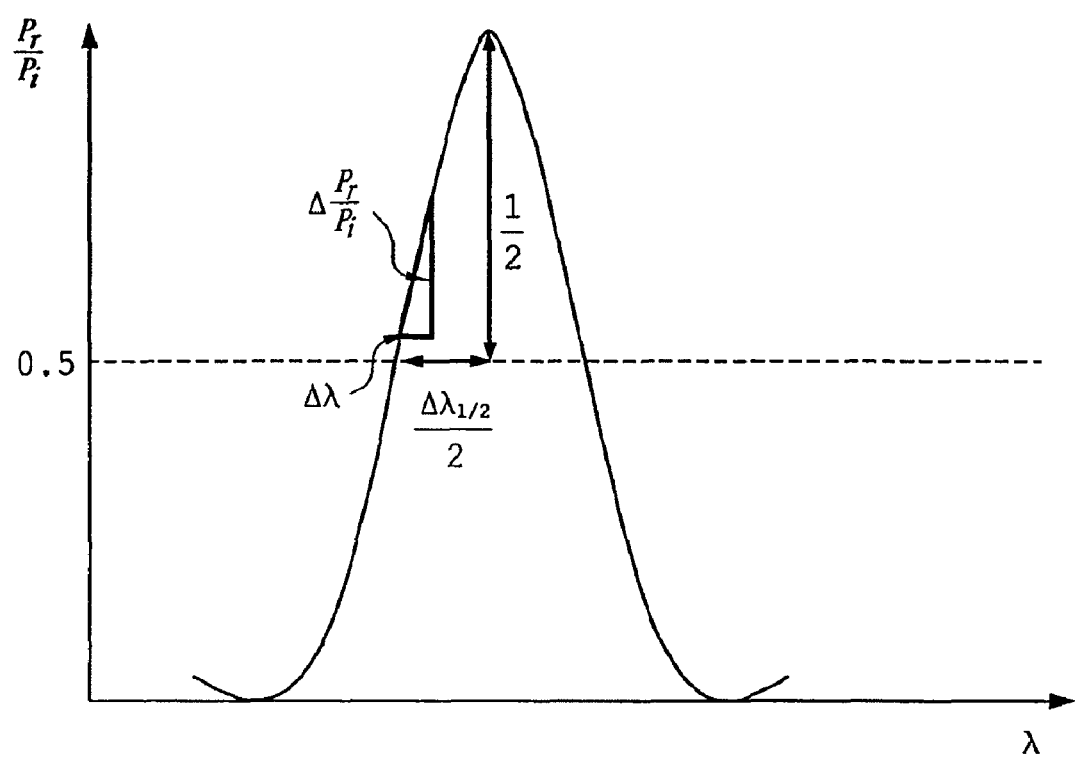
FIG. 55 is a graph of an optical resonance as a function of wavelength.

To compare these results to a single fiber Bragg grating, it is desirable to know if it is possible to get the same values by stretching a piece of such a fiber. FIG. 55 is a graph of an optical resonance as a function of wavelength. As a first step, the sensitivity for a general sharp resonance is calculated, which is shown in FIG. 55. From simple geometrics, we obtain the relation:

$$\frac{\Delta(P_r/P_r)}{\Delta\lambda} \approx \frac{1/2}{\Delta\lambda_{1/2}/2} = \frac{1}{\Delta\lambda_{1/2}} \quad (77)$$

If the resonance wavelength and distance is proportional to each other, as in a Fabry-Perot cavity, so that equation (74) is valid, the sensitivity can be expressed as:

$$\sigma = \frac{\Delta(P_r/P_i)}{\Delta L} = \frac{\lambda/L}{\Delta\lambda_{1/2}} \quad (78)$$

To verify this expression, the expressions for a Fabry-Perot cavity can be used, to get:

$$\sigma = \frac{\pi}{\lambda}\sqrt{K}, \quad (79)$$

which is very close to equation (65), thereby verifying equations (77) and (78).

Having general expressions for the sensitivity, the sensitivity for a fiber Bragg grating can be calculated. The resonance wavelength of such a structure is:

$$\lambda = 2n_{eff}\frac{L}{N} \quad (80)$$

where $n_{eff}$ is the effective refractive index, L the total length of the grating, and N the number of layers. (See, e.g., Kersey et al., "*Fiber grating sensors*," J. Lightwave Technol., vol. 15, no. 8, page 1442 (1997).) When such a structure is stretched by ΔL, the wavelength shifts by:

$$\Delta\lambda = 2n_{eff}(0.78)\frac{\Delta L}{N}, \quad (81)$$

where the factor 0.78 comes from changes in the fiber index due to photo-elastic effects. Therefore:

$$\frac{\Delta L}{L} = \frac{1}{0.78}\frac{\Delta\lambda}{\lambda} \quad (82)$$

which shows that equation (74) is valid to that order, meaning equation (78) is also valid to that order. Thus, the sensitivity of a Fabry-Perot cavity and a fiber Bragg grating are on the same order for a given wavelength, provided that $L\cdot\Delta\lambda_{1/2}$ of equation (78) is the same.

For example, a commercially available fiber Bragg gratings operating at around 1500 nanometers, a linewidth of 0.02 picometer for a grating around 5 centimeters long, the structure gives $L \cdot \Delta\lambda_{1/2} = 10^3$ nm$^2$. For a Fabry-Perot cavity on the other hand, using equation (43):

$$L \cdot \Delta\lambda_{1/2} = \frac{\lambda^2}{\pi\sqrt{K}} = \frac{\lambda^2}{\pi} \cdot \frac{1-R}{\sqrt{R}} \approx \frac{\lambda^2}{\pi} \cdot (1-R) \qquad (83)$$

To get a similar number (e.g., $L \cdot \Delta\lambda_{1/2} = 10^3$ nm$^2$) for a Fabry-Perot cavity, a reflectivity of R≈0.998 would be used. Hence, such a commercially available fiber Bragg grating seems to have the same sensitivity of a Fabry-Perot cavity with high reflectivity mirrors.

In this analysis of the Fabry-Perot cavity, it was assumed that the linewidth of the laser is much smaller than the linewidth of the Fabry-Perot resonance. The linewidth of the laser should be one to two orders of magnitude smaller than the resonance linewidth, so that the laser does not average over less sensitive regions. When a small cavity length is used, the Fabry-Perot resonance linewidth is large, hence the laser does not have to be very narrow. When the cavity length is large however, the Fabry-Perot resonance becomes sharper, hence a narrower laser is used to achieve the same sensitivity achieved in a short Fabry-Perot cavity. The main problem arises at this point when the laser has to be extremely narrow.

Consider the above case for the 0.02 picometer linewidth, for example. To achieve the calculated sensitivity, a laser as narrow as $10^{-3}$ to $10^{-4}$ picometer would be used. When a laser is that narrow, other noise sources become dominant over the shot-noise. One of the most important noises for such narrow lasers is the free running frequency noise. In fact, by reducing this noise using a pre-stabilized laser, it was previously experimentally shown that a sensitivity of $10^{-5}$ nm/$\sqrt{\text{Hz}}$ can be obtained for a greater than 25 millimeter long Fabry-Perot formed by two fiber Bragg gratings. (See, Chow et al., "*Ultra resolution fiber sensor using a pre-stabilized diode laser,*" page CPDA9, Post-deadline CLEO 2005 (2005).) This reported value is just about an order of magnitude worse than the fundamental shot-noise limited sensitivity for the same structure. Therefore, it is harder to get high sensitivities with long cavity lengths, since in that case a very good laser is used. However, these results should be encouraging for the fiber Bragg grating structure shown in FIG. 51, as well as for a Fabry-Perot sensor using two thin photonic crystal slabs as the mirrors.

Various embodiments have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of detecting a topology of a reflective surface, the method comprising:

providing a spatial mode filter positioned such that light emitted from the spatial mode filter is reflected by at least a portion of the reflective surface, wherein the spatial mode filter and the portion of the reflective surface form an optical resonator having an optical resonance with a resonance lineshape;

emitting light from the spatial mode filter while the spatial mode filter is at a plurality of positions along the reflective surface, the light emitted from the spatial mode filter irradiating a corresponding plurality of portions of the reflective surface; and measuring a change of the resonance lineshape due to the irradiation of the plurality of portions of the reflective surface.

2. The method of claim 1, wherein the spatial mode filter comprises an optical fiber.

3. The method of claim 1, wherein the resonance lineshape is asymmetric as a function of wavelength, wherein a degree of asymmetry of the resonance lineshape is dependent on the topology of the irradiated portion of the reflective surface, and measuring the change of the resonance lineshape comprises measuring the degree of asymmetry of the resonance lineshape.

4. The method of claim 1, wherein the resonance lineshape has a magnitude dependent on the topology of the irradiated portion of the reflective surface, and measuring the change of the resonance lineshape comprises measuring the magnitude.

5. The method of claim 1, wherein the spatial mode filter comprises an optical fiber having a first end that is partially reflective and partially transmissive to light emitted by the optical fiber, the first end of the optical fiber and the portion of the reflective surface forming a Fabry-Perot optical resonator.

6. The method of claim 1, wherein the spatial mode filter comprises an optical fiber having a fiber Bragg grating, wherein the fiber Bragg grating and the portion of the reflective surface form a Fabry-Perot optical resonator.

7. The method of claim 6, wherein the fiber Bragg grating and the portion of the reflective surface have a cavity therebetween.

8. The method of claim 7, wherein the cavity comprises a gas.

9. The method of claim 7, wherein the cavity comprises a liquid.

10. The method of claim 1, wherein at least a portion of the light reflected by the portion of the reflective surface is transmitted through the spatial mode filter.

11. The method of claim 1, wherein the spatial mode filter comprises a single-mode optical fiber.

12. The method of claim 1, wherein the spatial mode filter comprises an optically transmissive portion and an optically non-transmissive portion which bounds at least a portion of the optically transmissive portion.

13. The method of claim 12, wherein the optically transmissive portion is a hole through the optically non-transmissive portion.

14. The method of claim 1, wherein the spatial mode filter comprises a metal layer.

15. The method of claim 1, wherein the spatial mode filter comprises a dielectric mirror.

* * * * *